US009323103B2

(12) United States Patent (10) Patent No.: US 9,323,103 B2
Mori et al. (45) Date of Patent: Apr. 26, 2016

(54) LIQUID CRYSTAL DISPLAY DEVICE

(75) Inventors: Tomohiko Mori, Osaka (JP); Kazunari Tomizawa, Osaka (JP); Makoto Hasegawa, Osaka (JP); Yuichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 137 days.

(21) Appl. No.: 13/808,161

(22) PCT Filed: Mar. 3, 2011

(86) PCT No.: PCT/JP2011/054991
§ 371 (c)(1),
(2), (4) Date: Jan. 3, 2013

(87) PCT Pub. No.: WO2012/005022
PCT Pub. Date: Jan. 12, 2012

(65) Prior Publication Data
US 2013/0113847 A1 May 9, 2013

(30) Foreign Application Priority Data

Jul. 9, 2010 (JP) .................................. 2010-157160

(51) Int. Cl.
*H04N 5/202* (2006.01)
*G02F 1/1335* (2006.01)
(Continued)

(52) U.S. Cl.
CPC .... *G02F 1/133603* (2013.01); *G02F 1/133514* (2013.01); *G09G 3/3413* (2013.01);
(Continued)

(58) Field of Classification Search
CPC .......... G02F 1/1335; G09G 5/10; G09G 3/32; G09G 5/00; G09G 3/18; G09G 3/36; G09G 5/02; H04N 17/02; H04N 9/12; H04N 5/202; H01L 21/00

USPC ..................... 345/82, 88, 214, 690, 691, 694; 348/189, 674; 349/109; 438/7
See application file for complete search history.

(56) References Cited

U.S. PATENT DOCUMENTS 4,800,375 A 1/1989 Silverstein et al.
6,952,252 B2 10/2005 Nakanishi
(Continued)

FOREIGN PATENT DOCUMENTS

CN 101763806 A 6/2010
JP 09-251160 A 9/1997
(Continued)

OTHER PUBLICATIONS

Official Communication issued in International Patent Application No. PCT/JP2011/054991, mailed on Apr. 5, 2011.
(Continued)

*Primary Examiner* — Nicholas Lee
*Assistant Examiner* — Abdul-Samad A Adediran
(74) *Attorney, Agent, or Firm* — Keating & Bennett, LLP

(57) ABSTRACT

The liquid crystal display device (100) of the present invention includes a liquid crystal panel (10) having a plurality of pixels (P), and a backlight (20) having at least one light source (22) that emits light to the liquid crystal panel (10). Each of the plurality of pixels (P) includes four or more sub-pixels (R, G, B, Ye), and the light source unit (22) includes a red light source (22R), a green light source (22G), and a blue light source (22B). According to the present invention, a liquid crystal display device which can perform display of wide color reproduction range with low power consumption is provided.

17 Claims, 23 Drawing Sheets

(51) Int. Cl.
*G09G 3/34* (2006.01)
*G09G 3/36* (2006.01)

(52) U.S. Cl.
CPC ............ *G09G3/3607* (2013.01); *H04N 5/202* (2013.01); *G02F 2201/52* (2013.01); *G09G 3/3426* (2013.01); *G09G 2300/0452* (2013.01)

(56) References Cited

U.S. PATENT DOCUMENTS

| | | |
|---|---|---|
| 6,977,704 B2 | 12/2005 | Kataoka |
| 7,268,757 B2 | 9/2007 | Ben-David et al. |
| 2004/0174389 A1 | 9/2004 | Ben-David et al. |
| 2005/0009214 A1* | 1/2005 | Lim et al. ............... 438/7 |
| 2005/0122294 A1 | 6/2005 | Ben-David et al. |
| 2005/0206979 A1 | 9/2005 | Tomizawa et al. |
| 2006/0055858 A1 | 3/2006 | Nakanishi et al. |
| 2006/0098033 A1* | 5/2006 | Langendijk ............ 345/694 |
| 2007/0097213 A1* | 5/2007 | Ajito ..................... 348/189 |
| 2007/0176864 A1* | 8/2007 | Chino ..................... 345/82 |
| 2008/0165204 A1 | 7/2008 | Klompenhouwer et al. |
| 2008/0239157 A1* | 10/2008 | Rai ........................ 348/674 |
| 2008/0252829 A1 | 10/2008 | Chae et al. |
| 2009/0073358 A1* | 3/2009 | Taguchi et al. ......... 349/109 |
| 2009/0115803 A1 | 5/2009 | Langendijk et al. |
| 2009/0135213 A1 | 5/2009 | Tomizawa et al. |
| 2009/0146989 A1* | 6/2009 | Hirao ..................... 345/214 |
| 2009/0167657 A1* | 7/2009 | Tomizawa ............... 345/88 |
| 2009/0174638 A1* | 7/2009 | Brown Elliott et al. .... 345/88 |
| 2010/0156926 A1 | 6/2010 | Furukawa et al. |
| 2010/0265281 A1* | 10/2010 | Furukawa et al. ........ 345/691 |
| 2011/0115826 A1 | 5/2011 | Fujiwara |
| 2011/0298832 A1* | 12/2011 | Lai et al. ................ 345/690 |

FOREIGN PATENT DOCUMENTS

| | | |
|---|---|---|
| JP | 2001-209047 A | 8/2001 |
| JP | 2001-306023 A | 11/2001 |
| JP | 2002-244626 A | 8/2002 |
| JP | 2002-357830 A | 12/2002 |
| JP | 2003-177418 A | 6/2003 |
| JP | 2004-529396 A | 9/2004 |
| JP | 2006-78968 A | 3/2006 |
| JP | 2007-322944 A | 12/2007 |
| JP | 2008-537179 A | 9/2008 |
| JP | 2009-538442 A | 11/2009 |
| WO | 2006/121220 A1 | 11/2006 |
| WO | 2007/032133 A1 | 3/2007 |
| WO | 2009/054223 A1 | 4/2009 |

OTHER PUBLICATIONS

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDs"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

Hanaoka et al.; "40.1: A New MVA-LCD by Polymer Sustained Alignment Technology", Society for Information Display, 2004, pp. 1200-1203.

English translation of Official Communication issued in corresponding International Application PCT/JP2011/054991, mailed on Feb. 21, 2013.

* cited by examiner (a)

(b)

(c)

(a)

(b)

(c)

(a)

(b)

(a)  22G (b)  Ye (c)  22G+Ye (d)  22G+(G+Ye)

(a)

(b)

(a)

(b)

(c)

(a)

(b)

(c)

(a)

(b)

(c)

(a)

(b)

(a)

(b)

(c)

(d)

(a)

(b)

(a)

(b)

(a)

(b)

LIQUID CRYSTAL DISPLAY DEVICE

TECHNICAL FIELD

The present invention relates to a liquid crystal display device, and more particularly to a liquid crystal display device which performs display with four or more primary colors.

BACKGROUND ART

A liquid crystal display device has such advantages as a light and thin body and low power consumption. Because of the advantages, a liquid crystal display device is utilized for not only a small-size display device such as a display portion of a mobile telephone, but also a large-size television set. As for a liquid crystal panel, the liquid crystal panel itself does not emit light, unlike a self-emitting panel such as a cathode ray tube (CRT) and a plasma display panel (PDP). Accordingly, a liquid crystal display device generally performs display by utilizing light of a backlight disposed on a back side of a liquid crystal panel.

In recent years, unlike a general liquid crystal display device with three primary colors, a liquid crystal display device with four or more primary colors which are additively mixed is suggested. Such a liquid crystal display device is also referred to as a multi-primary color liquid crystal display device. In general, in a multi-primary color liquid crystal display device, any other primary color is added to the three primary colors (i.e., red, green, and blue), thereby increasing the color reproduction range. The multi-primary color liquid crystal display device performs display in such a manner that grayscale levels of an input video signal which can be displayed by a general three-primary color display device are converted into grayscale levels of four or more primary colors (see Patent Documents No. 1 and No. 2, for example). Such conversion is also referred to as multi-primary color conversion.

CITATION LIST

Patent Literature

Patent Document No. 1: Japanese Unexamined Patent Application Publication No. 2004-529396
Patent Document No. 2: International Publication No. WO 2007/032133

SUMMARY OF INVENTION

Technical Problem

In a general multi-primary color liquid crystal display device, light of constant intensity is emitted from a backlight in the driving, and a transmittance of a liquid crystal layer is changed by controlling a voltage applied across the liquid crystal layer in a liquid crystal panel, thereby representing various colors. However, in such a liquid crystal display device, the backlight is turned on even in the case where a color of low brightness (e.g. black) is to be displayed. Thus, it is impossible to attempt the reduction of power consumption.

The present invention has been performed in view of the above-described problems, and the objective of the present invention is to provide a liquid crystal display device which performs display of wide color reproduction range with low power consumption.

Solution to Problem

The liquid crystal display device of the present invention is a liquid crystal display device including: a liquid crystal panel having a plurality of pixels; and a backlight having at least one light source unit that emits light to the liquid crystal panel, wherein each of the plurality of pixels has four or more sub-pixels, and the light source unit includes a red light source, a green light source, and a blue light source.

In one embodiment, the red light source, the green light source, and the blue light source are a red light emitting diode, a green light emitting diode, and a blue light emitting diode, respectively.

In one embodiment, the liquid crystal display device further includes a control circuit that controls the liquid crystal panel and the backlight based on an input video signal.

In one embodiment, the control circuit includes: an active drive processing portion that generates a light source signal and a liquid crystal data signal based on the input video signal; a multi-primary color converting portion that generates a panel signal from the liquid crystal data signal; a panel driving circuit that drives the liquid crystal panel based on the panel signal; and a backlight driving circuit that drives the backlight based on the light source signal.

In one embodiment, the active drive processing portion generates a backlight signal from the light source signal, and the multi-primary color converting portion generates the panel signal based on the backlight signal and the liquid crystal data signal.

In one embodiment, the liquid crystal display device varies relative intensities of the red light source, the green light source, and the blue light source of the light source unit depending on a color of a pixel indicated by the input video signal.

In one embodiment, among the red light source, the green light source, and the blue light source of the light source unit, a light source corresponding to grayscale levels of red, green, and blue having the minimum value of the input video signal is turned off, and a light source corresponding to grayscale levels of red, green, and blue having a value higher than the minimum value of the input video signal is turned on.

In one embodiment, in the case where the input video signal indicates yellow, the red light source and the green light source are turned on, and the blue light source is turned off.

In one embodiment, the magnitude correlation among respective relative intensities of the red light source, the green light source, and the blue light source is the same as the magnitude correlation among red, green, and blue grayscale levels indicated in the input video signal.

In one embodiment, in the case where the red, green, and blue grayscale levels indicated in the input video signal are higher than the minimum value, respectively, respective relative transmittances of the four or more sub-pixels in the liquid crystal panel exhibit the maximum value.

In one embodiment, in the case where the input video signal indicates orange or yellowish green, the blue light source is turned off.

In one embodiment, in the case where the input video signal indicates orange or yellowish green, respective relative intensities of the red light source and the green light source are higher than a relative intensity of the blue light source.

In one embodiment, in the case where the input video signal indicates green, a relative intensity of the green light source is higher than a relative intensity of the red light source and a relative intensity of the blue light source.

In one embodiment, the four or more sub-pixels include a red sub-pixel, a green sub-pixel, a blue sub-pixel, and a yellow sub-pixel.

In one embodiment, in the case where the input video signal indicates yellow, relative transmittances of the red sub-pixel, the green sub-pixel, and the yellow sub-pixel in the liquid crystal panel exhibit the maximum value.

In one embodiment, in the case where the input video signal indicates green, the green light source is turned on, and relative transmittances of the green sub-pixel and the yellow sub-pixel are higher than relative transmittances of the red sub-pixel and the blue sub-pixel in the liquid crystal panel.

In one embodiment, in the case where the input video signal indicates green, the red light source and the green light source are turned on, and relative transmittances of the green sub-pixel and the yellow sub-pixel are higher than relative transmittances of the red sub-pixel and the blue sub-pixel in the liquid crystal panel.

In one embodiment, in the case where the red light source is turned on, a relative transmittance of the red sub-pixel in the liquid crystal panel exhibits the maximum value, in the case where the green light source is turned on, a relative transmittance of the green sub-pixel in the liquid crystal panel exhibits the maximum value, and in the case where the blue light source is turned on, a relative transmittance of the blue sub-pixel in the liquid crystal panel exhibits the maximum value.

In one embodiment, in the case where the red light source is turned on and the green light source is turned off, relative transmittances of the red sub-pixel and the yellow sub-pixel are higher than the minimum value, and in the case where the green light source is turned on and the red light source is turned off, relative transmittances of the green sub-pixel and the yellow sub-pixel are higher than the minimum value.

In one embodiment, the four or more sub-pixels further include a cyan sub-pixel.

In one embodiment, the four or more sub-pixels include a red sub-pixel, a green sub-pixel, a blue sub-pixel, and a white sub-pixel.

In one embodiment, in the case where the input video signal indicates green, the green light source is turned on, and relative transmittances of the green sub-pixel and the white sub-pixel are higher than relative transmittances of the red sub-pixel and the blue sub-pixel in the liquid crystal panel.

In one embodiment, in the case where the input video signal indicates red, the red light source is turned on, and relative transmittances of the red sub-pixel and the white sub-pixel are higher than relative transmittances of the green sub-pixel and the blue sub-pixel in the liquid crystal panel.

In one embodiment, in the case where the input video signal indicates blue, the blue light source is turned on, and relative transmittances of the blue sub-pixel and the white sub-pixel are higher than relative transmittances of the red sub-pixel and the green sub-pixel in the liquid crystal panel.

In one embodiment, in the case where the input video signal indicates green, the green light source is turned on, the red light source and/or the blue light source are turned on, and relative transmittances of the green sub-pixel and the white sub-pixel are higher than relative transmittances of the red sub-pixel and the blue sub-pixel in the liquid crystal panel.

In one embodiment, in the case where the input video signal indicates red, the red light source is turned on, the green light source and/or the blue light source are turned on, and relative transmittances of the red sub-pixel and the white sub-pixel are higher than relative transmittances of the green sub-pixel and the blue sub-pixel in the liquid crystal panel.

In one embodiment, in the case where the input video signal indicates blue, the blue light source is turned on, the red light source and/or the green light source are turned on, and relative transmittances of the blue sub-pixel and the white sub-pixel are higher than relative transmittances of the red sub-pixel and the green sub-pixel.

In one embodiment, in the case where the red light source is turned on, a relative transmittance of the red sub-pixel in the liquid crystal panel exhibits the maximum value, in the case where the green light source is turned on, a relative transmittance of the green sub-pixel in the liquid crystal panel exhibits the maximum value, and in the case where the blue light source is turned on, a relative transmittance of the blue sub-pixel in the liquid crystal panel exhibits the maximum value.

In one embodiment, in the case where the red light source is turned on, and the green light source and the blue light source are turned off, relative transmittances of the red sub-pixel and the white sub-pixel are higher than the minimum value, in the case where the green light source is turned on, and the red light source and the blue light source are turned off, relative transmittances of the green sub-pixel and the white sub-pixel are higher than the minimum value, and in the case where the blue light source is turned on, and the red light source and the green light source are turned off, relative transmittances of the blue sub-pixel and the white sub-pixel are higher than the minimum value.

Advantageous Effects of Invention

The liquid crystal display device of the present invention can perform display of wide color reproduction range with low power consumption.

DESCRIPTION OF EMBODIMENTS

Figure 1:
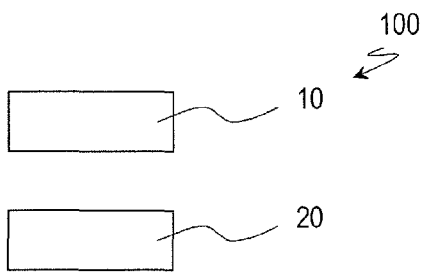
In FIG. 1, (a) is a schematic diagram of a liquid crystal display device in a first embodiment of the present invention, (b) is a schematic diagram of a liquid crystal panel in the liquid crystal display device shown in (a), (c) is a schematic sectional view of the liquid crystal panel shown in (b), (d) is a schematic diagram of a backlight in the liquid crystal display device shown in (a), and (e) is a schematic diagram of a light source unit shown in (d).
Figure 1:
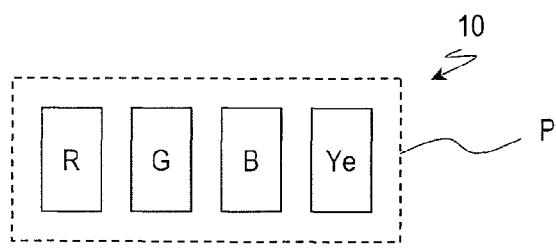
Figure 1:
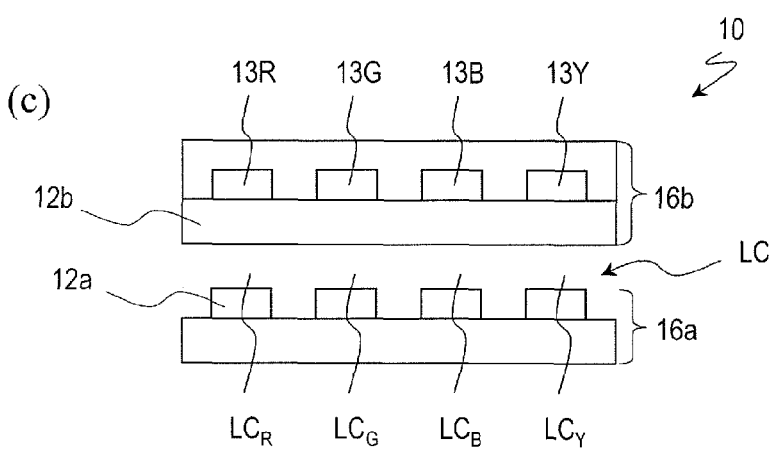
Figure 1:
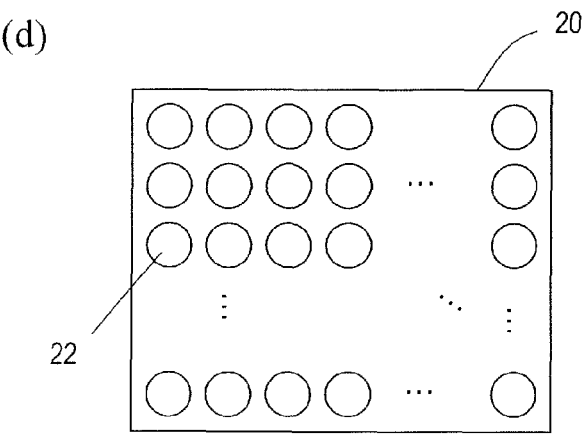
Figure 1:
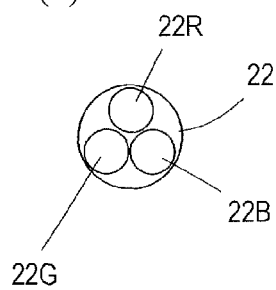

Hereinafter with reference to the accompanying drawings, embodiments of a liquid crystal display device of the present invention will be described. It is noted that the present invention should not be limited to the embodiments which will be described below.

(Embodiment 1)

Hereinafter a first embodiment of the liquid crystal display device of the present invention will be described. FIG. 1(a) shows a schematic diagram of a liquid crystal display device 100 in this embodiment. The liquid crystal display device 100 includes a liquid crystal panel 10 and a backlight 20.

The liquid crystal panel 10 has a plurality of pixels. The plurality of pixels are arranged in a matrix of a plurality of rows and a plurality of columns. Each pixel is defined by four or more sub-pixels. The liquid crystal panel 10 and the liquid crystal display device 100 are also referred to as a multi-primary color panel and a multi-primary color display device, respectively.

FIG. 1(b) shows a schematic diagram of a pixel P in the liquid crystal panel 10. The pixel P includes four or more sub-pixels. The four or more sub-pixels display colors which are different from each other. The pixel P is also referred to as a color display pixel. Herein the pixel P includes a red sub-pixel R, a green sub-pixel G, a blue sub-pixel B, and a yellow sub-pixel Ye.

In FIG. 1(b), the red sub-pixel R, the green sub-pixel G, the blue sub-pixel B, and the yellow sub-pixel Ye are shown in a line along a row direction. Alternatively, the red sub-pixel R, the green sub-pixel G, the blue sub-pixel B, and the yellow sub-pixel Ye may be arranged in a matrix of two rows and two columns. In FIG. 1(b), areas of the red sub-pixel R, the green sub-pixel G, the blue sub-pixel B, and the yellow sub-pixel Ye are shown so as to be equal to each other. Alternatively, the areas of the red sub-pixel R, the green sub-pixel G, the blue sub-pixel B, and the yellow sub-pixel Ye may be different. When an average of the areas of the red sub-pixel R, the green sub-pixel G, the blue sub-pixel B, and the yellow sub-pixel Ye is referred to as a sub-pixel average area, the area of the red sub-pixel R is larger than the sub-pixel average area, so that the red color of high brightness can sufficiently be represented. The area of the blue sub-pixel B is larger than the sub-pixel average area, so that it is possible to suppress the reduction of luminous efficiency of the backlight. For the above-described reasons, it is preferred that the areas of the red sub-pixel R and the blue sub-pixel B be larger than the area of the green sub-pixel G and the yellow sub-pixel Ye.

FIG. 1(c) shows a schematic sectional view of the liquid crystal panel 10. In the liquid crystal panel 10, each of the red sub-pixel R, the green sub-pixel G, the blue sub-pixel B, and the yellow sub-pixel Ye includes a pair of electrodes 12a and 12b and a liquid crystal layer LC positioned between the electrodes 12a and 12b. In the red sub-pixel R, the green sub-pixel G, the blue sub-pixel B, and the yellow sub-pixel Ye, color filters 13R, 13G, 13B, and 13Y are provided, respectively.

Herein the liquid crystal layer LC is a liquid crystal layer of vertical alignment type. The electrode 12a is disposed on a back substrate 16a, and the electrode 12b and the color filters 13R, 13G, 13B, and 13Y are disposed on a front substrate 16b. The electrode 12a is disposed separately for each sub-pixel, and the electrode 12b is disposed in common (continuously) among a plurality of sub-pixels (typically a plurality of pixels P). Although not shown in the figure, on the back substrate 16a, a gate bus line, a storage capacitor bus line, an insulating layer, a source bus line, a thin film transistor, an alignment film, and the like are further disposed. On the front substrate 16b, an alignment film and the like are further disposed. On the outer sides of the back substrate 16a and the front substrate 16b, polarizing plates are disposed.

For example, the liquid crystal layer LC contains a nematic liquid crystal material having negative dielectric anisotropy. In combination with the polarizing plates which are arrange in a crossed Nichol manner, display is performed in a normally black mode. In this specification, the liquid crystal layers LC of the red sub-pixel R, the green sub-pixel G, the blue sub-pixel B, and the yellow sub-pixel Ye may sometimes be referred to as liquid crystal layers $LC_R$, $LC_G$, $LC_B$, and $LC_Y$, respectively.

FIG. 1($d$) shows a schematic diagram of the backlight 20. The backlight 20 includes at least one light source unit 22. Herein, in the backlight 20, a plurality of light source units 22 are arrange in a matrix having a plurality of rows and a plurality of columns. One light source unit 22 corresponds to a plurality of pixels. For example, in the case of Full Hi-Vision standards, 1920×1080 pixels are provided in the liquid crystal panel 10, but 1000 to 2000 light source units 22 are provided in the backlight 20. Alternatively, in the backlight 20, 100 to 200 light source units 22 may be provided.

FIG. 1($e$) shows a schematic diagram of the light source unit 22. The light source unit 22 includes a red light source 22R, a green light source 22G, and a blue light source 22B. The intensities of light emitted from the red light source 22R, the green light source 22G, and the blue light source 22B can be controlled mutually independently. By controlling the intensities of light respectively emitted from the light sources 22R, 22G, and 22B of the light source unit 22, the light of the backlight 20 can be changed.

As the red light source 22R, the green light source 22G, and the blue light source 22B, for example, a red light emitting diode (LED), a green light emitting diode, a blue light emitting diode are suitably utilized, respectively. In the following description of this specification, the red light source 22R, the green light source 22G, and the blue light source 22B may sometimes be simply referred to as light sources 22R, 22G, and 22B, respectively.

For example, the backlight 20 may be a direct backlight. Although not shown in the figure, a diffuser may be provided between the liquid crystal panel 10 and the light source unit 22. Alternatively, the backlight 20 may be a backlight of edge lighting type. Although not shown in the figure, a light guiding plate may be provided between the liquid crystal panel 10 and the light source unit 22. Such a diffuser or light guiding plate is disposed in the backlight 20. As described above, in the case where a plurality of light source units 22 are provided, the variation of intensities of light emitted from the light sources 22R, 22G, and 22B may sometimes be relatively large. However, after the light source unit 22 is disposed in the backlight 20, an electric current or the like supplied to the light sources 22R, 22G, and 22B is finely adjusted, thereby suppressing the variation of intensities of light emitted from the light sources 22R, 22G, and 22B.

The backlight 20 emits light from the light sources 22R, 22G, and 22B to the liquid crystal panel 10. The intensities of light emitted from the light sources 22R, 22G, and 22B can be arbitrarily controlled. For example, the intensities of light emitted from the light sources 22R, 22G, and 22B are controlled in accordance with the electric current supplied to the light sources 22R, 22G, and 22B. The control of the intensities of light from the light sources 22R, 22G, and 22B is performed by pulse width modulation (PWM). For example, by increasing the duty ratio, the intensities of light from the light sources 22R, 22G, and 22B can be increased. Alternatively, by increasing the amplitude of pulse, the intensities of light from the light sources 22R, 22G, and 22B can be increased. Alternatively, by increasing the duty ratio and also increasing the amplitude of pulse, the intensities of light from the light sources 22R, 22G, and 22B can be increased.

As described above, in this embodiment, a plurality of light source units 22 are disposed in the backlight 20. In the following description of this specification, in the pixel P of the liquid crystal panel 10, an area of the pixel P which is irradiated with light from one light source unit 22 is referred to as a light irradiation area. A light irradiation area by a certain light source unit 22 and a light irradiation area by a light source unit 22 which is adjacent thereto are partially overlapped. By controlling the intensity of light emitted from a light source unit 22, the intensity of light incident on a pixel P in the light irradiation area corresponding to the light source unit 22 of the liquid crystal panel 10 from the backlight 20 is varied. In the case where all pixels P in the light irradiation area display black, the power consumption can be reduced by turning off the light source unit 22. In addition, by making different the intensities of light source units 22 in the backlight 20, a high contrast ratio can be easily realized.

As described above, in the liquid crystal display device 100, the color filters 13R, 13G, 13B, and 13Y are provided on the front substrate 16$b$. The light emitted from the backlight 20 is transmitted through the liquid crystal layers $LC_R$, $LC_G$, $LC_B$, and $LC_Y$, and thereafter transmitted through the color filters 13R, 13G, 13B, and 13Y, thereby performing display of red, green, blue, and yellow. The transmittances of the liquid crystal layers $LC_R$, $LC_G$, $LC_B$, and $LC_Y$ are varied depending on the voltage applied across the liquid crystal layers $LC_R$, $LC_G$, $LC_B$, and $LC_Y$, i.e., the voltage between the electrode 12$a$ and the electrode 12$b$.

The color filters 13R, 13G, 13B, and 13Y are specific to the liquid crystal panel 10. In the case where the transmittances of the liquid crystal layers $LC_R$, $LC_G$, $LC_B$, and $LC_Y$ exhibit the minimum value, respectively, the transmittances of the red sub-pixel R, the green sub-pixel G, the blue sub-pixel B, and the yellow sub-pixel Ye in the liquid crystal panel 10 also exhibit the minimum value. On the contrary, in the case where the transmittances of the liquid crystal layers $LC_R$, $LC_G$, $LC_B$, and $LC_Y$ exhibit the maximum value, respectively, the transmittances of the red sub-pixel R, the green sub-pixel G, the blue sub-pixel B, and the yellow sub-pixel Ye in the liquid crystal panel 10 also exhibit the maximum value.

Figure 2:
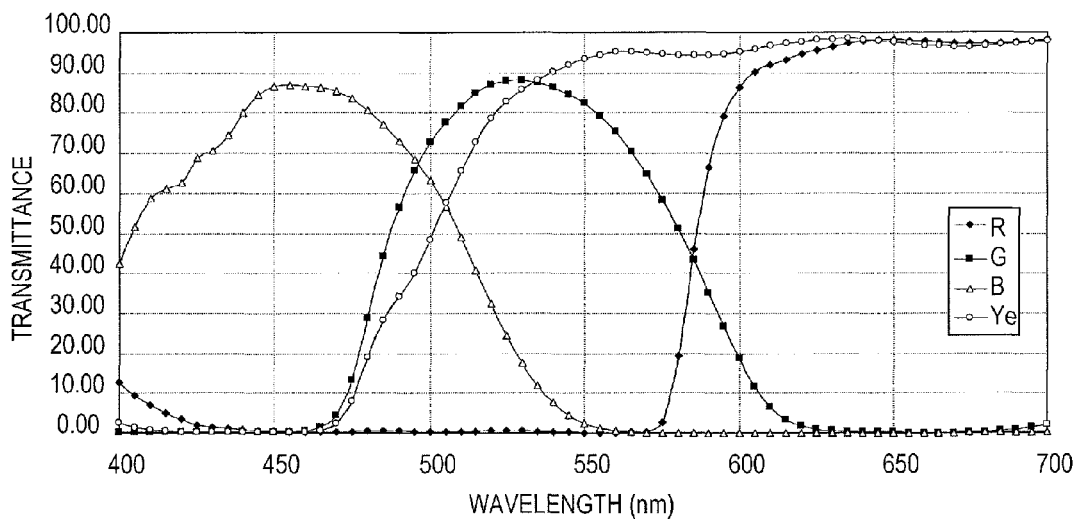
FIG. 2 is a graph showing transmission spectra of red, green, blue and yellow sub-pixels in the liquid crystal panel shown in FIG. 1(b).

FIG. 2 shows transmission spectra of the red sub-pixel R, the green sub-pixel G, the blue sub-pixel B, and the yellow sub-pixel Ye in the liquid crystal panel 10. For example, the transmission spectrum of the red sub-pixel R indicates the transmission spectrum of the liquid crystal panel 10 when the transmittance of the red sub-pixel R is made to be the maximum value, and the transmittances of the green sub-pixel G, the blue sub-pixel B, and the yellow sub-pixel Ye are made to be the minimum value. Specifically, the transmission spectrum of the red sub-pixel R is measured in the condition where the applied voltage across the liquid crystal layer $LC_R$ in the liquid crystal panel 10 is made to be the maximum value, and the applied voltages across the liquid crystal layers $LC_G$, $LC_B$, and $LC_Y$ are made to be the minimum value. The transmission spectra of the green sub-pixel G, the blue sub-pixel B, and the yellow sub-pixel Ye are also measured in the same way. In the liquid crystal panel 10, the red sub-pixel R mainly transmits light having wavelengths of 570 nm or more, and the green sub-pixel G mainly transmits light having wavelengths of 480 nm to 580 nm. The blue sub-pixel B mainly transmits light having wavelengths of 400 nm to 520 nm, and the yellow sub-pixel Ye mainly transmits light having wavelengths of 500 nm or more.

Figure 3:
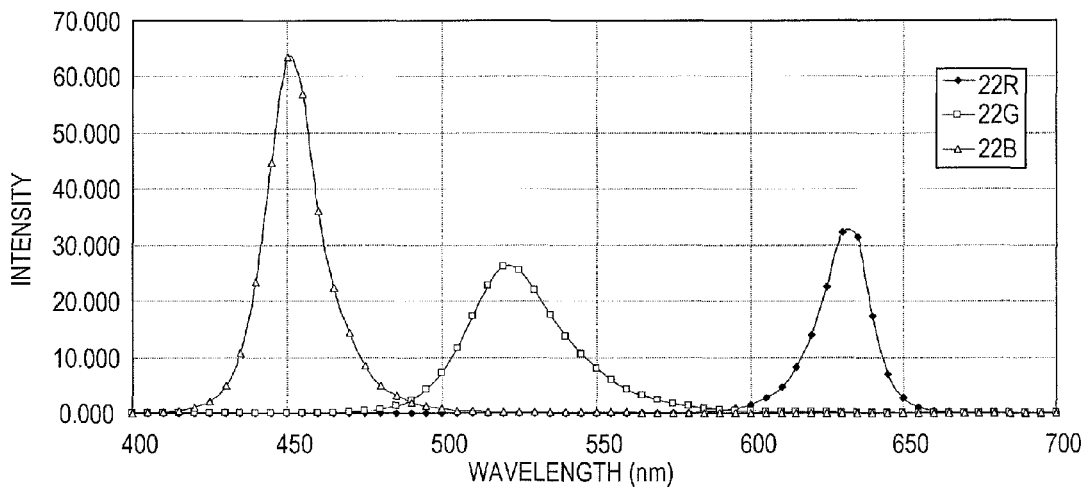
FIG. 3 is a graph showing emission spectra of a red light source, a green light source, and a blue light source shown in FIG. 1(e).

FIG. 3 shows emission spectra of the light sources 22R, 22G, and 22B in the backlight 20. As described above, the respective intensities of the light sources 22R, 22G, and 22B can be controlled. FIG. 3 shows the emission spectra when the respective intensities of the light sources 22R, 22G, and 22B are made to be the maximum. The peak wavelength of the emission spectrum of the light source 22R is about 450 nm, the peak wavelength of the emission spectrum of the light source 22G is about 520 nm, and the peak wavelength of the emission spectrum of the light source 22B is about 630 nm.

Figure 4:
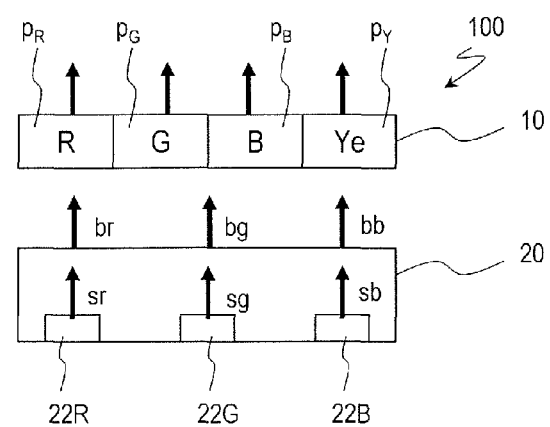
FIG. 4 is a schematic diagram of the liquid crystal display device shown in FIG. 1.

FIG. 4 shows a schematic diagram of the liquid crystal display device 100. As described above, in the backlight 20, the light source unit 22 includes the light sources 22R, 22G, and 22B. The backlight 20 emits light from the light sources 22R, 22G, and 22B to the liquid crystal panel 10. The intensities of light emitted from the light sources 22R, 22G, and 22B can be arbitrarily controlled. Not only the intensity but also the color temperature of the light from the backlight 20 can be controlled.

In this specification, the intensity of the light source 22R which is normalized by the minimum value and the maximum value is indicated by a relative intensity sr. Similarly, the intensities of the light sources 22G and 22B which are normalized by the minimum value and the maximum value are indicated by relative intensities sg and sb, respectively. The minimum value of the respective relative intensities sr, sg, and sb is 0 (zero), and the maximum value thereof is 1. The respective relative intensities sr, sg, and sb are varied in the range of 0 or more and 1 or less. In this specification, in the case where the relative intensities sr, sg, and sb are the minimum value (i.e., 0), the light sources 22R, 22G, and 22B are in the off state, respectively. In the case where the relative intensities sr, sg, and sb are higher than the minimum value (i.e., sr, sg, sb>0), the light sources 22R, 22G, and 22B are in the on state, respectively.

The light emitted from the backlight 20 is varied in accordance with the intensities of the light of the light sources 22R, 22G, and 22B. On the pixel P in a region in which the light irradiation areas by light source units 22 adjacent to each other are overlapped, light of respective light sources 22R, 22G, and 22B of different light source units 22 is incident.

In the following description of this specification, in the light emitted from the backlight 20 to the respective pixels P in the liquid crystal panel 10, the respective intensities from the light sources 22R, 22G, and 22B which are normalized by the minimum value and the maximum value are referred to as relative intensities br, bg, and bb. When the relative intensities sr, sg, and sr are determined, the relative intensities br, bg, and bb are determined accordingly. When the respective relative intensities sr, sg, and sb are 1, the relative intensities br, bg, and bb are 1, respectively. When the respective relative intensities sr, sg, and sb are 0, the relative intensities br, bg, and bb are 0, respectively.

In the case where the relative intensities sr, sg, and sb of the respective light source units 22 are the same, the ratio of the relative intensities br, bg, and bb of the backlight 20 in the pixel P of the liquid crystal panel 10 is substantially the same, but the intensity of light emitted from the backlight 20 in accordance with the pixel P is not necessarily the same. For example, even in the case where the intensities of light emitted from the light sources 22R of the respective light source units 22 are the same, the intensities of light from the light sources 22R in different pixels P are not necessarily the same. Similarly, even in the case where the intensities of light emitted from the light sources 22G and 22B of the respective light source units 22 are the same, the intensities of light from the light sources 22G and 22b in different pixels P are not necessarily the same.

In the following description of this specification, in order to prevent the description from being excessively complicated, except for the case especially noted, when the relative intensities sr of the respective light source units 22 are the same, light of the light sources 22 is incident on the respective pixels P in the liquid crystal panel 10 with the same intensity. Similarly, when the relative intensities sg and sr of the respective light source units 22 are the same, the light of the light sources 22G and 22B is incident on the respective pixels P of the liquid crystal panel 10 with the same intensities. In the case where the relative intensities sr, sg, and sb of the respective light source unit 22 are the same, typically, the magnitude correlation among the relative intensities br, bg, and bb of the backlight 20 is the same as the magnitude correlation among the relative intensities sr, sg, and sb of the light sources 22R, 22G, and 22B. For example, the relative intensities br, bg, and bb of the backlight 20 are the same as the relative intensities sr, sg, and sb of the light sources 22R, 22G, and 22B, respectively.

As described above, in the liquid crystal panel 10, the pixel P includes the red, green, blue, and yellow sub-pixels R, G, B, and Ye. In this specification, grayscale levels of red, green, blue, and yellow of the liquid crystal panel 10 are indicated by $p_R$, $p_G$, $p_B$, and $p_Y$. The grayscale levels $p_R$, $p_G$, $p_B$, and $p_Y$ correspond to the transmittances of the liquid crystal layers $LC_R$, $LC_G$, $LC_B$, and $LC_Y$ of the red, green, blue, and yellow sub-pixels R, G, B, and Ye. Specifically, across the liquid crystal layers $LC_R$, $LC_G$, $LC_B$, and $LC_Y$ of the red, green, blue, and yellow sub-pixels R, G, B, and Ye, voltages corresponding to the grayscale levels $p_R$, $p_G$, $p_B$, and $p_Y$ are applied, so that the transmittances of the red, green, blue, and yellow sub-pixels R, G, B, and Ye are changed. As described above, in the liquid crystal display device 100 in this embodiment, it is noted that the intensity of light from the backlight 20 is varied, so that the grayscale level of the liquid crystal panel 10 does not necessarily agree with the grayscale level of the liquid crystal display device 100.

In the case where the liquid crystal panel 10 is of the normally black type, the transmittances exhibit the minimum value when the lowest applied voltage (typically, the voltage of zero) is applied to the respective liquid crystal layers $LC_R$, $LC_G$, $LC_B$, and $LC_Y$, and the transmittances exhibit the maximum value when the highest applied voltage is applied to the respective liquid crystal layers $LC_R$, $LC_G$, $LC_B$, and $LC_Y$. In the case where the applied voltage across the liquid crystal layers $LC_R$, $LC_G$, $LC_B$, and $LC_Y$ is low, the transmittances of the red sub-pixel R, the green sub-pixel G, the blue sub-pixel B, and the yellow sub-pixel Ye are low. In the case where the applied voltage across the liquid crystal layers $LC_R$, $LC_G$, $LC_B$, and $LC_Y$ is high, the transmittances of the red sub-pixel R, the green sub-pixel G, the blue sub-pixel B, and the yellow sub-pixel Ye are high.

As described above, the grayscale levels $p_R$, $p_G$, $p_B$, and $p_Y$ of the liquid crystal panel 10 correspond to the transmittances of the red, green, blue, and yellow sub-pixels R, G, B, and Ye in the liquid crystal panel 10. In the following description of this specification, the transmittances of which the minimum value and the maximum value in the respective red, green, blue, and yellow sub-pixels R, G, B, and Ye are normalized to be zero (0) and 1, respectively, are represented by relative transmittances $p_R$, $p_G$, $p_B$, and $p_Y$. In the case where the intensity of light from the backlight 20 is constant, the grayscale levels $p_R$, $p_G$, $p_B$, and $p_Y$ are non-linear with respect to the luminance (or the intensity of emitted light), but the relative transmittances $p_R$, $p_G$, $p_B$, and $p_Y$ are linear with respect to the luminance (or the intensity of emitted light).

The light emitted from the light sources 22R, 22G, and 22B in the backlight 20 is transmitted through the red, green, blue, and yellow sub-pixels R, G, B, and Ye in the liquid crystal panel 10, and then emitted from the red, green, blue, and yellow sub-pixels R, G, B, and Ye. The light emitted from the red, green, blue, and yellow sub-pixels R, G, B, and Ye reaches an observer, and luminance corresponding to the intensity of emitted light is exhibited. In the red, green, blue, and yellow sub-pixels R, G, B, and Ye, the luminance is increased as the intensity of emitted light becomes higher, and the luminance is lowered as the intensity of emitted light becomes lower.

The intensity of light emitted from each pixel P of the liquid crystal panel 10 is expressed by the product of the intensity of light emitted from the backlight 20 and the transmittance of the liquid crystal panel 10. For example, the intensity of light emitted from each pixel P of the liquid crystal panel 10 is expressed by the sum of the intensities of light emitted from the red sub-pixel R, the green sub-pixel G, the blue sub-pixel B, and the yellow sub-pixel Ye.

Specifically, the light emitted from the red sub-pixel R is mainly the light emitted from the light source 22R in the backlight 20 and then transmitted through the liquid crystal layer $LC_R$ and the color filter 13R in the liquid crystal panel 10. Accordingly, the intensity of light emitted from the red sub-pixel R is mainly expressed by the product of the intensity of light of the light source 22R in the backlight 20 and the transmittance of the red sub-pixel R. The transmittance of the red sub-pixel R is mainly expressed by the product of the transmittance of the color filter 13R and the transmittance of the liquid crystal layer $LC_R$.

Similarly, the light emitted from the green sub-pixel G is mainly the light emitted from the light source 22G in the backlight 20 and then transmitted through the liquid crystal layer $LC_G$ and the color filter 13G in the liquid crystal panel 10. Accordingly, the intensity of light emitted from the green sub-pixel G is mainly expressed by the product of the intensity of light of the light source 22G in the backlight 20 and the transmittance of the green sub-pixel G. The transmittance of the green sub-pixel G is mainly expressed by the product of the transmittance of the color filter 13G and the transmittance of the liquid crystal layer $LC_G$.

The light emitted from the blue sub-pixel B is mainly the light emitted from the light source 22B in the backlight 20 and then transmitted through the liquid crystal layer $LC_B$ and the color filter 13B in the liquid crystal panel 10. Accordingly, the intensity of light emitted from the blue sub-pixel B is mainly expressed by the product of the intensity of light of the light source 22B in the backlight 20 and the transmittance of the blue sub-pixel B. The transmittance of the blue sub-pixel B is mainly expressed by the product of the transmittance of the color filter 13B and the transmittance of the liquid crystal layer $LC_B$.

The light emitted from the yellow sub-pixel Ye is mainly the light emitted from the light sources 22R and 22G in the backlight 20 and then transmitted through the liquid crystal layer $LC_Y$ and the color filter 13Y in the liquid crystal panel 10. Accordingly, the intensity of light emitted from the yellow sub-pixel Ye is mainly expressed by the product of the sum of the intensities of light of the light sources 22R and 22G in the backlight 20 and the transmittance of the yellow sub-pixel Ye. The transmittance of the yellow sub-pixel Ye is mainly expressed by the product of the transmittance of the color filter 13Y and the transmittance of the liquid crystal layer $LC_Y$.

The grayscale levels $p_R$, $p_G$, $p_B$, and $p_Y$ of the liquid crystal panel 10 and the relative intensities br, bg, and bb of the backlight 20 are set in accordance with an input video signal. The input video signal is a signal which can be utilized for a cathode ray tube (CRT) with gamma value of 2.2, for example, and is conformed to NTSC (National Television Standards Committee) standards or PAL (Phase Alternating Line) standards. The input video signal indicates red, green, and blue grayscale levels r, g, and b. In general, the grayscale levels r, g, and b are represented by 8 bits. Alternatively, the input video signal has a value which can be converted into the red, green and blue grayscale levels r, g, and b. The value thereof is expressed in three dimensions. For example, the input video signal is YCrCb signal. In the case where the input video signal is conformed to the BT.709 standards, the grayscale levels r, g, and b of the input video signal are within the range from the lowest grayscale level (e.g. the grayscale level of 0) to the highest grayscale level (e.g. the grayscale level of 255), respectively. In the following description, the grayscale levels r, g, and b of the input video signal mean not only the grayscale levels indicated in the input video signal itself, but also the grayscale levels obtained by converting the values indicated in the input video signal.

The grayscale levels r, g, and b of the input video signal have non-linear relationships with respect to the luminance of red, green, and blue. In this specification, the grayscale levels r, g, and b of the input video signal are converted so as to have linear relationships with respect to the luminance of red, green, and blue in accordance with predetermined relationships, and such converted grayscale levels are also referred to as luminance levels r, g, and b. The luminance levels r, g, and b are normalized by the minimum value and the maximum value of respective luminance of red, green, and blue. In the case where the respective luminance of red, green, and blue indicates the maximum luminance, the luminance level is 1. In the case where the respective luminance indicates the minimum luminance, the luminance level is 0 (zero). The grayscale levels r, g, and b are non-linear with respect to the luminance, but the luminance levels r, g, and b are linear with respect to the luminance. The magnitude correlation among the grayscale levels r, g, and b is the same as that of the luminance levels r, g, and b.

Typically, in the case where the input video signal indicates white, the light of the respective light sources 22R, 22G, and 22B in the backlight 20 exhibits the highest intensity, and the transmittances of the red sub-pixel R, the green sub-pixel G, the blue sub-pixel B, and the yellow sub-pixel Ye in the liquid crystal panel 10 exhibit the maximum values, respectively. In this case, the red sub-pixel R, the green sub-pixel G, the blue sub-pixel B, and the yellow sub-pixel Ye exhibit the maximum luminance, respectively.

Table 1 shows luminance ratios of the red sub-pixel R, the green sub-pixel G, the blue sub-pixel B, and the yellow sub-pixel Ye in the liquid crystal display device 100. The luminance ratio of the red sub-pixel R indicates the ratio of the luminance of the red sub-pixel R to the luminance of the pixel P when white (W) is displayed. Specifically, the luminance ratio of the red sub-pixel R is the luminance ratio in the case where the red sub-pixel R exhibits the highest transmittance and the other sub-pixels (i.e., the green sub-pixel G, the blue sub-pixel B, and the yellow sub-pixel Ye) exhibit the lowest transmittances with respect to the luminance when white (W) is displayed. Similarly, the luminance ratios of the green sub-pixel G, the blue sub-pixel B, and the yellow sub-pixel Ye are the luminance ratios in the case where the corresponding sub-pixel exhibits the highest transmittance and the other sub-pixels exhibit the lowest transmittances with respect to the luminance when white (W) is displayed.

TABLE 1

| | Luminance Ratio |
|---|---|
| R | 10.7% |
| G | 33.8% |
| B | 11.8% |
| Ye | 43.7% |
| W | 100% |

Typically, in the case where the input video signal indicates black, the relative intensities of the respective light sources 22R, 22G, and 22B in the backlight 20 indicate the minimum values, and the transmittances of the red sub-pixel R, the green sub-pixel G, the blue sub-pixel B, and the yellow sub-pixel Ye in the liquid crystal panel 10 indicate the minimum value, respectively. In this case, the red sub-pixel R, the green sub-pixel G, the blue sub-pixel B, and the yellow sub-pixel Ye exhibit the lowest luminance, respectively.

In the liquid crystal display device 100 in this embodiment, each pixel P in the liquid crystal panel 10 includes four or more sub-pixels for displaying colors which are different from each other, and each light source unit 22 includes light sources 22R, 22G, and 22B. Accordingly, display can be performed in wide color reproduction range. In addition, depending on the change of colors to be displayed, not only the transmittances of the liquid crystal layers $LC_R$, $LC_G$, $LC_B$, and $LC_Y$ in the liquid crystal panel 10 are changed, but also the relative intensities of the light sources 22R, 22G, and 22B of each light source unit 22 in the backlight 20 can be changed. Thus it is possible to improve the contrast ratio and realize the reduction in power consumption.

Specifically, in the case where the liquid crystal display device 100 displays red, the light source 22R in the backlight 20 is turned on, and the light sources 22G and 22B are turned off. In the liquid crystal panel 10, the red sub-pixel R transmits light, and the other sub-pixels block out the light. Similarly, in the case where the liquid crystal display device 100 displays green, the light source 22G is turned on, and the light sources 22R and 22B are turned off. In the liquid crystal panel 10, the green sub-pixel G transmits light, and the other sub-pixels block out the light. Similarly, in the case where the liquid crystal display device 100 displays blue, the light source 22B is turned on, and the light sources 22R and 22G are turned off. In the liquid crystal panel 10, the blue sub-pixel B transmits light, and the other sub-pixels block out the light. In the case where the liquid crystal display device 100 displays yellow, the light sources 22R and 22G are turned on, and the light source 22B is turned off. In the liquid crystal panel 10, the yellow sub-pixel Ye transmits light, and the other sub-pixels block out the light. As described above, in accordance with the colors to be displayed on the liquid crystal display device 100, the turning on and off of the light sources 22R, 22G, and 22B are controlled, thereby reducing the power consumption. In addition, in accordance with the colors to be displayed on the liquid crystal display device 100, not only the transmittances of the red, green, blue, and yellow sub-pixels R, G, B, and Ye are changed, the intensities of light emitted from the light sources 22R, 22G, and 22B are controlled, thereby realizing high contrast ratio.

For example, in the case where the liquid crystal display device 100 displays green, the light of the light source 22G is emitted from the backlight 20, and the green sub-pixel G in the liquid crystal panel 10 transmits the light. Herein the grayscale levels (r, g, b) of the input video signal are represented by (0, 255, 0) in the 255 grayscale notation.

FIG. 5(a) shows the emission spectrum of the backlight 20. Herein the relative intensities (sr, sg, sb) of the light sources 22R, 22G, and 22B are (0, 1, 0), the light source 22G is in the on state, and the emission spectrum has the peak wavelength of about 520 nm.

FIG. 5(b) shows the transmission spectrum of the liquid crystal panel 10. Herein the grayscale levels ($p_R$, $p_G$, $p_B$, $p_Y$) of the liquid crystal panel 10 are (0, 255, 0, 0), and light having wavelengths of 480 nm to 580 nm is mainly transmitted through the green sub-pixel G.

FIG. 5(c) shows the emission spectrum of the liquid crystal display device 100 in the case where the light of the spectrum shown in FIG. 5(a) is emitted from the backlight 20, and the light of the spectrum shown in FIG. 5(b) is transmitted in the liquid crystal panel 10. As described above, the intensity of light emitted from the green sub-pixel G is mainly expressed by the product of the intensity of light of the light source 22G in the backlight 20 and the transmittance of the green sub-pixel G. The emission spectrum also has the peak wavelength of about 520 nm.

As described above, in the case where the grayscale levels (r, g, b) of the input video signal are (0, 255, 0), the light sources 22R and 22B of the backlight 20 are turned off, and the light source 22G is turned on. The relative intensities (br, bg, bb) of the backlight 20 are (0, 1, 0). Table 2 shows the relative intensities (br, bg, bb) of the backlight 20.

TABLE 2

| Embodiment 1 | br | bg | bb |
|---|---|---|---|
| Relative intensity of Backlight | 0 | 1 | 0 |

The grayscale levels ($p_R$, $p_G$, $p_B$, $p_Y$) of the liquid crystal panel 10 are (0, 255, 0, 0) in the 255 grayscale notation. Table 3 shows the grayscale levels of the liquid crystal panel 10. The grayscale level of 0 corresponds to the minimum value, and the grayscale level of 255 corresponds to the maximum value.

TABLE 3

| Embodiment 1 | Red sub-pixel | Green sub-pixel | Blue sub-pixel | Yellow sub-pixel |
|---|---|---|---|---|
| Grayscale level of Liquid crystal panel | 0 | 255 | 0 | 0 |

As described above, in the liquid crystal display device 100, the grayscale levels ($p_R$, $p_G$, $p_B$, $p_Y$) of the red, green, blue, and yellow sub-pixels R, G, B, and Ye in the liquid crystal panel 10 are (0, 255, 0, 0), and the relative intensities (br, bg, bb) of the backlight 20 are (0, 1, 0), so that the ratio of luminance of the liquid crystal display device 100 with respect to the luminance of white display is 0.325. In the following description of this specification, such ratio is sometimes referred to as a normalized luminance. The luminance ratio of the green sub-pixel G shown in Table 1 is 33.8% (0.338), and the luminance ratio is higher than the normalized luminance when green is displayed on the liquid crystal display device 100. The luminance ratio of the green sub-pixel G is a value obtained by turning on not only the light source 22G but also the light sources 22R and 22B. On the contrary, the normalized luminance is a value obtained by turning on only the light source 22G and by turning off the light sources 22R and 22B.

As described above, in the liquid crystal display device 100 in this embodiment, a plurality of light source units 22 are provided in the backlight 20. In the case where all of the pixels P in a specific light irradiation area display black, the light sources 22R, 22G, and 22B of the light source units 22 corresponding to the specific light irradiation area are respectively turned off, thereby suppressing the power consumption of the backlight 20. In addition, the transmittances of the liquid crystal layers $LC_R$, $LC_G$, $LC_B$, and $LC_Y$ of the red sub-pixel R, the green sub-pixel G, the blue sub-pixel B, and the yellow sub-pixel Ye in the light irradiation area are made to be the minimum value, so that the light leakage can be suppressed. As a result, the contrast ratio can be increased.

Alternatively, for example, in the case where all of the pixels P in a specific light irradiation area display red, the light sources 22R of the light source units 22 corresponding to the light irradiation area are turned on, and the light sources 22G and the light sources 22B are turned off, thereby suppressing the power consumption of the backlight 20. A voltage is applied across the liquid crystal layer $LC_R$ of the red sub-pixel R in the light irradiation area, so that the transmittance of the liquid crystal layer $LC_R$ is made to have a predetermined value, and the transmittances of the liquid crystal layers $LC_G$, $LC_B$, and $LC_Y$ of the green sub-pixel G, the blue sub-pixel B, and the yellow sub-pixel Ye are made to have the minimum value, thereby suppressing the light leakage and increasing the contrast ratio.

The input video signal indicates a color of respective color display pixels in a frame or a field. In this specification, in order to prevent the description from being excessively complicated, except for the case to be especially mentioned, the input video signal is described in such a condition that all of the pixels indicate the same color over a plurality of vertical scanning periods.

Figure 6:
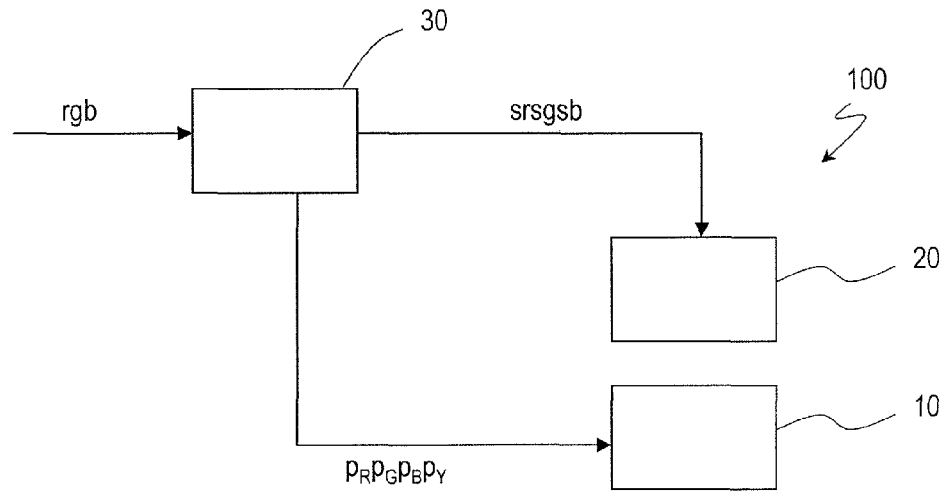
FIG. 6 is a schematic diagram showing an example of the liquid crystal display device shown in FIG. 1.

For example, the control of the liquid crystal panel 10 and the backlight 20 is performed in the following way. Hereinafter the liquid crystal display device 100 will be described with reference to FIG. 6. The liquid crystal display device 100 includes a control circuit 30 that controls the liquid crystal panel 10 and the backlight 20. The control circuit 30 generates a light source driving signal and a panel driving signal based on the input video signal.

The backlight 20 is driven based on the light source driving signal generated in the control circuit 30. The light source driving signal indicates the relative intensities sr, sg, and sb of the light sources 22R, 22G, and 22B in the backlight 20. By the light source driving signal, the light sources 22R, 22G, and 22B emit light with the relative intensities sr, sg, and sb. In this case, light is emitted from the backlight 20 with relative intensities br, bg, and bb.

The liquid crystal panel 10 is driven based on the panel driving signal generated in the control circuit 30. The panel driving signal indicates the grayscale levels $p_R$, $p_G$, $p_B$, and $p_Y$ of the liquid crystal panel 10. The grayscale levels $p_R$, $p_G$, $p_B$, and $p_Y$ correspond to applied voltages across the liquid crystal layers $LC_R$, $LC_G$, $LC_B$, and $LC_Y$ of the red, green, blue, and yellow sub-pixels R, G, B, and Ye in the liquid crystal panel 10. Specifically, voltages corresponding to the grayscale levels $p_R$, $p_G$, $p_B$, and $p_Y$ are applied across the liquid crystal layers $LC_R$, $LC_G$, $LC_B$, and $LC_Y$, thereby changing the transmittances of the liquid crystal layers $LC_R$, $LC_G$, $LC_B$, and $LC_Y$. In this way, in the liquid crystal display device 100, the relative intensities br, bg, and bb of the backlight 20 are changed, and the transmittances of the liquid crystal layers $LC_R$, $LC_G$, $LC_B$, and $LC_Y$ of the red, green, blue, and yellow sub-pixels R, G, B, and Ye are changed, so that the color display pixels P can display various colors.

Figure 7:
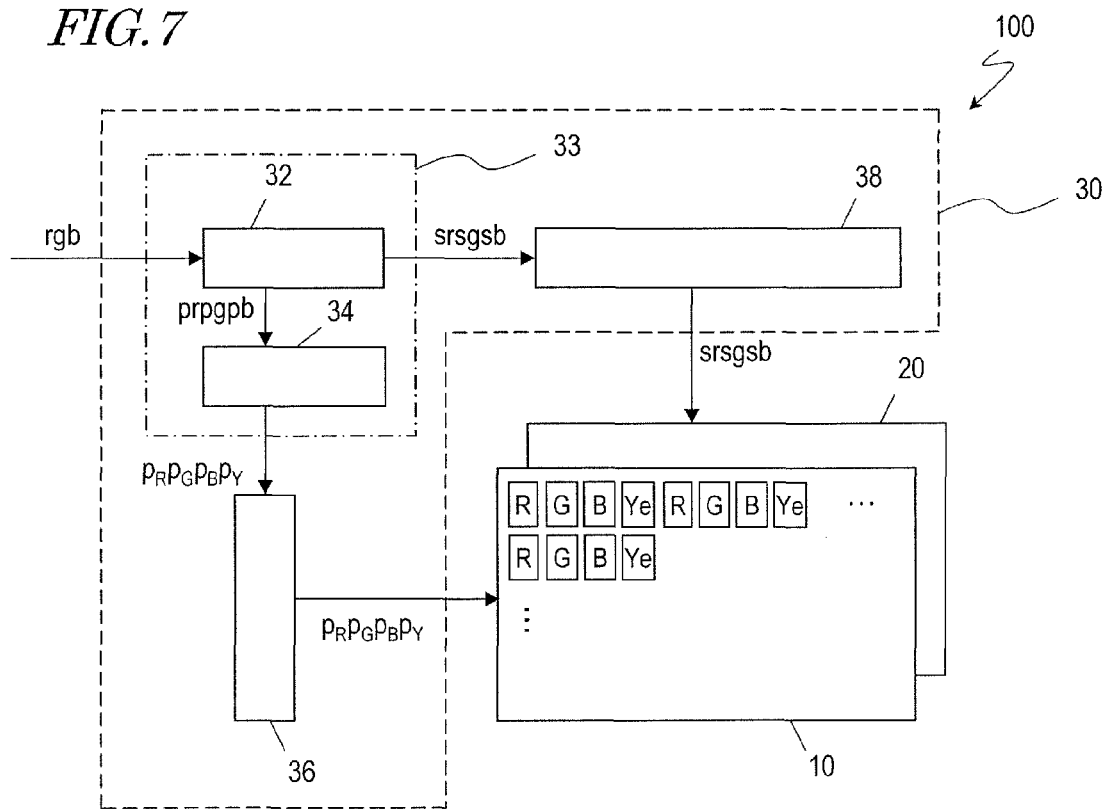
FIG. 7 is a schematic diagram of the liquid crystal display device shown in FIG. 6.

FIG. 7 shows a specific configuration of the control circuit 30. The control circuit 30 includes an active drive processing portion 32, a multi-primary color converting portion 34, a panel driving circuit 36, and a backlight driving circuit 38. As described above, herein the backlight 20 includes a plurality of light source units 22, and each light source unit 22 corresponds to a corresponding light irradiation area of the liquid crystal panel 10. As a result, as for the backlight 20, the light intensity can be controlled for each area of the liquid crystal panel 10. Such an active drive processing portion 32 is also referred to as an area active drive processing portion.

The active drive processing portion 32 generates a light source signal and a liquid crystal data signal based on the input video signal. The light source signal indicates the relative intensities sr, sg, and sb of the light sources 22R, 22G, and 22B. For example, the active drive processing portion 32 sets the relative intensities sr, sg, and sb of the light sources 22R, 22G, and 22B, based on the respective mean values of the grayscale levels r, g, and b of the input video signal and/or the maximum value thereof. As described above, herein all pixels exhibit the same color in the input video signal, and the grayscale levels r, g, and b corresponding to different pixels are also equal to each other.

The liquid crystal data signal indicates the red, green, and blue grayscale levels pr, pg, and pb. Although the details will be described later, the grayscale levels pr, pg, and pb of the liquid crystal data signal are set based on the grayscale levels r, g, and b and the relative intensities sr, sg, and sb, for example. In many cases, the grayscale levels pr, pg, and pb of the liquid crystal data signal are different from the grayscale levels r, g, and b of the input video signal.

The grayscale levels pr, pg, and pb correspond to the grayscale levels of the red, green, and blue sub-pixels of a three-primary color liquid crystal panel. When the liquid crystal data signal of the grayscale levels pr, pg, and pb is input into the three-primary color liquid crystal panel, the liquid crystal layers of the red, green, and blue sub-pixels of the liquid crystal panel exhibit the transmittances corresponding to the grayscale levels pr, pg, and pb. In the following description of this specification, in each of the red, green and blue sub-pixel of the three-primary color liquid crystal panel, the transmittance normalized in such a manner that the minimum value is zero (0) and the maximum value is 1 is referred to as a transmittance level. That is, the transmittance level of 0 corresponds to the minimum value of the transmittance of each of the red, green, and blue sub-pixels in the three-primary color liquid crystal panel, and the transmittance level of 1 corresponds to the maximum value of the transmittance of each of the red, green, and blue sub-pixels in the three-primary color liquid crystal panel. The grayscale levels pr, pg, and pb are non-linear with respect to the luminance (or the intensity of emitted light), but the transmittance levels pr, pg, and pb are linear with respect to the luminance (or the intensity of emitted light).

Thus, the active drive processing portion 32 generates a light source signal indicating the relative intensities sr, sg, and sb and a liquid crystal data signal indicating the grayscale levels pr, pg, and pb based on the input video signal which indicates the grayscale levels r, g, and b. Herein the luminance levels r, g, and b of the input video signal are expressed by the relative intensities br, bg, and bb of the backlight 20 and the transmittance levels pr, pg, and pb of the liquid crystal data signal. Specifically, the luminance level r is expressed by the product of the relative intensity br and the transmittance level pr. Similarly, the luminance level g is expressed by the product of the relative intensity bg and the transmittance level pg, and the luminance level b is expressed by the product of the relative intensity bb and the transmittance level pb.

The multi-primary color converting portion 34 generates a panel signal from the liquid crystal data signal. The above-described liquid crystal panel 10 performs display with four primary colors, so that a panel signal indicating grayscale levels of four primary colors is generated. Specifically, the multi-primary color converting portion 34 converts the grayscale levels pr, pg, and pb of the liquid crystal data signal into the red, green, blue, and yellow grayscale levels $p_1$, $p_2$, $p_3$, and $p_4$ of the panel signal. Herein the color phase of color represented by the grayscale levels pr, pg, and pb before the conversion is substantially the same as the color phase of color represented by the grayscale levels $p_1$, $p_2$, $p_3$, and $p_4$ after the conversion. Thereafter, the multi-primary color converting portion 34 generates a panel signal which indicates the grayscale levels $p_1$, $p_2$, $p_3$, and $p_4$ as the grayscale levels $p_R$, $p_G$, $p_B$, and $p_Y$.

The panel driving circuit 36 generates a panel driving signal based on the panel signal, thereby driving the liquid crystal panel 10. Voltages corresponding to the grayscale levels $p_R$, $p_G$, $p_B$, and $p_Y$ are applied across the liquid crystal layers $LC_R$, $LC_G$, $LC_B$, and $LC_Y$ of the liquid crystal panel 10, and the red, green, blue, and yellow sub-pixels R, G, B, and Ye of the liquid crystal panel 10 exhibit the transmittances corresponding to the gray scale levels $p_R$, $p_G$, $p_B$, and $p_Y$. The backlight driving circuit 38 generates a light source driving signal based on the light source signal. The light sources 22R, 22G, and 22B of the backlight 20 are driven by the light source driving signal. In this specification, the grayscale levels r, g, and b of the input video signal, the grayscale levels pr, pg, and pb of the liquid crystal data signal and/or the grayscale levels $p_R$, $p_G$, $p_B$, and $p_Y$ of the panel signal mean not only the grayscale levels indicated in the input video signal, the liquid crystal data signal, and/or the panel signal themselves, but also the grayscale levels obtained by converting the values indicated in the input video signal, the liquid crystal data signal, and/or the panel signal.

In FIG. 7, the active drive processing portion 32 and the multi-primary color converting portion 34 are shown as different components. Alternatively, the active drive processing portion 32 and the multi-primary color converting portion 34 may be included in a signal processing portion 33 which is embodied as a single circuit chip. In this case, the signal processing portion 33 generates a light source signal and a panel signal based on the input video signal.

The luminance of red displayed on the liquid crystal display device 100 is mainly related to the relative intensity br of the backlight 20 and the grayscale level (the transmittance level) $p_R$ of the liquid crystal panel 10. The luminance of green displayed on the liquid crystal display device 100 is mainly related to the relative intensity bg of the backlight 20 and the grayscale level (the transmittance level) $p_G$ of the liquid crystal panel 10. The luminance of blue displayed on the liquid crystal display device 100 is mainly related to the relative intensity bb of the backlight 20 and the grayscale level (the transmittance level) $p_B$ of the liquid crystal panel 10. The luminance of yellow displayed on the liquid crystal display device 100 is mainly related to the relative intensities br and bg of the backlight 20 and the grayscale level (the transmittance level) $p_Y$ of the liquid crystal panel 10.

In the above description, in the case where the liquid crystal display device 100 displays black, the relative intensities of the light sources 22R, 22G, and 22B in the backlight 20 exhibit the minimum value, respectively, and the transmittances of the red sub-pixel R, the green sub-pixel G, the blue sub-pixel B, and the yellow sub-pixel Ye in the liquid crystal panel 10 exhibit the minimum value, respectively. However, the present invention is not limited to this. Alternatively, in the case where the liquid crystal display device 100 displays black, irrespective of the transmittances of the red sub-pixel R, the green sub-pixel G, the blue sub-pixel B, and the yellow sub-pixel Ye, the relative intensities br, bg, and bb of the backlight 20 may exhibit the minimum value, respectively. Alternatively, in the case where the liquid crystal display device 100 displays black, irrespective of the relative intensities br, bg, and bb of the backlight 20, the grayscale levels $p_R$, $p_G$, $p_B$, and $p_Y$ in the liquid crystal panel 10 may exhibit the minimum value, respectively.

Strictly, even if the light sources 22R, 22G, and 22B of the backlight 20 are turned off, part of light emitted from a light source of another light source unit 22 may sometimes be transmitted through the liquid crystal panel 10. Similarly, even if the grayscale levels $p_R$, $p_G$, $p_B$, and $p_Y$ in the liquid crystal panel 10 are the minimum value, respectively, the light emitted from the light sources 22R, 22G, and 22B of the backlight 20 may be transmitted through the liquid crystal panel 10. For these reasons, in the case where the input video signal indicates black, it is preferred that the relative intensities of the light sources 22R, 22G, and 22B of the backlight 20 may exhibit the minimum value, respectively, and the transmittances of the red sub-pixel R, the green sub-pixel G, the blue sub-pixel B, and the yellow sub-pixel Ye in the liquid crystal panel 10 may exhibit the minimum value, respectively. Accordingly, it is possible to realize high contrast ratio.

As described above, the luminance level r of the input video signal is expressed by the product of the relative intensity br of the backlight 20 and the transmittance level pr of the liquid crystal data signal. In the case where the luminance level r of the input video signal is a median value, a plurality of combinations of the relative intensity br and the transmittance level pr are considered. However, if the transmittance level pr of the liquid crystal data signal is the maximum value, the relative intensity br can be lowered. As a result, the power consumption of the light source 22R can be reduced. Similarly, in the case where the luminance levels g and b of the input video signal are median values, when the transmittance levels pg and pb in the liquid crystal data signal are made to have the maximum value, the relative intensities bg and bb can be lowered. As a result, the power consumption of the light sources 22G and 22B can be reduced.

In the liquid crystal display device 100, it is preferred that the grayscale levels $p_R$, $p_G$, $p_B$, and $p_Y$ of the liquid crystal panel 10 and the relative intensities br, bg, and bb of the backlight 20 may be set in the following way based on the grayscale levels r, g, and b of the input video signal.

For example, in the case where the grayscale level r of the input video signal is higher than the minimum value, the relative intensity br of the backlight 20 is made to be higher than the minimum value, and the grayscale level $p_R$ of the liquid crystal panel 10 is made to be the maximum value. Accordingly, the power consumption can be reduced. In the case where the grayscale level r is the minimum value, the relative intensity br of the backlight 20 is made to be the minimum value, and the grayscale level $p_R$ is made to be the minimum value. Accordingly, the power consumption can be reduced, and the contrast ratio can be improved.

In the case where the grayscale level g of the input video signal is higher than the minimum value, the relative intensity bg of the backlight 20 is made to be higher than the minimum value, and the grayscale level $p_G$ of the liquid crystal panel 10 is made to be the maximum value. In the case where the grayscale level g is the minimum value, the relative intensity bg of the backlight 20 is set to be the minimum value, and the grayscale level $p_G$ of the liquid crystal panel 10 is made to be the minimum value. Similarly, in the case where the grayscale level b of the input video signal is higher than the minimum value, the relative intensity bb of the backlight 20 is made to be higher than the minimum value, and the grayscale level $p_B$ of the liquid crystal panel 10 is made to be the maximum value. In the case where the grayscale level b is the minimum value, the relative intensity bb of the backlight 20 is made to be the minimum value, and the grayscale level $p_B$ of the liquid crystal panel 10 is made to be the minimum value.

In the case where both of the grayscale levels r and g of the input video signal are higher than the minimum value, as is understood from the above description, both of the relative intensities br and bg of the backlight 20 are higher than the minimum value, and the grayscale level $p_Y$ of the liquid crystal panel 10 is made to be the maximum value. Accordingly, the power consumption can be reduced. In the case where at least one of the grayscale levels r and g of the input video signal is the minimum value, as is understood from the above description, at least one of the relative intensities br and bg of the backlight 20 is made to be the minimum value, and the grayscale level $p_Y$ of the liquid crystal panel 10 is made to be the minimum value. Accordingly, the power consumption can be reduced, and additionally the contrast ratio can be improved.

As described above, in the case where any one of the grayscale levels r, g, and b of the input video signal is the minimum value, the corresponding one of the relative intensities br, bg, and bb of the backlight 20 is also the minimum value, so that the corresponding one of the light sources 22R, 22G, and 22B is turned off. In the case where the grayscale levels r, g, and b of the input video signal are higher than the minimum value, the relative intensities br, bg, and bb of the backlight 20 are higher than the minimum value, and the light sources 22R, 22G, and 22B are turned on. In the case where any one of the grayscale levels r, g, and b of the input video signal has the minimum value, the corresponding one of the grayscale levels $p_R$, $p_G$, $p_B$, and $p_Y$ of the liquid crystal panel 10 also has the minimum value. In the case where the grayscale levels r, g, and b of the input video signal are higher than the minimum value, the grayscale levels $p_R$, $p_G$, $p_B$, and $p_Y$ of the liquid crystal panel 10 have the maximum value.

In the liquid crystal display device 100, the magnitude correlation among the relative intensities br, bg, and bb of the backlight 20 is set to be the same as the magnitude correlation among the luminance levels r, g, and b of the input video signal. For example, the relative intensities br, bg, and bb of the backlight 20 are substantially equal to the luminance levels r, g, and b of the input video signal, respectively. In addition, the grayscale levels $p_R$, $p_G$, $p_B$, and $p_Y$ of the liquid crystal panel 10 are set depending on the condition whether the grayscale levels r, g, and b of the input video signal are the minimum value or not. In the case where the grayscale levels r, g, and b are the minimum value, the grayscale levels $p_R$, $p_G$, and $p_B$ exhibit the minimum value. In the case where the grayscale levels r, g, and b are higher than the minimum value, the grayscale levels $p_R$, $p_G$, and $p_B$ exhibit the maximum value. In the case where at least one of the grayscale levels r and g is the minimum value, the grayscale level $p_Y$ exhibits the minimum value. In the case where both of the grayscale levels r and g are higher than the minimum value, the grayscale level $p_Y$ exhibit the maximum value. For example, in the case where the grayscale levels (r, g, b) of the input video signal are (128, 128, 128), i.e., in the case where the normalized luminance is 0.216 in the input video signal, the grayscale levels ($p_R$, $p_G$, $p_B$, $p_Y$) are (255, 255, 255, 255), and the relative intensities (br, bg, bb) of the backlight 20 are (0.216, 0.216, 0.216).

FIG. 7 is referred to again. As described above, the active drive processing portion 32 generates a light source signal based on the input video signal. The light source signal indicates the relative intensities sr, sg, and sb of the light sources 22R, 22G, and 22B. The backlight driving circuit 38 generates a light source driving signal based on the light source signal. The light sources 22R, 22G, and 22B of the backlight 20 are driven by the light source driving signal. At this time, the light sources 22R, 22G, and 22B emit light with the relative intensities sr, sg, and sb. The relative intensities of the backlight 20 are br, bg, and bb. In the case where any one of the grayscale levels r, g, and b of the input video signal is the minimum value, the corresponding one of the light sources 22R, 22G, and 22B is turned off, and the corresponding one of the relative intensities br, bg, and bb of the backlight 20 has the minimum value. In the case where the grayscale levels r, g, and b of the input video signal are higher than the minimum value, the light sources 22R, 22G, and 22B are turned on, and the relative intensities br, bg, and bb of the backlight 20 exhibit values higher than the minimum value, respectively.

For example, the magnitude correlation among the relative intensities br, bg, and bb of the backlight 20 is the same as the magnitude correlation among the luminance levels r, g, and b of the input video signal. Specifically, in the case where the luminance levels r, g, and b of the input video signal satisfy the relationship of r>g>b, the relative intensities br, bg, and bb of the backlight 20 satisfy the relationship of br>bg>bb. In the case where the luminance levels r, g, and b of the input video signal satisfy the relationship of r<g<b, the relative intensities br, bg, and bb satisfy the relationship of br<bg<bb.

The liquid crystal data signal indicates red, green, and blue grayscale levels pr, pg, and pb. The grayscale levels pr, pg, and pb of the liquid crystal data signal are set, for example, based on the grayscale levels r, g, and b and the relative intensities br, bg, and bb. In the case where the grayscale levels r, g, and b of the input video signal are higher than the minimum value, respectively, the grayscale levels pr, pg, and pb of the liquid crystal data signal exhibit the maximum value. In the case where any one of the grayscale levels r, g, and b of the input video signal is the minimum value, the corresponding one of the grayscale levels pr, pg, and pb exhibits the minimum value.

The multi-primary color converting portion 34 generates a panel signal from the liquid crystal data signal. The multi-primary color converting portion 34 converts the grayscale levels pr, pg, and pb of the liquid crystal data signal into the red, green, blue, and yellow grayscale levels $p_1$, $p_2$, $p_3$, and $p_4$, and generates a panel signal which indicates the grayscale levels $p_1$, $p_2$, $p_3$, and $p_4$ as the grayscale levels $p_R$, $p_G$, $p_B$, and $p_Y$.

The panel driving circuit 36 generates a panel driving signal based on the panel signal, thereby driving the liquid crystal panel 10. The voltages corresponding to the grayscale levels $p_R$, $p_G$, $p_B$, and $p_Y$ are applied across the liquid crystal layers $LC_R$, $LC_G$, $LC_B$, and $LC_Y$ of the liquid crystal panel 10.

In the above description, the grayscale levels $p_R$, $p_G$, $p_B$, and $p_Y$ of the liquid crystal panel 10 are set in accordance with the grayscale levels r, g, and b of the input video signal. However the present invention is not limited to this. The relative intensities br, bg, and bb of the backlight 20 are set in accordance with the grayscale levels r, g, and b of the input video signal, so that the grayscale levels $p_R$, $p_G$, $p_B$, and $p_Y$ of the liquid crystal panel 10 may be set to be the maximum value irrespective of the grayscale levels r, g, and b of the input video signal. It is noted that if the grayscale levels $p_R$, $p_G$, $p_B$, and $p_Y$ of the liquid crystal panel 10 are set in accordance with the grayscale levels r, g, and b of the input video signal, it is possible to easily realize high contrast ratio.

Figure 8:
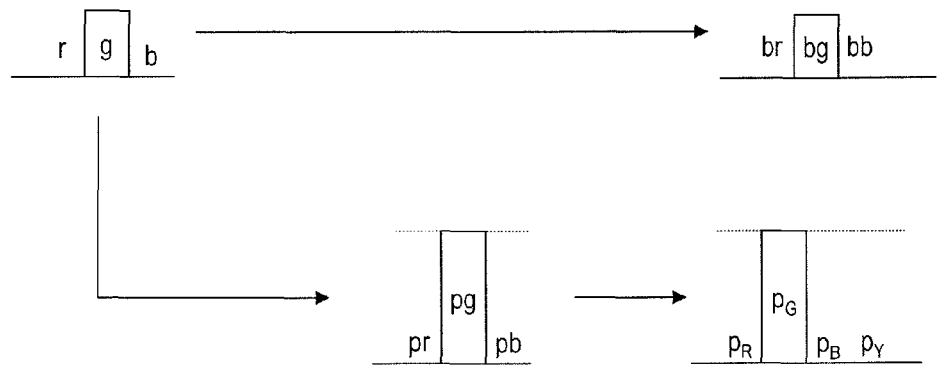
FIG. 8 is a schematic diagram showing luminance levels of an input video signal, relative intensities of a backlight, transmittance levels of a liquid crystal data signal, and relative transmittances of a liquid crystal panel in the liquid crystal display device shown in FIG. 7.

Next, with reference to FIG. 8, the relative transmittance of the liquid crystal panel 10 and the relative intensity of the backlight 20 in the liquid crystal display device 100 will be described. FIG. 8 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10 in the liquid crystal display device 100.

Herein the input video signal indicates green. For example, the grayscale levels (the luminance levels) r, g, and b of the input video signal satisfy the relationship of g>r=b=0, the luminance levels (r, g, b) are (0, 0.216, 0), and the grayscale levels (r, g, b) are (0, 128, 0).

The relative intensities br, bg, and bb of the backlight 20 are set based on the luminance levels r, g, and b of the input video signal. As described above, the magnitude correlation among the relative intensities br, bg, and bb of the backlight 20 is the same as the magnitude correlation among the luminance levels r, g, and b of the input video signal, and the relative intensities br, bg, and bb satisfy the relationship of bg>br=bb=0. For example, the relative intensities (br, bg, bb) are (0, 0.216, 0).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 0.216, 0), the transmittance levels (pr, pg, pb) of the liquid crystal data signal are (0, 1, 0), and the grayscale levels (pr, pg, pb) are represented by (0, 255, 0) in the 255 grayscale notation. As described above, the luminance level r is expressed by the product of the relative intensity br and the transmittance level pr. Similarly, the luminance level g is expressed by the product of the relative intensity bg and the transmittance level pg, and the luminance level b is expressed by the product of the relative intensity bb and the transmittance level pb.

The transmittance levels pr, pg, and pb are converted into the relative transmittances $p_R$, $p_G$, $p_B$, and $p_Y$ by multi-primary color conversion. In this case, the relative transmittances ($p_R$, $p_G$, $p_B$, $p_Y$) of the liquid crystal panel 10 are (0, 1, 0, 0), and the grayscale levels ($p_R$, $p_G$, $p_B$, $p_Y$) are represented by (0, 255, 0, 0) in the 255 grayscale notation. Thus, the relative intensities br, bg, and bb of the backlight 20 are substantially the same as the luminance levels r, g, and b of the input video signal. Among the luminance levels r, g, and b of the input video signal, transmittance levels pr, pg, and pb corresponding to luminance levels r, g, and b of the input video signal having the minimum value have the minimum value, and transmittance levels pr, pg, and pb corresponding to luminance levels r, g, and b higher than the minimum value have the maximum value. Accordingly, the power consumption of the backlight 20 can be reduced, and the contrast ratio can be increased.

Figure 9:
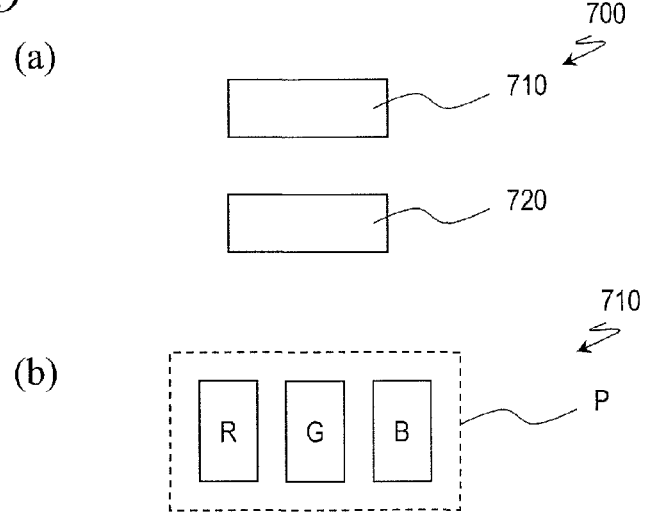
In FIG. 9, (a) is a schematic diagram of a liquid crystal display device in a comparative example 1, and (b) is a schematic diagram of a liquid crystal panel in the liquid crystal display device shown in (a).

Hereinafter the advantages of the liquid crystal display device 100 in this embodiment will be described as compared with liquid crystal display devices 700 and 800 in comparative examples 1 and 2. First, with reference to FIG. 9, the liquid crystal display device 700 in the comparative example 1 will be described.

FIG. 9(a) shows a schematic diagram of the liquid crystal display device 700 in the comparative example 1. The liquid crystal display device 700 includes a liquid crystal panel 710 and a backlight 720.

FIG. 9(b) shows a schematic diagram of the liquid crystal panel 710. In the liquid crystal panel 710, a pixel P includes a red sub-pixel R, a green sub-pixel G, and a blue sub-pixel B, and the liquid crystal panel 710 performs display with three primary colors. Such a liquid crystal panel 710 is also referred to as a three primary color panel. The size and the resolution of the liquid crystal panel 710 are substantially the same as those of the liquid crystal panel 10. The size of the pixel P of the liquid crystal display device 700 is the same as that of the pixel P of the liquid crystal display device 100.

The backlight 720 emits light of constant intensity in the driving of the liquid crystal display device 700. In the case where the liquid crystal display device 700 displays white, liquid crystal layers $LC_R$, $LC_G$, and $LC_B$ exhibit the maximum transmittances, respectively in the liquid crystal panel 710. In the case where the liquid crystal display device 700 displays black, the liquid crystal layers $LC_R$, $LC_G$, and $LC_B$ exhibit the minimum transmittances, respectively in the liquid crystal panel 710. Thus, in the liquid crystal display device 700, in accordance with the change of colors indicated by the input video signal, the transmittances of the liquid crystal layers $LC_R$, $LC_G$, and $LC_B$ of respective sub-pixels in the liquid crystal panel 710 are varied, thereby representing various colors.

Table 4 shows the luminance ratios of the red sub-pixel R, the green sub-pixel G, and the blue sub-pixels B in the liquid crystal display device 700 in the comparative example 1. For example, the luminance ratio of the red sub-pixel R shows the ratio of luminance in which the red sub-pixel R exhibits the maximum transmittance and the other sub-pixels (i.e., the green sub-pixel G and the blue sub-pixel B) exhibit the minimum transmittance with respect to the luminance when white (W) is displayed. Similarly, the luminance ratio of each of the green sub-pixel G and the blue sub-pixel B shows the ratio of luminance in which the corresponding sub-pixel exhibits the maximum transmittance and the other sub-pixels exhibit the minimum transmittance with respect to the luminance when white (W) is displayed. As described above, the backlight 720 emits light of constant intensity in the driving of the liquid crystal display device 700.

TABLE 4

| | Luminance Ratio |
|---|---|
| R | 24.6% |
| G | 56.6% |
| B | 18.8% |
| W | 100% |

Figure 10:
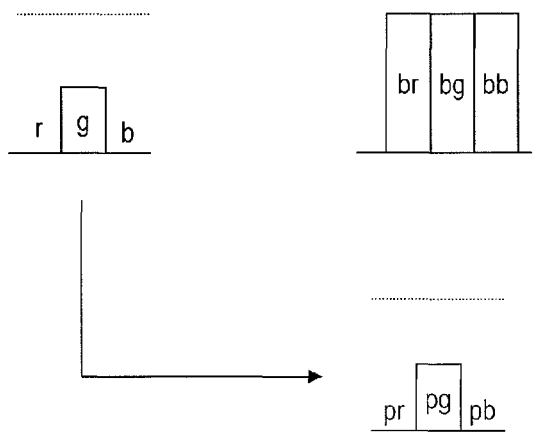
FIG. 10 is a schematic diagram showing luminance levels of an input video signal, relative intensities of a backlight, and relative transmittances of the liquid crystal panel in the liquid crystal display device in the comparative example 1.

FIG. 10 shows the luminance levels r, g and b of the input video signal, the relative intensities br, bg, and bb of the backlight 720, and the relative transmittances pr, pg, and pb of the liquid crystal panel 710, in the liquid crystal display device 700.

Herein the input video signal indicates green. For example, the luminance levels r, g, and b of the input video signal satisfy the relationship of g>r=b=0. The luminance levels (r, g, b) of the input video signal are (0, 0.216, 0), and the grayscale levels (r, g, b) are (0, 128, 0) in the 255 grayscale notation. In the liquid crystal display device 700, the backlight 720 emits light of constant intensity irrespective of the color indicated in the input video signal. Herein the relative intensities (br, bg, bb) of the backlight 720 are indicated by (1, 1, 1).

In the liquid crystal display device 700, the relative transmittances (the grayscale levels) pr, pg, and pb of the liquid crystal panel 710 are equal to the luminance levels (the grayscale levels) r, g, and b of the input video signal. Accordingly, as described above, in the case where the luminance levels r, g, and b of the input video signal satisfy the relationship of g>r=b=0, the relative transmittances pr, pg, and pb of the liquid crystal panel 710 satisfy the relationship of pg>pr=pb=0. Specifically, in the case where the luminance levels (r, g, b) of the input video signal are (0, 0.216, 0), the relative transmittances (pr, pg, pb) of the liquid crystal panel 710 are (0, 0.216, 0).

In the liquid crystal display device 700, voltages corresponding to the transmittance levels (pr, pg, pb) are applied across the liquid crystal layers. Accordingly, in the liquid crystal display device 700, the grayscale levels of red, green, and blue are (0, 128, 0).

Figure 11:
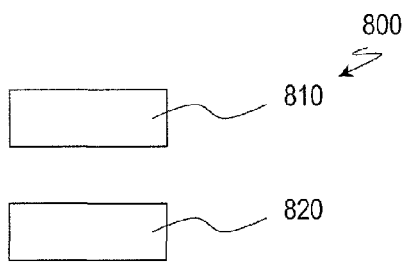
In FIG. 11, (a) is a schematic diagram of a liquid crystal display device in a comparative example 2, (b) is a schematic diagram of a liquid crystal panel in the liquid crystal display device shown in (a), and (c) is a schematic diagram of the liquid crystal display device shown in (a).
Figure 11:
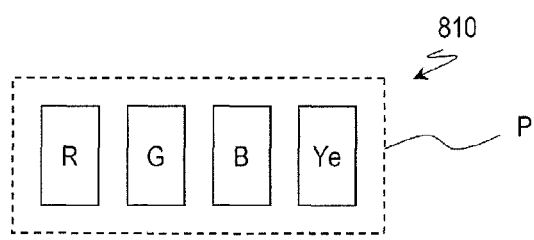
Figure 11:
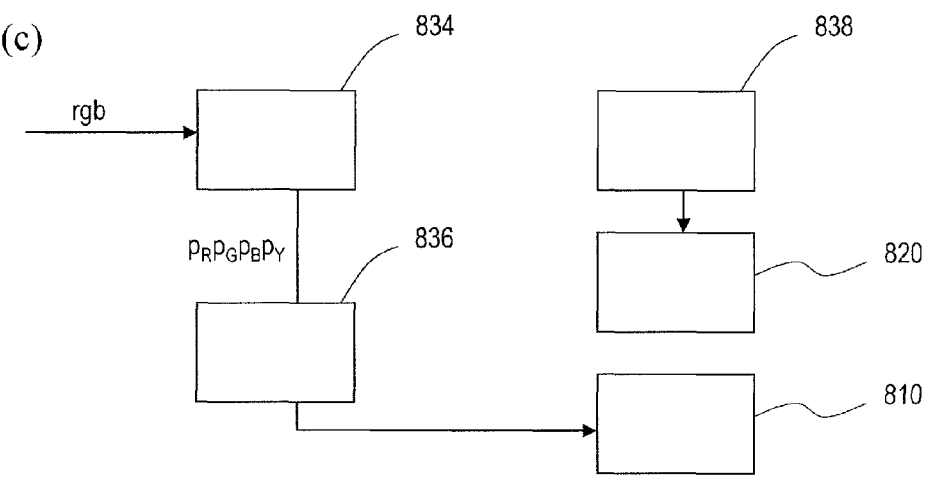

Next, with reference to FIG. 11, the liquid crystal display device 800 in the comparative example 2 will be described. FIG. 11(*a*) shows a schematic diagram of the liquid crystal display device 800 in the comparative example 2. The liquid crystal display device 800 includes a liquid crystal panel 810, and a backlight 820.

FIG. 11(*b*) shows a schematic diagram of the liquid crystal panel 810. Similarly to the liquid crystal panel 10, in the liquid crystal panel 810, a pixel P includes a red sub-pixel R, a green sub-pixel G, a blue sub-pixel B, and a yellow sub-pixel Ye, The liquid crystal panel 810 performs display with four primary colors. The size and the resolution of the liquid crystal panel 810 are substantially the same as those of the liquid crystal panel 710, and the size of the pixel P of the liquid crystal display device 800 is the same as that of the pixel P of the liquid crystal display device 700.

The backlight 820 emits light of constant intensity in the driving of the liquid crystal display device 800. In the case where the liquid crystal display device 800 displays white, liquid crystal layers $LC_R$, $LC_G$, $LC_B$, and $LC_Y$ exhibit the maximum transmittances, respectively. In the case where the liquid crystal display device 800 displays black, the liquid crystal layers $LC_R$, $LC_G$, $LC_B$, and $LC_Y$ exhibit the minimum transmittances, respectively. Thus, in the liquid crystal display device 800, in accordance with the change of colors indicated in the input video signal, the transmittances of the liquid crystal layers $LC_R$, $LC_G$, $LC_B$, and $LC_Y$ of the liquid crystal panel 810 are varied, and the luminance of the respective sub-pixels is changed, thereby representing various colors.

The control of the liquid crystal panel 810 and the backlight 820 is performed in the following manner. FIG. 11(*c*) shows the liquid crystal display device 800 provided with a control circuit 830. The control circuit 830 includes a multi-primary color converting portion 834, a panel driving circuit 836, and a backlight driving circuit 838. The multi-primary color converting portion 834 converts grayscale levels r, g, and b of an input video signal into grayscale levels $p_R$, $p_G$, $p_B$, and $p_Y$ of a panel signal. Generally, the color phase of color represented by the grayscale levels r, g, and b of the input video signal is substantially the same as the color phase of color represented by the grayscale levels $p_R$, $p_G$, $p_B$, and $p_Y$ of the panel signal. The backlight driving circuit 838 drives the backlight 820 so that light of constant intensity is emitted from the backlight 820 in the driving of the liquid crystal display device 800.

Table 5 shows the luminance ratios of the red sub-pixel R, the green sub-pixel G, the blue sub-pixels B, and the yellow sub-pixel Ye in the liquid crystal display device 800 in the comparative example 2. For example, the luminance ratio of the red sub-pixel R shows the ratio of luminance in which the red sub-pixel R exhibits the maximum transmittance and the other sub-pixels (i.e., the green sub-pixel G, the blue sub-pixel B, and the yellow sub-pixel Ye) exhibit the minimum transmittance with respect to the luminance when white (W) is displayed. Similarly, the luminance ratio of each of the green sub-pixel G, the blue sub-pixel B, and the yellow sub-pixel Ye indicates the ratio of luminance in which the corresponding sub-pixel exhibits the maximum transmittance and the other sub-pixels exhibit the minimum transmittance with respect to the luminance when white (W) is displayed.

TABLE 5

|  | Luminance Ratio |
|---|---|
| R | 10.7% |
| G | 33.8% |
| B | 11.8% |
| Ye | 43.7% |
| W | 100% |

Figure 12:
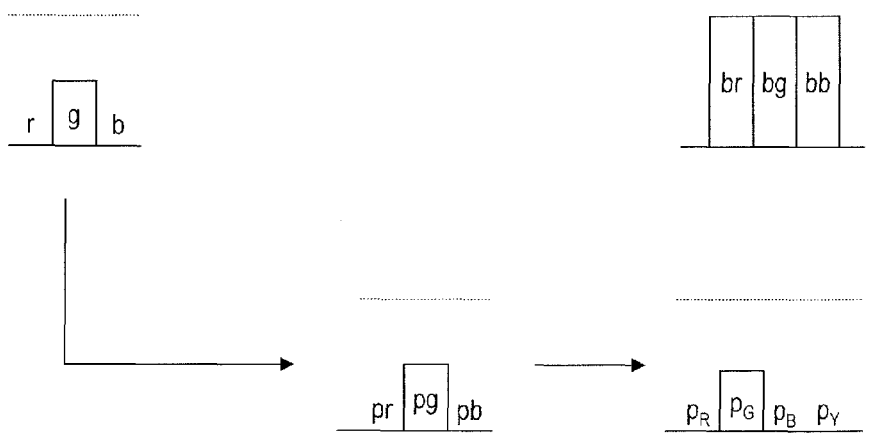
FIG. 12 is a schematic diagram showing luminance levels of an input video signal, relative intensities of a backlight, transmittance levels of a liquid crystal data signal, and relative transmittances of the liquid crystal panel in the liquid crystal display device in the comparative example 2.

FIG. 12 shows luminance levels r, g and b of the input video signal, relative intensities br, bg, and bb of the backlight 820, transmittance levels pr, pg, and pb of a liquid crystal data, and relative transmittances $p_R$, $p_G$, $p_B$, and $p_Y$ of the liquid crystal panel 810, in the liquid crystal display device 800.

Herein the input video signal also indicates green. For example, the luminance levels r, g, and b of the input video signal satisfy the relationship of g>r=b=0. The luminance levels (r, g, b) of the input video signal are (0, 0.216, 0), and the grayscale levels (r, g, b) are (0, 128, 0) in the 255 grayscale notation. In the liquid crystal display device 800, the backlight 820 emits light of constant intensity irrespective of the color indicated in the input video signal. Herein the relative intensities (br, bg, bb) are indicated by (1, 1, 1).

In the liquid crystal display device 800, the transmittance levels (the grayscale levels) pr, pg, and pb of the liquid crystal data signal are the same as the luminance levels (the grayscale levels) r, g, and b of the input video signal. Accordingly, as described above, in the case where the luminance levels r, g, and b of the input video signal satisfy the relationship of g>r=b=0, the transmittance levels pr, pg, and pb of the liquid crystal data signal also satisfy the relationship of pg>pr=pb=0. Specifically, in the case where the luminance levels (r, g, b) of the input video signal are (0, 0.216, 0), the transmittance levels (pr, pg, pb) of the liquid crystal data signal are (0, 0.216, 0), and the grayscale levels (pr, pg, pb) are (0, 128, 0) in the 255 grayscale notation.

In the liquid crystal display device 800, multi-primary color conversion is performed. The relative transmittances ($p_R$, $p_G$, $p_B$, $p_Y$) of the liquid crystal panel 810 are (0, 0.216, 0, 0), and the grayscale levels ($p_R$, $p_G$, $p_B$, $p_Y$) are (0, 128, 0, 0) in the 255 grayscale notation.

As is understood from the comparison between FIG. 8, and FIG. 10 and FIG. 12, in the liquid crystal display devices 700 and 800, the light of constant intensity emitted from the backlights 720 and 820 is modulated in the liquid crystal panels 710 and 810. On the other hand, in the liquid crystal display device 100, the light modulation is performed in the backlight 20. The liquid crystal panel 10 makes the relative transmittance of a sub-pixel related to the light from the backlight 20 to be the maximum value, and makes the relative transmittances of sub-pixels not related to the light from the backlight 20 to be the minimum value. Thus, in the liquid crystal display devices 700 and 800, light of constant intensity is emitted from the backlights 720 and 820. In the liquid crystal display device 100, the light sources 22R and 22B are turned off in accordance with the input video signal, and additionally the intensity of the light source 22G can be reduced. Accordingly, the power consumption of the backlight 20 can be reduced.

In the above description, the color indicated in the input video signal is green. However, even if the color indicated in the input video signal is an arbitrary color, the power consumption can be reduced and the contrast ratio can be increased, for the same reasons.

In the liquid crystal display device 700 in the comparative example 1, display is performed with three primary colors. In the liquid crystal display device 100 in this embodiment, and in the liquid crystal display device 800 in the comparative example 2, display is performed with four primary colors. Accordingly, display can be performed in wide color reproduction range. However, in the liquid crystal display device 800 in the comparative example 2, color of high brightness cannot be displayed in some cases.

Hereinafter, normalized luminance in the case where an input video signal indicating a specific color is input will be described in the liquid crystal display device 700 in the comparative example 1, in the liquid crystal display device 800 in the comparative example 2, and in the liquid crystal display device 100 in this embodiment.

First, normalized luminance in the case where the input video signal indicates yellow of high brightness is compared among the liquid crystal display device 700 in the comparative example 1, the liquid crystal display device 800 in the comparative example 2, and the liquid crystal display device 100 in this embodiment. The configurations of the liquid crystal display devices 700 and 800 in the comparative examples 1 and 2 are described above with reference to FIG. 9 and FIG. 11, so that overlapping descriptions are omitted for avoiding verbose descriptions.

In the case where the input video signal indicates yellow of high brightness, for example, in the case where the grayscale levels (r, g, b) are (255, 255, 0), the liquid crystal display device 700 in the comparative example 1 makes the liquid crystal layers $LC_R$ and $LC_G$ in the liquid crystal panel 710 to have the maximum transmittances. In this case, the normalized luminance is 0.812 (=0.246+0.566).

In the case where the input video signal indicates yellow of high brightness, for example, in the case where the grayscale levels (r, g, b) of the input video signal are (255, 255, 0), the liquid crystal display device 800 in the comparative example 2 makes the liquid crystal layers $LC_R$, $LC_G$ and $LC_Y$ in the liquid crystal panel 810 to have the maximum transmittances. In this case, the normalized luminance is 0.882 (=0.107+0.338+0.437). In this way, the liquid crystal display device 800 in the comparative example 2 can display yellow of high brightness similarly to the liquid crystal display device 700 in the comparative example 1.

Similarly, in the case where yellow of high brightness is displayed, for example, in the case where the grayscale levels (r, g, b) of the input video signal are (255, 255, 0), the relative intensities (br, bg, bb) of the backlight 20 are (1, 1, 0), and the grayscale levels ($p_R$, $p_G$, $p_B$ $p_Y$) of the liquid crystal panel 10 are (255, 255, 0, 255) in the 255 grayscale notation, in the liquid crystal display device 100 in this embodiment. In this case, the normalized luminance is 0.882. In this way, the liquid crystal display device 100 can display yellow of high brightness similarly to the liquid crystal display devices 700 and 800 in the comparative examples 1 and 2.

As described above, the liquid crystal display device 800 in the comparative example 2 can display yellow of high brightness similarly to the liquid crystal display device 700 in the comparative example 1. However, the liquid crystal display device 800 in the comparative example 2 cannot display other colors (chromatic colors) with high brightness.

Figure 13:
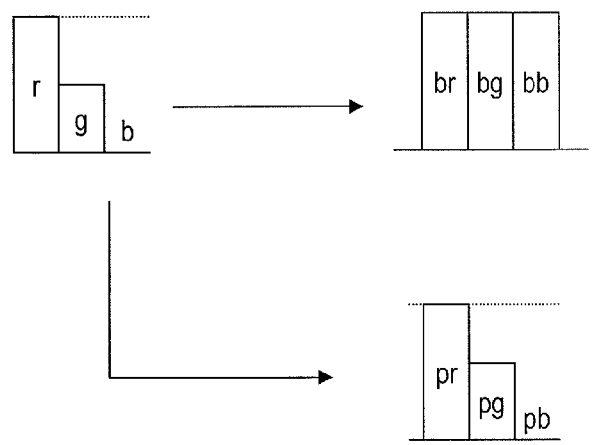
FIG. 13 is a schematic diagram showing luminance levels of the input video signal, relative intensities of the backlight, and relative transmittances of the liquid crystal panel in the liquid crystal display device in the comparative example 1.

Hereinafter with reference to FIG. 13, the liquid crystal display device 700 in the comparative example 1 will be described. FIG. 13 shows luminance levels r, g, and b of the input video signal, relative intensities br, bg, and bb, of the backlight 720, and relative transmittances pr, pg, and pb of the liquid crystal panel 710 in the liquid crystal display device 700.

Herein the input video signal indicates orange. For example, the luminance levels r, g, and b of the input video signal satisfy the relationship of r>g>b=0. The luminance levels (r, g, b) of the input video signal are (1, 0.216, 0), and the grayscale levels (r, g, b) are (255, 128, 0). In the liquid crystal display device 700, irrespective of the color indicated by the input video signal, the backlight 720 emits light of constant intensity. Herein the relative intensities (br, bg, bb) of the backlight 720 are indicated by (1, 1, 1).

In the liquid crystal display device 700, the transmittance levels (the grayscale levels) pr, pg, and pb of the liquid crystal data signal are equal to the luminance levels (the grayscale levels) r, g, b of the input video signal. Accordingly, as described above, in the case where the luminance levels r, g, and b of the input video signal satisfy the relationship of r>g>b=0, the transmittance levels pr, pg, and pb of the liquid crystal data signal also satisfy the relationship of pr>pg>pb=0. Specifically, in the case where the luminance levels (r, g, b) of the input video signal are (1, 0.216, 0), the transmittance levels (pr, pg, pb) of the liquid crystal data signal are (1, 0.216, 0).

In the liquid crystal display device 700, voltages corresponding to the transmittance levels (pr, pg, pb) are applied across the liquid crystal layers. As described above, in the liquid crystal display device 700, the red, green, and blue sub-pixels R, G, and B exhibit the luminance corresponding to the luminance levels r, g, and b.

In the liquid crystal display device 700 in the comparative example 1, the grayscale levels (r, g, b) of the red, green, and blue sub-pixels are (255, 128, 0). In this case, the normalized luminance is 0.368 (=0.246×(255/255)$^{2.2}$+0.566×(128/255)$^{2.2}$+0.188×(0/255)$^{2.2}$). Table 6 shows the grayscale levels of the respective sub-pixels in the liquid crystal panel 710 and the normalized luminance.

TABLE 6

|  | R | G | B | Normalized luminance |
|---|---|---|---|---|
| Grayscale level in Comparative Example 1 | 255 | 128 | 0 | 0.368 |

Figure 14:
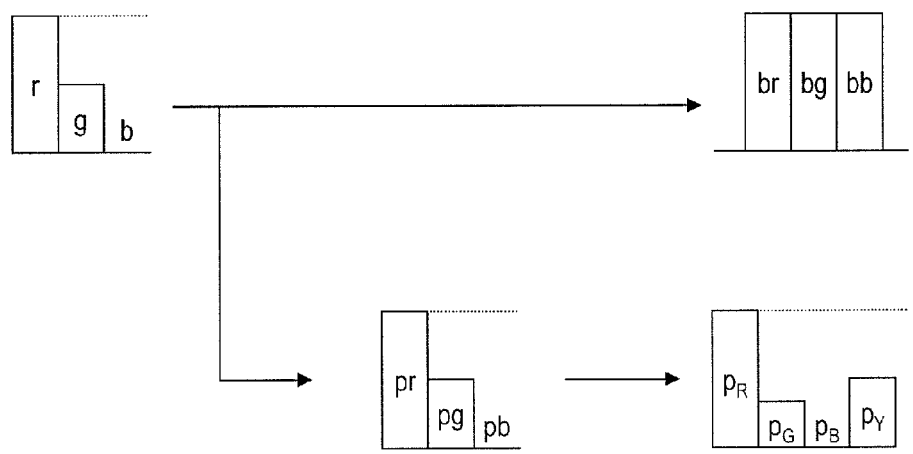
FIG. 14 is a schematic diagram showing luminance levels of the input video signal, relative intensities of the backlight, transmittance levels of the liquid crystal data signal, and relative transmittances of the liquid crystal panel in the liquid crystal display device in the comparative example 2.

Next, with reference to FIG. 14, the liquid crystal display device 800 in the comparative example 2 will be described. FIG. 14 shows luminance levels r, g, and b of the input video signal, relative intensities br, bg, and bb of the backlight 820, transmittance levels pr, pg, and pb of the liquid crystal data signal, and relative transmittances $p_R$, $p_G$, $p_B$, and $p_Y$ of the liquid crystal panel 810 in the liquid crystal display device 800.

Also herein the input video signal indicates orange. For example, the luminance levels r, g, and b of the input video signal satisfy the relationship of r>g>b=0. The luminance levels (r, g, b) of the input video signal are (1, 0.216, 0), and the grayscale levels (r, g, b) are (255, 128, 0). In the liquid crystal display device 800, irrespective of the color indicated in the input video signal, the backlight 820 emits light of constant intensity. Herein the relative intensities (br, bg, bb) of the backlight 820 are indicated by (1, 1, 1).

In the liquid crystal display device 800, the transmittance levels (the grayscale levels) pr, pg, and pb of the liquid crystal data signal are equal to the luminance levels (the grayscale levels) r, g, b of the input video signal. The transmittance levels pr, pg, and pb of the liquid crystal data signal also satisfy the relationship of pr>pg>pb=0. Specifically, in the case where the luminance levels (r, g, b) of the input video signal are (1, 0.216, 0), the transmittance levels (pr, pg, pb) of the liquid crystal data signal are (1, 0.216, 0).

In the liquid crystal display device 800, multi-primary color conversion is performed. The relative transmittances ($p_R$, $p_G$, $p_B$, $p_Y$) of the liquid crystal panel 810 are (1, 0, 0, 0.276), and the grayscale levels ($p_R$, $p_G$, $p_B$, $p_Y$) are represented by (255, 0, 0, 142) in the 255 grayscale notation. The normalized luminance in the liquid crystal display device 800 is 0.226 ($=0.107\times(255/255)^{2.2}+0.338\times(0/255)^{2.2}+0.118\times(0/255)^{2.2}+0.437\times(142/255)^{2.2}$). Table 7 shows the grayscale levels of the respective sub-pixels in the liquid crystal panel 810 and the normalized luminance in the liquid crystal display device 800. In Table 7, the values of the liquid crystal display device 700 in the comparative example 1 are also shown for reference.

TABLE 7

|  | R | G | B | Ye | Normalized luminance |
|---|---|---|---|---|---|
| Grayscale level in Comparative Example 1 | 255 | 128 | 0 | — | 0.368 |
| Grayscale level in Comparative Example 2 | 255 | 0 | 0 | 142 | 0.226 |

As shown in the table, the normalized luminance of the liquid crystal display device 800 in the comparative example 2 is low, so that orange of high brightness cannot be displayed. Although the detailed description is omitted, the liquid crystal display device 800 in the comparative example 2 cannot display yellowish green of high brightness for the same reason. Thus, in the liquid crystal display device 800 in the comparative example 2, chromatic colors other than yellow cannot be displayed with high brightness. It is considered that the reason why is that in the case where the size of a pixel P of the liquid crystal display device 800 is equal to that of a pixel P of the liquid crystal display device 700, the area of the red sub-pixel R, the green sub-pixel G, and the blue sub-pixel B in the liquid crystal panel 810 is smaller than the area of the red sub-pixel R, the green sub-pixel G, and the blue sub-pixel B in the liquid crystal panel 710.

Figure 15:
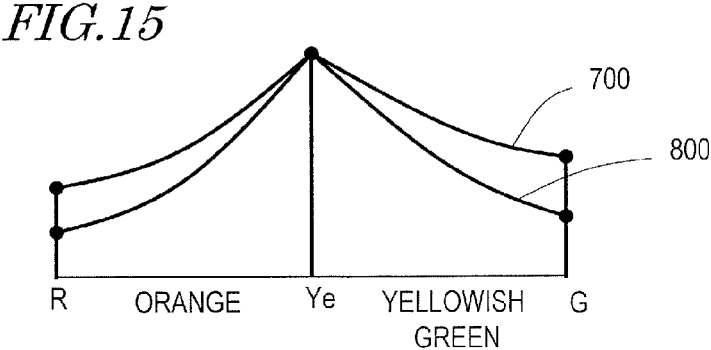
FIG. 15 is a graph showing normalized luminance of the liquid crystal display devices in the comparative examples 1 and 2 in the case where the color phase of color indicated in an input video signal is varied in the range from red to green via yellow.

FIG. 15 shows the normalized luminance of the liquid crystal display devices 700 and 800 in the case where the color phase of color indicated in the input video signal is varied in the range from red to green via yellow.

As described above, in the case where the input video signal indicates yellow of high brightness, the luminance of the liquid crystal display device 800 is the same as that of the liquid crystal display device 700. On the contrary, in the case where the input video signal indicates red of high brightness, the luminance of the liquid crystal display device 800 is lower than that of the liquid crystal display device 700. In the case where the input video signal indicates green of high brightness, the luminance of the liquid crystal display device 800 is lower than that of the liquid crystal display device 700.

As is understood from FIG. 15, in the case where the intermediate color between yellow and red (i.e. orange) is displayed with high brightness, the luminance of the liquid crystal display device 800 is lower than that of the liquid crystal display device 700. Similarly, in the case where the intermediate color between yellow and green (i.e. yellowish green) is displayed with high brightness, the luminance of the liquid crystal display device 800 is lower than that of the liquid crystal display device 700. As described above, the liquid crystal display device 800 in the comparative example 2 cannot display specific chromatic colors with the same brightness as that of the liquid crystal display device 700 which performs display with three primary colors.

On the contrary, the liquid crystal display device 100 in this embodiment can perform display in a wider color reproduction range than that of the liquid crystal display device 700 in the comparative example 1. In addition, the liquid crystal display device 100 in this embodiment can display colors of higher brightness as compared with the liquid crystal display device 800 in the comparative example 2.

Figure 16:
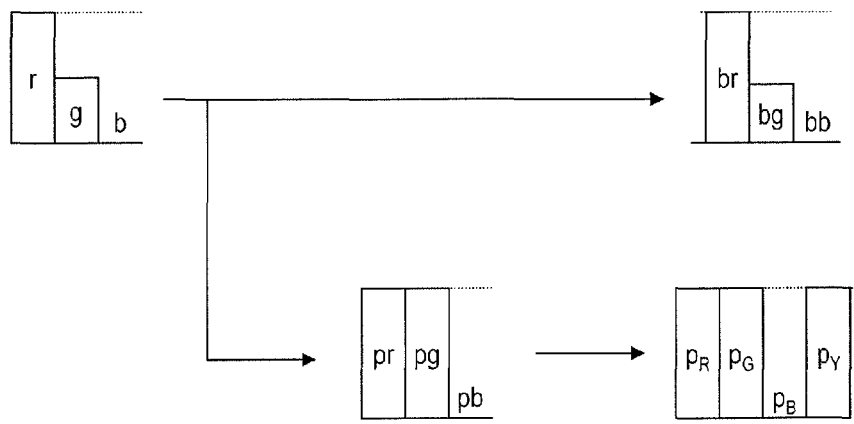
FIG. 16 is a schematic diagram showing luminance levels of the input video signal, relative intensities of the backlight, transmittance levels of a liquid crystal data signal, and relative transmittances of the liquid crystal panel in the liquid crystal display device shown in FIG. 1.

Hereinafter, with reference to FIG. 16, the relative transmittance of the liquid crystal panel 10 and the relative intensity of the backlight 20 in the liquid crystal display device 100 will be described. FIG. 16 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10 in the liquid crystal display device 100.

Also herein the input video signal indicates orange. For example, the luminance levels r, g, and b of the input video signal satisfy the relationship of r>g>b=0. The luminance levels (r, g, b) of the input video signal are (1, 0.216, 0), and the grayscale levels (r, g, b) are (255, 128, 0) in the 255 grayscale notation.

The magnitude correlation among the relative intensities br, bg, and bb of the backlight 20 is the same as the magnitude correlation among the grayscale levels r, g, and b of the input video signal. Accordingly, the relationship of r>g>b=0 is satisfied, the relative intensities br, bg, and bb of the backlight 20 satisfy the relationship of br>bg>bb=0. For example, the relative intensities br, bg, and bb of the backlight 20 are substantially equal to the luminance levels r, g, and b. Accordingly, in the case where the luminance levels (r, g, b) of the input video signal are (1, 0.216, 0), the relative intensities (br, bg, bb) are (1, 0.216, 0). Table 8 shows the relative intensities (br, bg, bb) of the backlight 20.

TABLE 8

| Embodiment 1 | br | bg | bb |
|---|---|---|---|
| Relative Intensity of Backlight | 1 | 0.216 | 0 |

In the liquid crystal display device 100, the transmittance levels pr, pg, and pb of the liquid crystal data signal are set based on the luminance levels r, g, b of the input video signal. In the case where the luminance levels r, g, and b of the input video signal satisfy the relationship of r>g>b=0, the grayscale levels pr and pg have the maximum value, and the grayscale level pb has the minimum value. For example, in the case where the luminance levels (r, g, b) of the input video signal are (1, 0.216, 0), the transmittance levels (pr, pg, pb) of the liquid crystal data signal are (1, 1, 0), and the grayscale levels (pr, pg, pb) are represented by (255, 255, 0) in the 255 grayscale notation.

Thereafter, by the multi-primary color conversion, the relative transmittances ($p_R$, $p_G$, $p_B$, $p_Y$) of the liquid crystal panel 10 are (1, 1, 0, 1), and the grayscale levels ($p_R$, $p_G$, $p_B$, $p_Y$) are represented by (255, 255, 0, 255) in the 255 grayscale notation. Table 9 shows the grayscale levels of the liquid crystal panel 10. The grayscale level of 255 of the liquid crystal panel corresponds to the relative transmittance of 1, and the grayscale level of 0 of the liquid crystal panel corresponds to the relative transmittance of 0.

TABLE 9

| Embodiment 1 | Red sub-pixel | Green sub-pixel | Blue sub-pixel | Yellow sub-pixel |
| --- | --- | --- | --- | --- |
| Grayscale level of Liquid crystal panel | 255 | 255 | 0 | 255 |

Thus, in the case where the liquid crystal panel 10 and the backlight 20 are driven, the normalized luminance of the liquid crystal display device is 0.348.

As is understood from the comparison between FIG. 14 and FIG. 16, in the liquid crystal display device 800, the light of constant intensity emitted from the backlight 820 is modulated in the liquid crystal panel 810. On the other hand, in the liquid crystal display device 100, the light sources 22R and 22G related to orange to be displayed are turned on, and the light source 22B which is not related to orange to be displayed is turned off. In addition, the intensity of the light source 22G is made to be lower than the maximum value. Since the backlight 20 performs such light modulation, the power consumption of the backlight 20 can be reduced. In the liquid crystal display device 800, the light emitted from the backlight 820 with constant intensity is modulated in the liquid crystal panel 810. On the other hand, in the liquid crystal display device 100, the light modulation is performed in the backlight 20, and in addition, the liquid crystal panel 10 makes the relative transmittance of a sub-pixel related to the light from the backlight 20 to be the maximum value, and the relative transmittance of a sub-pixel not related to the light from the backlight 20 to be the minimum value. Accordingly, the contrast ratio can be increased.

As described above, the normalized luminance of the liquid crystal display device 800 is 0.226, but the normalized luminance of the liquid crystal display device 100 in this embodiment is 0.348. This is because the grayscale levels $p_R$, $p_G$, and $p_Y$ of the liquid crystal panel 10 are the maximum value, and the light of the light sources 22R and 22G which are turned on is efficiently transmitted through the liquid crystal panel 10 in the liquid crystal display device 100. Accordingly, the liquid crystal display device 100 can display orange of high brightness.

In the above description, for example, in the case where the grayscale level r of the input video signal is the minimum value, the relative intensity br of the backlight 20 exhibits the minimum value, and the grayscale level $p_R$ of the liquid crystal panel 10 exhibits the minimum value. However, the present invention is not limited to this. Alternatively, in the case where the grayscale level r of the input video signal is the minimum value, the grayscale level $p_R$ may be an arbitrary value, and the relative intensity br of the backlight 20 may exhibit the minimum value. Alternatively, in the case where the grayscale level r of the input video signal is the minimum value, the relative intensity br of the backlight 20 may be an arbitrary value, and the grayscale level $p_R$ may exhibit the minimum value.

Strictly speaking, even in the case where the relative intensity br of the backlight 20 is the minimum value (i.e. even in the case where the light source 22R of the backlight 20 is turned off), part of light emitted from another light source may sometimes be transmitted through the red sub-pixel R. Similarly, even in the case where the grayscale level $p_R$ in the liquid crystal panel 10 is the minimum value, the light emitted from the light source 22R of the backlight 20 may sometimes be transmitted through the liquid crystal panel 10. For this reason, in the case where the grayscale level r of the input video signal is the minimum value, it is preferred that the grayscale level $p_R$ may be the minimum value. Accordingly, high contrast ratio can be realized. As for the grayscale levels g and b of the input video signal, the same may be described.

In the above description, the color indicated in the input video signal is orange, but the color indicated in the input video signal may be any other color.

Figure 17:
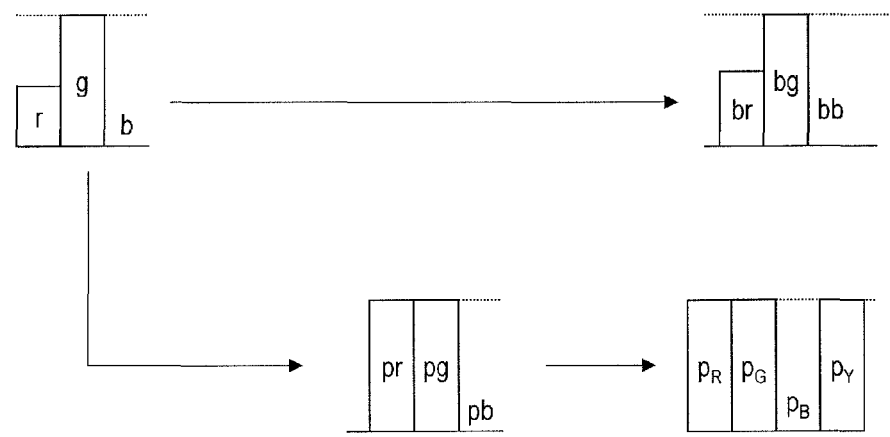
FIG. 17 is a schematic diagram showing luminance levels of the input video signal, relative intensities of the backlight, transmittance levels of the liquid crystal data signal, and relative transmittances of the liquid crystal panel in the liquid crystal display device shown in FIG. 1.

FIG. 17 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10 in the liquid crystal display device 100 in the case where the input video signal indicates yellowish green. Herein the input video signal indicates yellowish green, the luminance levels r, g, and b of the input video signal satisfy the relationship of g>r>b=0, the luminance levels (r, g, b) of the input video signal are (0.216, 1, 0), and the grayscale levels (r, g, b) are (128, 255, 0), for example.

The relative intensities br, bg, and bb of the backlight 20 are set based on the luminance levels r, g, and b of the input video signal. In the case where the luminance levels r, g, and b satisfy the relationship of g>r>b=0, the relative intensities br, bg, and bb of the backlight 20 satisfy the relationship of bg>br>bb=0. Specifically, in the case where the luminance levels (r, g, b) of the input video signal are (0.216, 1, 0), the relative intensities (br, bg, bb) are (0.216, 1, 0).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r>b=0, the grayscale levels pr and pg corresponding to the luminance levels r and g have the maximum values, and the grayscale level pb corresponding to the luminance level b has the minimum value. For example, in the case where the luminance levels (r, g, b) of the input video signal are (0.216, 1, 0), the transmittance levels (pr, pg, pb) of the liquid crystal data signal are (1, 1, 0), and the grayscale levels (pr, pg, pb) are represented by (255, 255, 0) in the 255 grayscale notation. By the multi-primary color conversion, the relative transmittances ($p_R$, $p_G$, $p_B$, $p_Y$) of the liquid crystal panel 10 are (1, 1, 0, 1) and the grayscale levels ($p_R$, $p_G$, $p_B$, $p_Y$) are represented by (255, 255, 0, 255) in the 255 grayscale notation.

Figure 18:
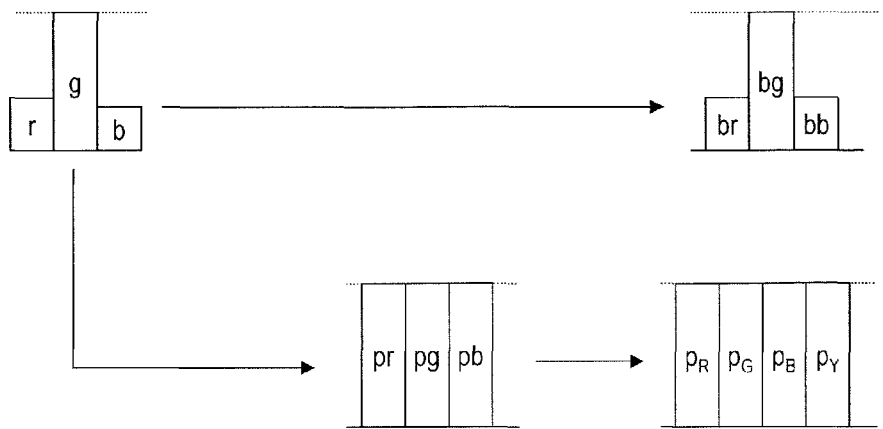
FIG. 18 is a schematic diagram showing luminance levels of the input video signal, relative intensities of the backlight, transmittance levels of the liquid crystal data signal, and relative transmittances of the liquid crystal panel in the liquid crystal display device shown in FIG. 1.

FIG. 18 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10 in the liquid crystal display device 100 in the case where the input video signal indicates light green. Herein the input video signal indicates light green, the luminance levels r, g, and b of the input video signal satisfy the relationship of g>r=b>0, the luminance levels (r, g, b) of the input video signal are (0.216, 1, 0.216), and the grayscale levels (r, g, b) are (128, 255, 128), for example.

The relative intensities br, bg, and bb of the backlight 20 are set based on the luminance levels r, g, and b of the input video signal. In the case where the luminance levels r, g, and b satisfy the relationship of g>r=b>0, the relative intensities br, bg, and bb of the backlight 20 satisfy the relationship of bg>br=bb>0. Specifically, in the case where the luminance levels (r, g, b) of the input video signal are (0.216, 1, 0.216), the relative intensities (br, bg, bb) are (0.216, 1, 0.216).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b>0, the grayscale levels pr, pg, and pb corresponding to the luminance levels r, g and b have the maximum value. For example, in the case where the luminance levels (r, g, b) of the input video signal are (0.216, 1, 0.216), the transmittance levels (pr, pg, pb) of the liquid crystal data signal are (1, 1, 1), and the grayscale levels (pr, pg, pb) are represented by (255, 255, 255) in the 255 grayscale notation. By the multi-primary color conversion, the relative transmittances $(p_R, p_G, p_B, p_Y)$ of the liquid crystal panel 10 are (1, 1, 1, 1), and the grayscale levels $(p_R, p_G, p_B, p_Y)$ are represented by (255, 255, 255, 255).

Figure 19:
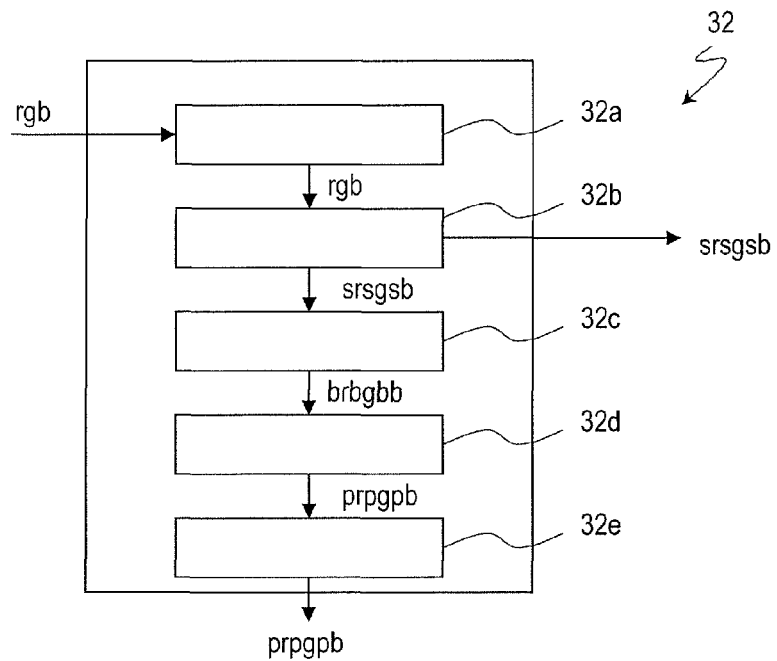
FIG. 19 is a schematic diagram showing the configuration of an active drive processing portion shown in FIG. 7.

With reference to FIG. 19, the configuration of the active drive processing portion 32 will be described. FIG. 19 is a schematic diagram of the active drive processing portion 32. The active drive processing portion 32 includes a gamma converting portion 32*a*, a light source intensity determining portion 32*b*, a backlight intensity determining portion 32*c*, a panel transmission determining portion 32*d*, and a gamma converting portion 32*e*.

The gamma converting portion 32*a* performs inverse gamma correction for the grayscale levels r, g, and b of the input video signal. Generally, the input video signal is subjected to the gamma correction processing, and the input video signal indicates the grayscale levels r, g, and b which are nonlinear with respect to the luminance. In the gamma converting portion 32*a*, the inverse gamma correction processing is performed for the input video signal, so that the grayscale levels r, g, and b are converted so as to be linear with respect to the luminance of the respective primary colors, thereby obtaining luminance levels r, g, and b.

The light source intensity determining portion 32*b* determines the relative intensities sr, sg, and sb of the light sources 22R, 22G, and 22B of the backlight 20 based on the luminance levels r, g, and b. The relative intensities sr, sg, and sb may be set based on the sampling results of the luminance levels r, g, and b of the input video signal. Alternatively, the relative intensities sr, sg, and sb may be determined based on the respective maximum value of each of the luminance levels r, g, and b of the input video signal. Alternatively, the relative intensities sr, sg, and sb may be determined based on the mean value of each of the luminance levels r, g, and b of the input video signal. Alternatively, the relative intensities sr, sg, and sb may be determined based on the weighted average of the mean value and the maximum value of each of the luminance levels r, g, and b of the input video signal. The maximum value, the mean value, and the weighted average of them are described in International Publication No. WO 2009/054223, for example. Thereafter, the light source intensity determining portion 32*b* outputs a light source signal indicating the relative intensities sr, sg, and sb to the backlight driving circuit 38.

The backlight intensity determining portion 32*c* calculates the relative intensities br, bg, and bb from the backlight 20 based on the relative intensities sr, sg, and sb. The relative intensities br, bg, and bb are obtained by light diffusion filter and linear interpolation.

The panel transmission determining portion 32*d* determines the transmission levels pr, pg, and pb of red, green, and blue of the three primary color liquid crystal display device from the relationship between the luminance levels r, g, and b of the input video signal and the relative intensities br, bg, and bb of the backlight 20. The transmittance levels pr, pg, and pb correspond to the relative transmittances of the red, green, and blue liquid crystal layers $LC_R$, $LC_G$, and $LC_B$ in the three primary color liquid crystal display device, and the transmittance levels pr, pg, and pb have linear relationships with respect to the luminance (the intensities of emitted light). In the above description, all of the pixels exhibit the same color in the input video signal and the intensities of light emitted from the backlight 20 are the same for pixels p. However, in the case where the pixels exhibit different colors in the input video signal, and/or in the case where the intensities of light emitted from the backlight 20 are different for the pixels P, the transmittance levels pr, pg, and pb are different depending on the respective pixel P.

Thereafter, the gamma converting portion 32*e* converts the transmittance levels pr, pg, and pb to grayscale levels pr, pg, and pb. Specifically, the gamma converting portion 32*e* performs gamma correction processing for the transmission levels pr, pg, and pb, thereby determining the grayscale levels pr, pg, and pb having nonlinear relationship with respect to the luminance.

(Embodiment 2)

Figure 20:
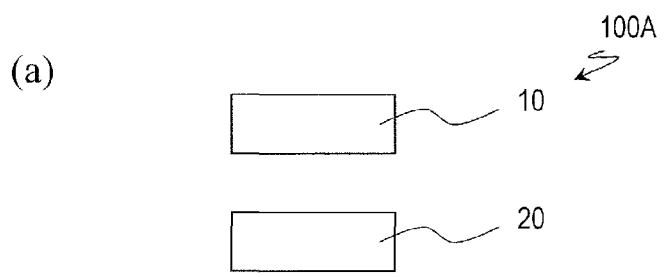
In FIG. 20, (a) is a schematic diagram of a liquid crystal display device in a second embodiment of the present invention, and (b) is a schematic diagram of a liquid crystal panel in the liquid crystal display device shown in (a).
Figure 20:
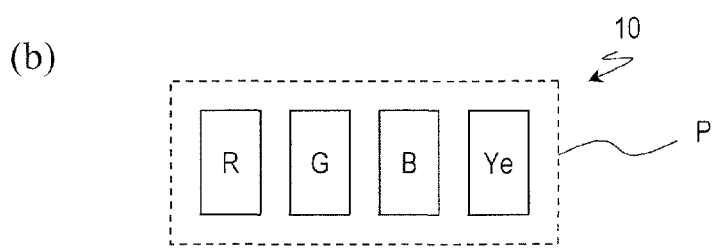

Hereinafter a liquid crystal display device in a second embodiment of the present invention will be described. FIG. 20(*a*) shows a schematic diagram of the liquid crystal display device 100A in this embodiment. The liquid crystal display device 100A is provided with a liquid crystal panel 10 and a backlight 20.

FIG. 20(*b*) shows a schematic diagram of a pixel P in the liquid crystal panel 10. Also herein, the pixel P includes a red sub-pixel R, a green sub-pixel G, a blue sub-pixel B, and a yellow sub-pixel Ye. As described above with reference to FIG. 1(*d*) and FIG. 1(*e*), the backlight 20 includes a light source unit 22 having light sources 22R, 22G, and 22B.

Figure 21:
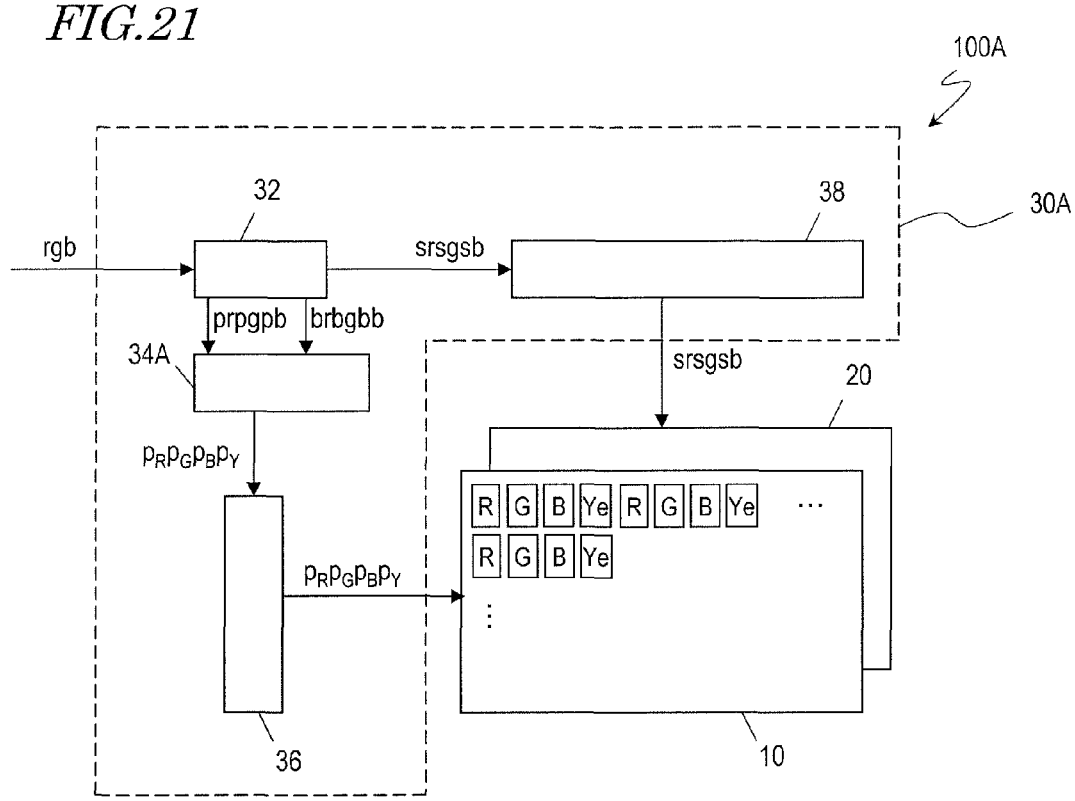
FIG. 21 is a schematic diagram showing an example of the liquid crystal display device shown in FIG. 20.

FIG. 21 shows a schematic diagram of the liquid crystal display device 100A provided with a control circuit 30A. The control circuit 30A controls the liquid crystal panel 10 and the backlight 20 based on an input video signal. The control circuit 30A includes an active drive processing portion 32, a multi-primary color converting portion 34A, a panel driving circuit 36, and a backlight driving circuit 38. The control circuit 30A has the same configuration as that of the control circuit 30 described above with reference to FIG. 7, so that overlapping descriptions are omitted in order to avoid verbose descriptions.

The active drive processing circuit 32 generates a light source signal and a liquid crystal data signal based on the input video signal. The light source signal indicates relative intensities sr, sg, and sb of the light sources 22R, 22G, and 22B. The relative intensities sr, sg, and sb of the light sources 22R, 22G, and 22B are set based on the luminance levels r, g, and b of the input video signal. The backlight driving circuit 38 drives the light sources 22R, 22G, and 22B of the backlight 20 based on the light source signal. At this time, light of relative intensities br, bg, and bb is emitted from the backlight 20.

The active drive processing portion 32 generates a backlight signal from the light source signal. The backlight signal indicates the relative intensities br, bg, and bb of the backlight 20. In the active drive processing portion 32, the relative intensities br, bg, and bb of the backlight 20 are obtained from the relative intensities sr, sg, and sb. As described above, the relative intensities br, bg, and bb are set depending on the luminance levels r, g, and b of the input video signal. For example, the magnitude correlation among the relative intensities br, bg, and bb may be the same as the magnitude correlation among the luminance levels r, g, and b, or the relative intensities br, bg, and bb may be substantially equal to the luminance levels r, g, and b.

Alternatively, the relative intensities br, bg, and bb may be determined in any other conditions based on the luminance levels r, g, and b. The relative intensities br, bg, and bb of the backlight 20 may be higher than the luminance levels r, g, and b in accordance with the input video signal. As described above, in the case where all of the pixels exhibit the same color in the input video signal, the relative intensities br, bg, and bb of the backlight 20 may be equal to the luminance levels r, g, and b of the input video signal. On the other hand, in the case where the pixels exhibit different colors in the input video signal, the relative intensities br, bg, and bb of the backlight 20 may sometimes be higher than the luminance levels r, g, and b of the input video signal. Specifically, in the input video signal, in the case where grayscale levels of red are different among a plurality of pixels corresponding to a certain light source unit 22, the relative intensity br of the backlight 20 is set in accordance with the maximum value of the grayscale level r, and the relative intensity br is higher than the grayscale level r of the other pixels. Similarly, in the input video signal, grayscale levels of green and blue are different among a plurality of pixels corresponding to the light source unit 22, the relative intensities bg and bb of the backlight 20 are set in accordance with the maximum value of the grayscale levels g and b, and the relative intensities bg and bb are higher than the grayscale levels bg and bb of the other pixels.

Alternatively, even in the case where all of the pixels in the input video signal exhibit the same color, if the relative intensities br, bg, and bb of the backlight 20 are made to be equal to the luminance levels r, g, and b of the input video signal, the display characteristics such as color shift or viewing angle characteristic may sometimes be deteriorated. In such a case, even if all of the pixels exhibit the same color in the input video signal, the relative intensities br, bg, and bb of the backlight 20 may be made to be higher than the luminance levels r, g, and b of the input video signal.

As described above, the relative intensities br, bg, and bb are determined based on the luminance levels r, g, and b. For example, a relative intensity corresponding to the lower one of the luminance levels r and g in the relative intensities br and bg is set to be a higher value than the lower luminance level. For example, in the case where the lower value is α and the higher value is β in the luminance levels r and g, a relative intensity corresponding to the lower one of the luminance levels r and g in the relative intensities br and bg may be set to be not lower than α and not higher than β. For example, in the case where the luminance levels (r, g, b) are (0, 1, 0), the relative intensity bg is 1, the relative intensity bb is 0, and the relative intensity br is set to be a value not lower than 0 and not higher than 1.

The multi-primary color converting portion 34A converts the grayscale levels pr, pg, and pb of the liquid crystal data signal to the red, green, blue and yellow grayscale levels $p_1$, $p_2$, $p_3$, and $p_4$. As described above, the color phase of color indicated by the grayscale levels pr, pg, and pb before the conversion is substantially the same as that of color indicated by the grayscale levels $p_1$, $p_2$, $p_3$, and $p_4$ after the conversion.

Thereafter, the multi-primary color converting portion 34A generates a panel signal which indicates the grayscale levels $p_1$, $p_2$, $p_3$, and $p_4$ as grayscale levels $p_R$, $p_G$, $p_B$, and $p_Y$. Alternatively, the multi-primary color converting portion 34A sets the grayscale levels $p_1$, $p_2$, and $p_3$ as grayscale levels $p_R$, $p_G$, and $p_B$, respectively, and a level $p_4'$ which is higher than the grayscale level $p_4$ may be set as the grayscale level $p_Y$.

For example, the multi-primary color converting portion 34A may set the grayscale level $p_4'$ based on the backlight signal. As described later, as the grayscale level p4' is increased, the chromaticity is sifted together with the increase of the normalized luminance. Thus, it is preferred that the grayscale level $p_4'$ may be set to such a degree that the shift of the chromaticity is not too much.

For example, the multi-primary color converting portion 34A sets the grayscale level $p_4'$ based on the relative intensities br and bg of the backlight 20. The grayscale level $p_4'$ may be set to be a constant value based on the relative intensities br and bg of the backlight 20, or alternatively, may be continuously changed in accordance with the relative intensities br and bg. Thus, the multi-primary color converting portion 34A may generate a panel signal based on not only the liquid crystal data signal but also the backlight signal. The panel driving circuit 36 drives the liquid crystal panel 10 based on the panel signal indicating the grayscale levels $p_R$, $p_G$, $p_B$, and $p_Y$.

Hereinafter the liquid crystal display device 100A in the case where the input video signal indicates green will be described. For example, the grayscale levels (r, g, b) are (0, 255, 0) in the 255 grayscale notation. Herein the relative intensities br, bg, and bb of the backlight 20 are substantially equal to the luminance levels r, g, and b. The multi-primary color converting portion 34A generates a panel signal based on not only the liquid crystal data signal but also the backlight signal. In this case, the relative intensities (br, bg, and bb) of the backlight 20 are (0, 1, 0).

As the result of the conversion of the pr, pg, and pb by the multi-primary color converting portion 34A, the grayscale levels ($p_1$, $p_2$, $p_3$, $p_4$) of the red, green, blue, and yellow sub-pixels are (0, 255, 0, 0). The color phase of color indicated by the grayscale levels pr, pg, and pb is substantially the same as that of color indicated by the grayscale levels $p_1$, $p_2$, $p_3$, and $p_4$.

Thereafter the multi-primary color converting portion 34A sets the grayscale level $p_4'$ based on the relative intensities br, bg, and bb of the backlight 20. Herein the difference between the relative intensities br and bg is large, so that the multi-primary color converting portion 34A sets the grayscale level $p_4'$ which is higher than the grayscale level $p_4$ as the grayscale level $p_Y$. Accordingly, the grayscale levels ($p_R$, $p_G$, $p_B$, $p_Y$) of the liquid crystal panel 10 are (0, 255, 0, $p_4'$) in the 255 grayscale notation. Herein the grayscale level $p_4'$ is 0<$p_4'$≤255, and the relative transmittance $p_4'$ is 0<$p_4'$≤1. Thus, in the case where the input video signal indicates green, in the liquid crystal display device 100A, the relative intensities (br, bg, bb) of the backlight 20 are (0, 1, 0), the relative transmittances ($p_R$, $p_G$, $p_B$, $p_Y$) of the liquid crystal panel 10 are (0, 1, 0, $p_4'$), and the grayscale levels ($p_R$, $p_G$, $p_B$, $p_Y$) are (0, 255, 0, $p_4'$) in the 255 grayscale notation.

In the liquid crystal display device 100A, in the case where the light source 22G of the backlight 20 is turned on, and the light sources 22R and 22B are turned off, the light from the backlight 20 is transmitted through not only the green sub-pixel G but also the yellow sub-pixel Ye. Accordingly, the normalized luminance can be efficiently increased.

Figure 22:
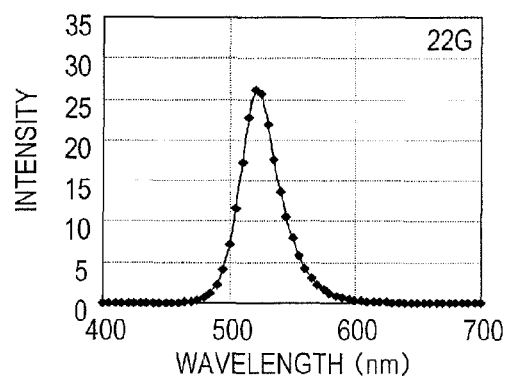
FIG. 22 shows graphs of the liquid crystal display device shown in FIG. 20 in the case where an input video signal indicates green, in which (a) is a graph showing an emission spectrum of a backlight, (b) is a graph showing a transmission spectrum of a yellow sub-pixel in the liquid crystal panel, (c) is a graph showing an emitted light spectrum in the case of (a) and (b), and (d) is a graph showing an emitted light spectrum of the liquid crystal display device shown in FIG. 20.
Figure 22:
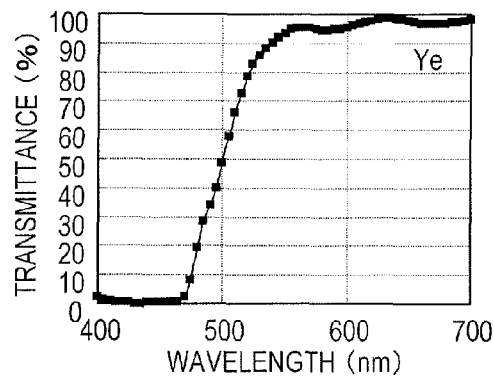
Figure 22:
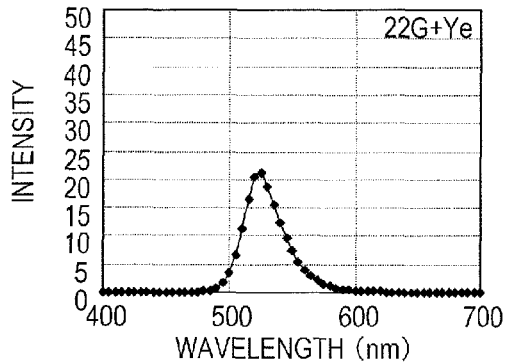
Figure 22:
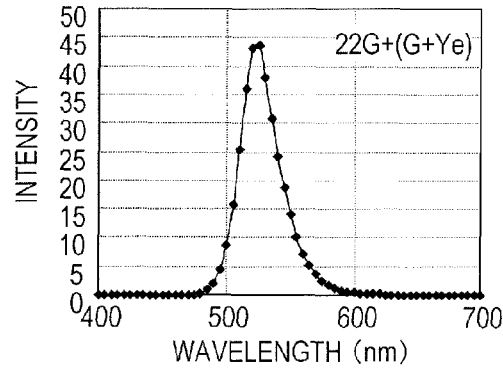

Hereinafter the normalized luminance of the liquid crystal display device 100A will be described with reference to FIG. 22.

FIG. 22(a) shows an emission spectrum of the backlight 20. Herein the relative intensities (br, bg, bb) of the backlight 20 are (0, 1, 0), so that the light source 22G is in the on state. The emission spectrum has the peak wavelength of about 520 nm. FIG. 22(a) is the same as FIG. 5(a).

FIG. 22(b) shows a transmission spectrum of the liquid crystal panel 10. Herein the grayscale levels ($p_R$, $p_G$, $p_B$, $p_Y$) of the liquid crystal panel 10 are (0, 0, 0, 255), so that the light is transmitted through the yellow sub-pixel Ye. Accordingly, the liquid crystal panel 10 mainly transmits light having wavelengths of 500 nm or more.

FIG. 22(c) shows an emission spectrum of the liquid crystal display device 100A in the case where the light of the spectrum shown in FIG. 22(a) is emitted from the backlight 20 and the light is transmitted through the liquid crystal panel with the spectrum shown in FIG. 22(b). Herein the grayscale levels ($p_R$, $p_G$, $p_B$, $p_Y$) of the liquid crystal panel 10 are (0, 0, 0, 255), and the relative intensities (br, bg, bb) of the backlight 20 are (0, 1, 0). In such a case, the intensity of light emitted from the yellow sub-pixel Ye is mainly expressed by the product of the intensity of light from the light source 22G in the backlight 20 and the transmittance of the yellow sub-pixel Ye. The emission spectrum also has the peak wavelength of about 520 nm.

FIG. 22(d) shows an emission spectrum of the liquid crystal display device 100A in the case where the light of the spectrum shown in FIG. 22(a) is emitted from the backlight 20, and the light is transmitted through the liquid crystal panel 10 with the spectra shown in both of FIG. 5(b) and FIG. 22(b). Herein the grayscale levels ($p_R$, $p_G$, $p_B$, $p_Y$) of the liquid crystal panel 10 are (0, 255, 0, 255), and the relative intensities (br, bg, bb) of the backlight 20 are (0, 1, 0). In such a case, the intensity of light emitted from the liquid crystal display device 100A is the sum of the intensity of light emitted from the light source 22G and transmitted through the green sub-pixel G and the intensity of light transmitted through the yellow sub-pixel Ye, so that green with high brightness can be displayed. Herein the light source 22G is turned on, but the light source 22R is turned off, so that if the light is transmitted through not only the green sub-pixel G but also the yellow sub-pixel Ye in the liquid crystal panel 10, the color phase of color displayed by the liquid crystal display device 100A are hardly varied.

Herein the advantages of the liquid crystal display device 100A will be described as compared with the liquid crystal display devices 700 and 800 in the comparative examples 1 and 2. First, the liquid crystal display device 700 in the comparative example 1 will be described. The configuration of the liquid crystal display device 700 in the comparative example 1 is described above with reference to FIG. 9, so that overlapping descriptions are omitted for avoiding verbose descriptions.

Herein the color indicated in the input video signal is green, and the grayscale levels (r, g, b) are (0, 255, 0) in the 255 grayscale notation. In the liquid crystal display device 700 in the comparative example 1, light of constant intensity is emitted from the backlight 720. Herein the relative intensities (br, bg, bb) of the backlight 720 are represented as (1, 1, 1).

The grayscale levels (pr, pg, pb) of the red, green, and blue sub-pixels in the liquid crystal panel 710 are equal to the grayscale levels (r, g, b) of the input video signal, i.e., (0, 255, 0). In this case, the normalized luminance in the liquid crystal display device 700 is 0.566 (=0.246×(0/255)$^{2.2}$+0.566×(255/255)$^{2.2}$+0.188×(0/255)$^{2.2}$). Table 10 shows the grayscale levels of respective sub-pixels in the liquid crystal panel 710.

TABLE 10

|  | R | G | B | Ye | Normalized Luminance |
|---|---|---|---|---|---|
| Grayscale level of Comparative example 1 | 0 | 255 | 0 | — | 0.566 |

Next, the liquid crystal display device 800 in the comparative example 2 will be described. The configuration of the liquid crystal display device 800 in the comparative example 2 is described above with reference to FIG. 11, so that overlapping descriptions are omitted for avoiding verbose descriptions.

Herein the color indicated in the input video signal is green, and the grayscale levels (r, g, b) are (0, 255, 0) in the 255 grayscale notation. In the liquid crystal display device 800 in the comparative example 2, light of constant intensity is emitted from the backlight 820. Herein the relative intensities (br, bg, bb) of the backlight 820 are indicated by (1, 1, 1).

The grayscale levels (pr, pg, pb) of the liquid crystal data signal are equal to the grayscale levels (r, g, b) of the input video signal, i.e. (0, 255, 0). In the liquid crystal display device 800 in the comparative example 2, multi-primary color conversion is performed. The grayscale levels ($p_R$, $p_G$, $p_B$, $p_Y$) are (0, 255, 0, 0) in the 255 grayscale notation. In this case, the normalized luminance in the liquid crystal display device 800 is 0.338 (=0.107×(0/255)$^{2.2}$+0.338×(255/255)$^{2.2}$+0.118×(0/255)$^{2.2}$+0.44×(0/255)$^{2.2}$). Table 11 shows grayscale levels of respective sub-pixels in the liquid crystal panel 810. Table 11 also shows the values of the liquid crystal display device 700 in the comparative example 1 for reference.

TABLE 11

|  | R | G | B | Ye | Normalized luminance |
|---|---|---|---|---|---|
| Grayscale level in Comparative example 1 | 0 | 255 | 0 | — | 0.566 |
| Grayscale level in Comparative example 2 | 0 | 255 | 0 | 0 | 0.338 |

Thus, the normalized luminance of the liquid crystal display device 800 in the comparative example 2 is low, so that the liquid crystal display device 800 cannot display green of high brightness.

Figure 5:
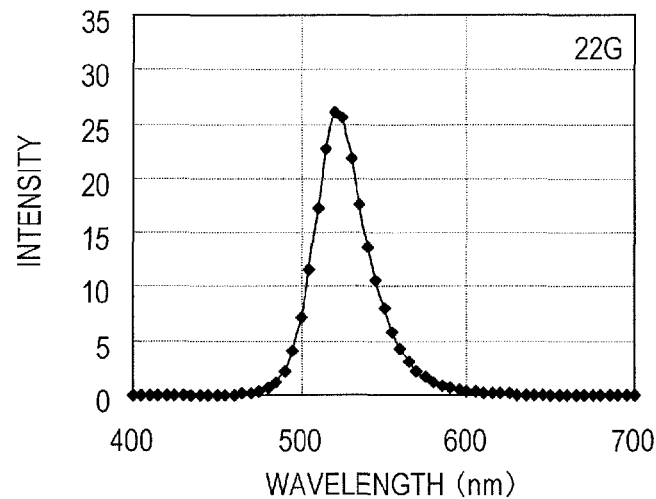
FIG. 5 shows graphs of the liquid crystal display device shown in FIG. 1 in the case where an input video signal indicates green, in which (a) is a graph showing an emission spectrum of the backlight, (b) is a graph showing a transmission spectrum of the liquid crystal panel, and (c) is a graph showing an emitted light spectrum in the case of (b).
Figure 5:
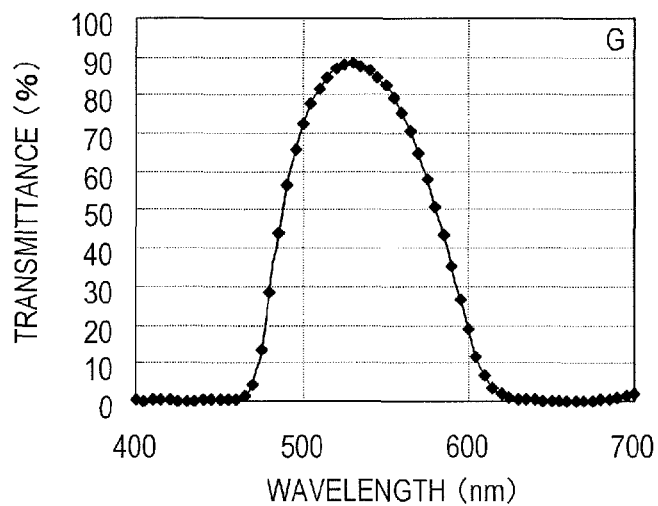
Figure 5:
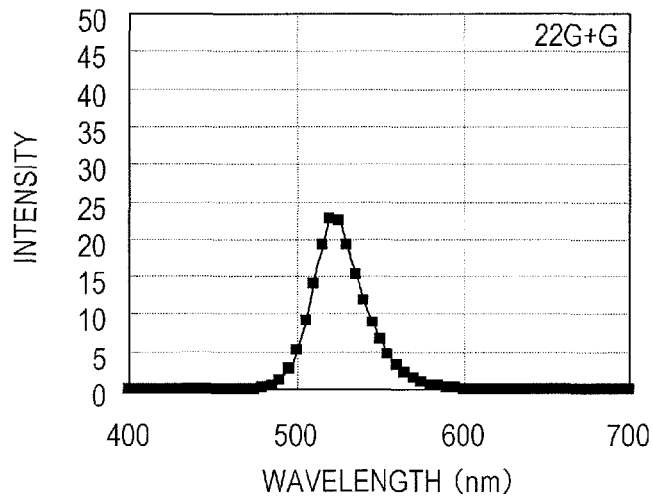

In the above-described liquid crystal display device 100, in the case where the input video signal indicates green, the light source 22G of the backlight 20 is turned on, and the light is transmitted through the green sub-pixel G. For example, as described above with reference to FIG. 5, in the case where the grayscale levels (r, g, b) of the input video signal are (0, 255, 0), the relative intensities (br, bg, bb) of the backlight 20 are (0, 1, 0), the relative transmittances ($p_R$, $p_G$, $p_B$, $p_Y$) of the liquid crystal panel 10 are (0, 1, 0, 0), and the grayscale levels ($p_R$, $p_G$, $p_B$, $p_Y$) are represented by (0 255, 0, 0) in the 255 grayscale notation. In this case, the light of the spectrum shown in FIG. 5(c) is emitted, but high brightness cannot be obtained by the light only in some cases.

On the contrary, the liquid crystal display device 100A in this embodiment can display green of high brightness. Hereinafter the normalized luminance of the liquid crystal display device 100A will be described. Herein the color indicated in the input video signal is also green, the luminance levels (r, g, b) are (0, 1, 0), and the grayscale levels (r, g, b) are (0, 255, 0).

Herein the relative intensities br, bg, and bb of the backlight 20 are set based on the luminance levels r, g, and b of the input video signal. Table 12 shows the relative intensities (br, bg, bb) of the backlight 20.

TABLE 12

| Embodiment 2 | br | bg | bb |
|---|---|---|---|
| Relative intensity of Backlight | 0 | 1 | 0 |

As described above, herein the relative transmittances ($p_R$, $p_G$, $p_B$, $p_Y$) of the liquid crystal panel 10 are (0, 1, 0, $p_4'$), and the grayscale levels ($p_R$, $p_G$, $p_B$, $p_Y$) are (0, 255, 0, $p_4'$) in the 255 grayscale notation. Table 13 shows the transmittances of the red sub-pixel R, the green sub-pixel G, the blue sub-pixel B, and the yellow sub-pixel Ye in the liquid crystal panel 10.

TABLE 13

| Embodiment 2 | R | G | B | Ye |
|---|---|---|---|---|
| Grayscale level of Liquid crystal panel | 0 | 255 | 0 | $p_4'$ |

As described above, the relative transmittance $p_4'$ is $0 < p_4' \le 1$, and the grayscale level $p_4'$ is $0 < p_4' \le 255$. As the grayscale level $p_4'$ increases, the improvement effect of the normalized luminance is increased. However, if the grayscale level $p_4'$ is too high, the color phase of color displayed by the liquid crystal display device 100A may sometimes be shifted largely. In addition, if the grayscale level $p_4'$ is low, the shift of color is suppressed, but the improvement effect of the normalized luminance is reduced. For example, in the case where the grayscale level $p_4'$ is the grayscale level of 222, the normalized luminance of the liquid crystal display device 100A is 0.566 which is equal to that of the liquid crystal display device 700 in the comparative example 1. The grayscale level of 222 corresponds to the relative transmittance of 0.737.

Figure 23:
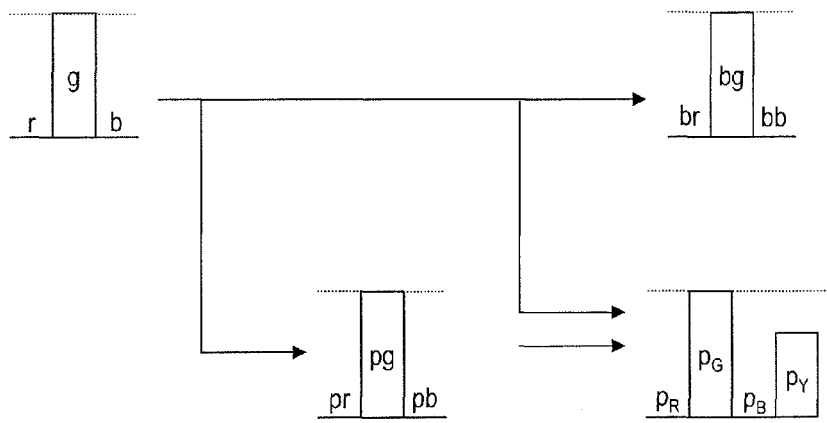
FIG. 23 is a schematic diagram showing luminance levels of the input video signal, relative intensities of the backlight, transmittance levels of a liquid crystal data signal, and relative transmittances of the liquid crystal panel in the liquid crystal display device shown in FIG. 20.

FIG. 23 shows luminance levels r, g, and b of the input video signal, relative intensities br, bg, and bb of the backlight 20, transmittance levels pr, pg, and pb of a liquid crystal data signal, and relative transmittances $p_R$, $p_G$, $p_B$, and $p_Y$ of the liquid crystal panel 10 in the liquid crystal display device 100A. Herein the input video signal also indicates green. For example, the luminance levels r, g, and b) of the input video signal satisfy the relationship of g>r=b 0, the luminance levels (r, g, b) of the input video signal are (0, 1, 0), and the grayscale levels (r, g, b) are (0, 255, 0).

The relative intensities br, bg, and bb of the backlight 20 are set based on the luminance levels r, g, and b of the input video signal. In the case where the luminance levels r, g, and b satisfy the relationship of g>r=b=0, the relative intensities br, bg, and bb of the backlight 20 satisfy the relationship of bg>br=bb=0. Specifically, the luminance levels (r, g, b) of the input video signal are (0, 1, 0), the relative intensities (br, bg, bb) are (0, 1, 0).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 1, 0), the transmittance levels (pr, pg, pb) of the liquid crystal data signal are (0, 1, 0), and the grayscale levels (pr, pg, pb) are represented by (0, 255, 0) in the 255 grayscale notation. In this case, as the result of the multi-primary color conversion, the relative transmittances ($p_R$, $p_G$, $p_B$, $p_Y$) of the liquid crystal panel 10 are (0, 1, 0, 0.737), and the grayscale levels ($p_R$, $p_G$, $p_B$, $p_Y$) are represented by (0, 255, 0, 222) in the 255 grayscale notation.

In the above description, the color indicated in the input video signal is green. However the present invention is not limited to this. The color indicated in the input video signal may be red. For example, even in the case where the grayscale levels of the input video signal satisfy the relationship of r>g=b=0, the relative intensity br of the backlight 20 is made to be higher than the minimum value and not only the grayscale level $p_R$ but also the grayscale level $p_Y$ of the liquid crystal panel 10 are made to be higher than the minimum value, thereby displaying red of high brightness.

In the above description, the setting of the grayscale level $p_4'$ is performed in the case where one of the relative intensities br and bg has the minimum value, and the other is higher than the minimum value. However, the present invention is not limited to this. For example, the setting of the grayscale level $p_4'$ may be performed in the case where both of the relative intensities br and bg are higher than the minimum value.

In the above description, the relative intensities br, bg, and bb of the backlight 20 are substantially equal to the luminance levels r, g, and b of the input video signal. However, the present invention is not limited to this. As for the relative intensities br, bg, and bb, one of the relative intensities br and bg corresponding to the lower one of the luminance levels r and g may be set to have a higher value than the lower luminance level.

Figure 24:
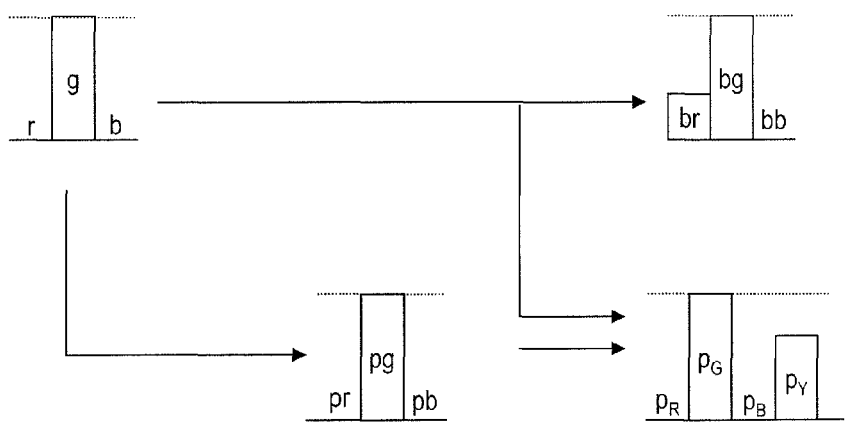
FIG. 24 is a schematic diagram showing luminance levels of the input video signal, relative intensities of the backlight, transmittance levels of the liquid crystal data signal, and relative transmittances of the liquid crystal panel in the liquid crystal display device shown in FIG. 20.

Hereinafter with reference to FIG. 24, the liquid crystal display device 100A will be described. FIG. 24 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10 in the liquid crystal display device 100A.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

The relative intensities br, bg, and bb of the backlight 20 are set based on the luminance levels r, g, and b. In the case where the luminance levels r, g, and b satisfy the relationship of g>r=b=0, the relative intensities br, bg, and bb of the backlight 20 satisfy the relationships of bg≥br≥0 and bg≥bb≥0. For example, in the case where the luminance levels (r, g, b) of the input video signal are (0, 1, 0), the relative intensity bg is 1, the relative intensity bb is 0, and the relative intensity br is 0≤br≤1.

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 1, 0), the transmittance levels (pr, pg, pb) of the liquid crystal data signal are (0, 1, 0), and the grayscale levels (pr, pg, pb) are represented by (0, 255, 0) in the 255 grayscale notation.

Next, multi-primary color conversion is performed. Herein the relative transmittances ($p_R$, $p_G$, $p_B$, $p_Y$) of the liquid crystal panel 10 are (0, 1, 0, 0.737), and the grayscale levels ($p_R$, $p_G$, $p_B$, $p_Y$) are represented by (0, 255, 0, 222) in the 255 grayscale notation. Herein similarly to the description with reference to FIG. 23, the relative transmittances ($p_R$, $p_G$, $p_B$, $p_Y$) are (0, 1, 0, 0.737). However, since the relative intensity br of the backlight 20 is higher than the minimum value, the relative transmittance $p_Y$ may be lower than 0.737. As described above, in the case where the input video signal indicates green, not only the relative intensity bg of the backlight 20 but also the relative intensity br may be higher than the minimum value.

In the above description, the color indicated in the input video signal is green. However, the present invention is not limited to this. The color indicated in the input video signal may be red. In this case, even when the grayscale levels of the input video signal satisfy the relationship of r>g=b=0, not only the relative intensity br of the backlight 20 but also the relative intensity bg may be higher than the minimum value, and the grayscale levels $p_R$ and $p_Y$ of the liquid crystal panel 10 may be higher than the minimum value.

In this way, in the case where the color indicated in the input video signal is green, not only the relative intensity bg of the backlight 20 but also the relative intensity br may be higher than the minimum value.

Figure 25:
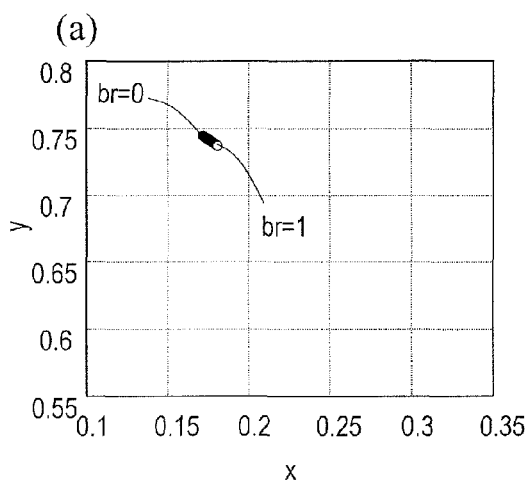
FIG. 25 shows graphs showing the variations of chromaticity and normalized luminance in accordance with the change of the relative intensity of the red light source in the backlight in the case where the input video signal indicates green in the liquid crystal display device shown in FIG. 20, in which (a) is a graph showing the variation of chromaticity, and (b) is a graph showing the variation of normalized luminance.
Figure 25:
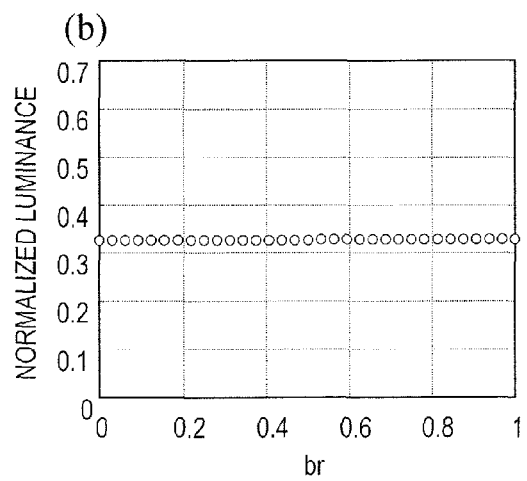

Hereinafter with reference to FIG. 25, the variations of chromaticity and normalized luminance in accordance with the change of relative intensity br of the backlight 20 in the liquid crystal display device 100A will be described. Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

FIG. 25(a) shows the variation of chromaticity. In FIG. 25(a), the axis of abscissa indicates chromaticity x and the axis of ordinate indicates chromaticity y. FIG. 25(b) shows the variation of normalized luminance. In FIG. 25(b), the axis of abscissa indicates the relative intensity br of the backlight 20, and the axis of ordinate indicates the normalized luminance. Herein the grayscale levels ($p_R$, $p_G$, $p_B$, $p_Y$) of the liquid crystal panel 10 are (0, 255, 0, 0), and the relative intensities bg and bb of the backlight 20 are 1 and 0, respectively.

As shown in FIG. 25(a), the chromaticity x and the chromaticity y when the relative intensity br is 1 are substantially equal to those when the relative intensity br is 0. In the liquid crystal panel 10, the green sub-pixel G transmits light and the other sub-pixels block out the light, so that even if the relative intensity br of the backlight 20 is increased, the light emitted from the liquid crystal panel 10 may hardly be affected. As is understood from FIG. 2 and FIG. 3, the emission spectrum of the light source 22R slightly overlaps the transmission spectrum of the green sub-pixel G. Due to the increase of the relative intensity br of the backlight 20, the intensity of light of longer wavelengths in the light emitted from the liquid crystal panel 10 is slightly increased. Strictly speaking, as the relative intensity br increases, the chromaticity x and the chromaticity y are both shifted slightly.

As shown in FIG. 25(b), the normalized luminance when the relative intensity br is 1 is substantially equal to that when the relative intensity br is 0. As described above, in the liquid crystal panel 10, the green sub-pixel G transmits light, and the other sub-pixels block out the light, so that even if the relative intensity br of the backlight 20 increases, the light emitted from the liquid crystal panel 10 may hardly be affected.

As described above, in the liquid crystal panel 10, in the case where not only the green sub-pixel G but also the yellow sub-pixel Ye transmit light, the chromaticity x, the chromaticity y, and the normalized luminance are varied in accordance with the increase of the relative intensity br, respectively.

Figure 26:
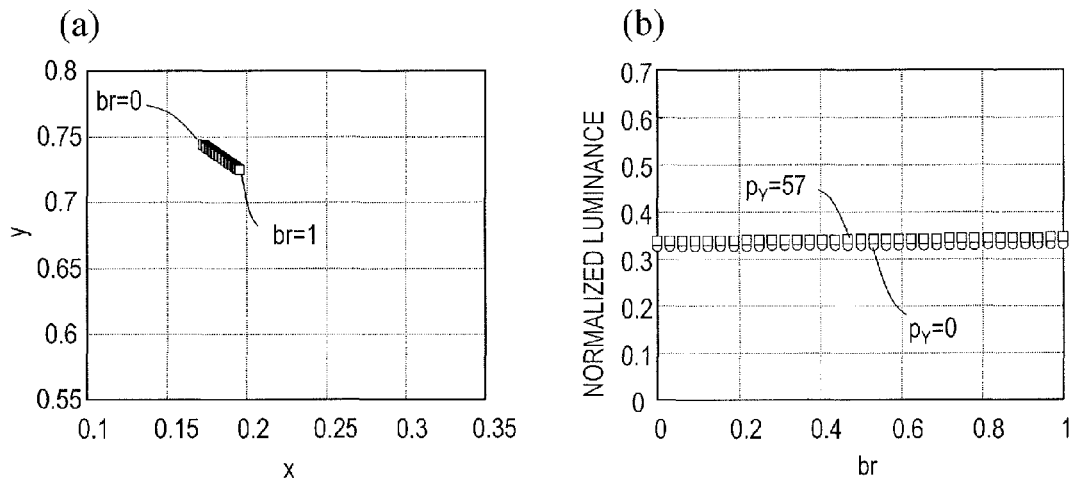
FIG. 26 shows graphs showing the variations of chromaticity and normalized luminance in accordance with the change of the relative intensity of the red light source in the backlight in the case where the input video signal indicates green in the liquid crystal display device shown in FIG. 20, in which (a) is a graph showing the variation of chromaticity, and (b) is a graph showing the variation of normalized luminance.

With reference to FIG. 26, the variations of chromaticity and normalized luminance in accordance with the change of the relative intensity br of the backlight 20 in the liquid crystal display device 100A will be described. FIG. 26(a) shows the variation of chromaticity, and FIG. 26(b) shows the variation of normalized luminance. For reference, in FIG. 26(b), the normalized luminance when the grayscale level $p_Y$ is zero is also shown.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

Herein the grayscale levels ($p_R$, $p_G$, $p_B$, $p_Y$) of the liquid crystal panel 10 are (0, 255, 0, 57), and the relative intensities bg and bb of the backlight 20 are 1 and 0, respectively.

As shown in FIG. 26(a), by increasing the relative intensity br of the backlight 20, the chromaticity x and the chromaticity y are relatively largely shifted. This is because since the green sub-pixel G transmits light and also the yellow sub-pixel Ye transmits light to some extent in the liquid crystal panel 10, the intensity of light of longer wavelengths in the light emitted from the liquid crystal panel 10 is increased due to the increase of the relative intensity br.

As shown in FIG. 26(b), the normalized luminance when the grayscale level $p_Y$ is 57 is slightly larger than that when the grayscale level $p_Y$ is 0. This is because, as described above, in the liquid crystal panel 10, not only the green sub-pixel G but also the yellow sub-pixel Ye transmit light. It is noted that since the grayscale level $p_Y$ in the liquid crystal panel 10 is relatively low, the influence on the normalized luminance is relatively small.

Next, with reference to FIG. 27, the variations of chromaticity and normalized luminance in accordance with the change of the relative intensity br of the backlight 20 in the liquid crystal display device 100A will be described. FIG. 27(a) shows the variation of chromaticity, and FIG. 27(b) shows the variation of normalized luminance. For reference, in FIG. 27(b), the normalized luminance when the grayscale level $p_Y$ is zero is also shown.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0). Herein the grayscale levels ($p_R$, $p_G$, $p_B$, $p_Y$) of the liquid crystal panel 10 are (0, 255, 0, 222), and the relative intensities bg and bb of the backlight 20 are 1 and 0, respectively.

As shown in FIG. 27(a), by the increase of the relative intensity br of the backlight 20, the chromaticity x and the chromaticity y are more largely shifted. This is because since not only the green sub-pixel G but also the yellow sub-pixel Ye transmit light in the liquid crystal panel 10, the intensity of light of longer wavelengths in the light emitted from the liquid crystal panel 10 is largely increased, due to the increase of the relative intensity br.

As shown in FIG. 27(b), the normalized luminance when the relative intensity br is 1 is larger than that when the relative intensity br is 0. This is because, in the liquid crystal panel 10, the grayscale level $p_Y$ is relatively high, and the influence on the normalized luminance in accordance with the increase of the relative intensity br is large. The normalized luminance when the grayscale level $p_Y$ is 222 is larger than the normalized luminance when the grayscale level $p_Y$ is 57.

Figure 27:
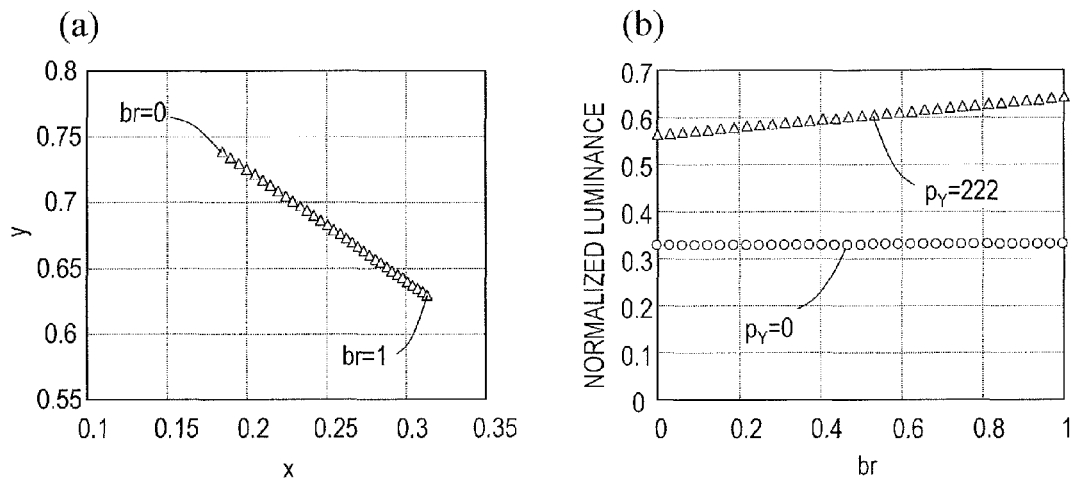
FIG. 27 shows graphs showing the variations of chromaticity and normalized luminance in accordance with the change of the relative intensity of the red light source in the backlight in the case where the input video signal indicates green in the liquid crystal display device shown in FIG. 20, in which (a) is a graph showing the variation of chromaticity, and (b) is a graph showing the variation of normalized luminance.

As is understood from the comparison between FIG. 26 and FIG. 27, in the case where the grayscale level $p_Y$ is small, the variation of chromaticity is relatively small and the improvement effect of the normalized luminance is relatively small. On the other hand, in the case where the grayscale level $p_Y$ is large, the improvement effect of the normalized luminance is relatively large, and the variation of chromaticity is also relatively large.

In the above description, irrespective of the change of the relative intensity br of the backlight 20, the grayscale level $p_Y$ in the liquid crystal panel 10 is constant. However the present invention is not limited to this. The grayscale level $p_Y$ in the liquid crystal panel 10 may be varied in accordance with the change of the relative intensity br of the backlight 20.

Figure 28:
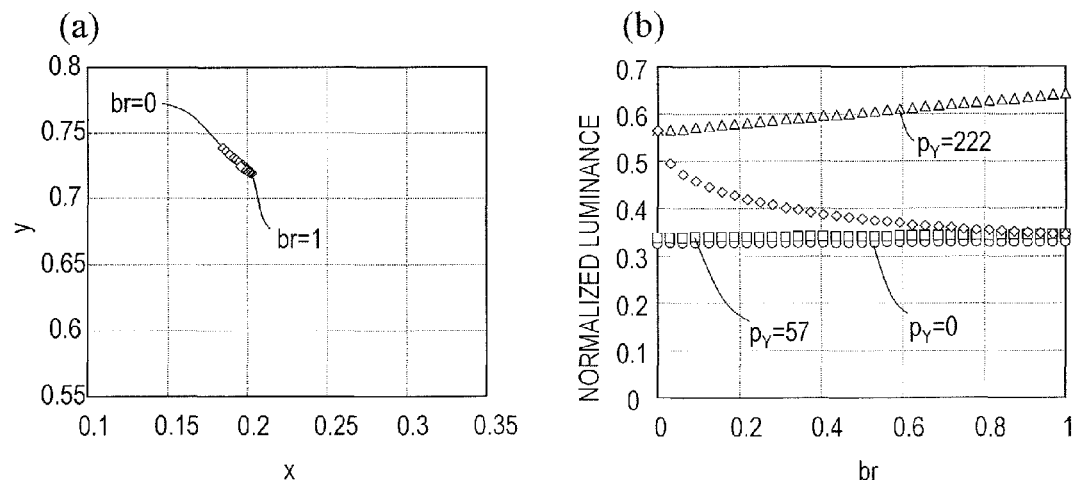
FIG. 28 shows graphs showing the variations of chromaticity and normalized luminance in accordance with the change of the relative intensity of the red light source in the backlight in the case where the input video signal indicates green in the liquid crystal display device shown in FIG. 20, in which (a) is a graph showing the variation of chromaticity, and (b) is a graph showing the variation of normalized luminance.

With reference to FIG. 28, the variations of chromaticity and normalized luminance in accordance with the change of the relative intensity br of the backlight 20 in the liquid crystal display device 100A will be described. FIG. 28(a) shows the variation of chromaticity, and FIG. 28(b) shows the variation of normalized luminance. For reference, FIG. 28(b) also shows respective normalized luminance when the grayscale level $p_Y$ is 0, 57, and 222.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0). Herein the grayscale levels $p_R$, $p_G$, and $p_B$ of the liquid crystal panel 10 are 0, 255, and 0, and the grayscale level $p_Y$ is not lower than 57 and not higher than 222. The relative intensities bg and bb of the backlight 20 are 1 and 0, respectively.

Herein when the relative intensity br is 0, the grayscale level $p_Y$ of the liquid crystal panel 10 is 222, and the grayscale level $p_Y$ is decreased in accordance with the increase of the relative intensity br. When the relative intensity br is 1, the grayscale level $p_Y$ of the liquid crystal panel 10 is 57.

As shown in FIG. 28(a), by the increase of the relative intensity br of the backlight 20, the chromaticity is slightly shifted, but the shift amount is relatively small. Herein the grayscale level $p_Y$ is decreased in accordance with the increase of the relative intensity br, thereby reducing the shift of chromaticity.

As shown in FIG. 28(b), in the case where the relative intensity br is 0, the improvement effect of the normalized luminance is large, but the improvement effect of the normalized luminance is reduced as the relative intensity br increases. Thus, in accordance with the increase of the relative intensity br, the grayscale level $p_Y$ is reduced, so that it is possible to improve the normalized luminance and suppress the shift of chromaticity.

(Embodiment 3)

Figure 29:
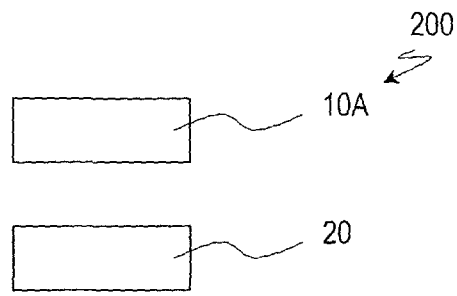
In FIG. 29, (a) is a schematic diagram of a liquid crystal display device in a third embodiment of the present invention, (b) is a schematic diagram of a liquid crystal panel in the liquid crystal display device shown in (a), and (c) is a schematic sectional view of the liquid crystal panel shown in (b).
Figure 29:
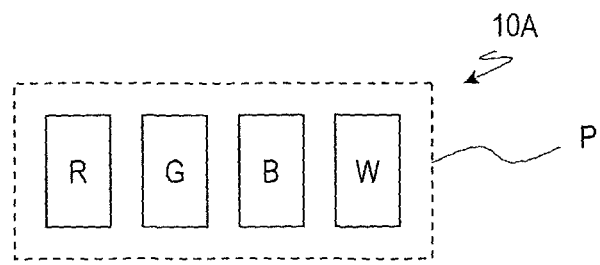
Figure 29:
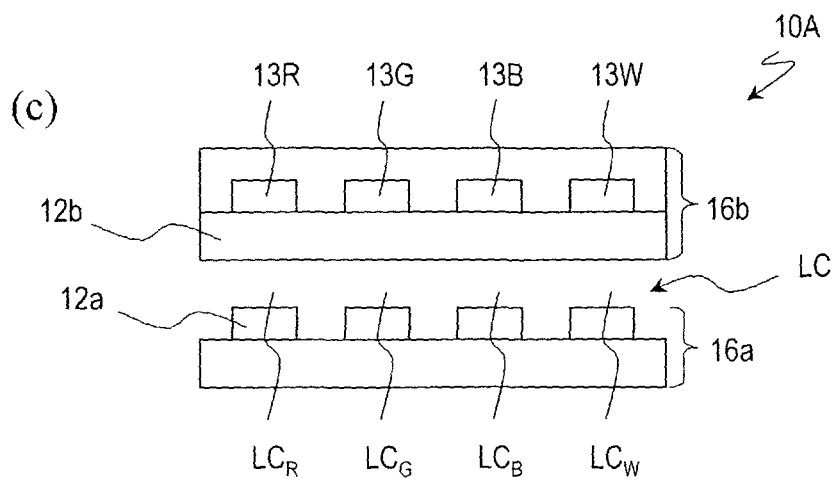

Hereinafter a second embodiment of a liquid crystal display device of the present invention will be described. FIG. 29(a) shows a schematic diagram of a liquid crystal display device 200 in this embodiment. The liquid crystal display device 200 is provided with a liquid crystal panel 10A and a backlight 20.

FIG. 29(b) shows a schematic diagram of a pixel P in the liquid crystal panel 10A. The pixel P in the liquid crystal panel 10A includes a red sub-pixel R, a green sub-pixel G, a blue sub-pixel B, and a white sub-pixel W. In other words, the pixel P in the liquid crystal panel 10A is different from the pixel P in the liquid crystal panel 10 shown in FIG. 1(b) in that the pixel P in the liquid crystal panel 10A has the white sub-pixel W instead of the yellow sub-pixel Ye.

FIG. 29(c) shows a schematic sectional view of the liquid crystal panel 10A. In the white sub-pixel W, a colorless and transparent (i.e. for transmitting white light) color filter 13W is disposed. Hereinafter a liquid crystal layer LC of the white sub-pixel W is sometimes referred to as a liquid crystal layer $LC_W$.

The backlight 20 includes a light source unit 22 having light sources 22R, 22G, and 22B, as described above with reference to FIG. 1(d) and FIG. 1(e).

As described above, in the liquid crystal panel 10A, the pixel P has the red, green, blue, and white sub-pixels R, G, B, and W. In this specification, a grayscale level of white of the liquid crystal panel 10A (white displayed only by the white sub-pixel W) is denoted by $p_W$. The grayscale level $p_W$ corresponds to the transmittance of the liquid crystal layer $LC_W$ of the white sub-pixel W. Specifically, across the liquid crystal layer $LC_W$ of the white sub-pixel W, a voltage corresponding to the grayscale level $p_W$ is applied, thereby changing the transmittance of the white sub-pixel W.

In the case where the liquid crystal panel 10A is of a normally black type, when the minimum applied voltage (typically a voltage of zero) is applied across the liquid crystal layer $LC_W$, the transmittance exhibits the minimum value. When the maximum applied voltage is applied across the liquid crystal layer $LC_W$, the transmittance exhibits the maximum value. In the case where the applied voltage across the liquid crystal layer $LC_W$ is low, the transmittance of the white sub-pixel W is low. In addition, when the applied voltage across the liquid crystal layer $LC_W$ is high, the transmittance of the white sub-pixel W is high.

Thus, the grayscale level $p_W$ of the liquid crystal panel 10A corresponds to the transmittance of the white sub-pixel W in the liquid crystal panel 10A. In the following description of this specification, a transmittance normalized in such a manner that the minimum value is zero (0), and the maximum value is 1 in the white sub-pixel W is represented as a relative transmittance $p_W$.

The light emitted from the white sub-pixel W is the light emitted from the light sources 22R, 22G, and 22B in the backlight 20, and transmitted through the liquid crystal layer $LC_W$ and the color filter 13W in the liquid crystal panel 10A. Accordingly, the intensity of light emitted from the white sub-pixel W is mainly expressed by the product of the sum of the intensities of light of the light sources 22R, 22G, and 22B in the backlight 20, and the transmittance of the white sub-pixel W. The transmittance of the white sub-pixel W is mainly expressed by the product of the transmittance of the color filter 13W and the transmittance of the liquid crystal layer $LC_W$.

Table 14 shows the luminance ratios of the red sub-pixel R, the green sub-pixel G, the blue sub-pixel B, and the white sub-pixel W in the liquid crystal display device 200. The luminance ratio of the white sub-pixel W (recited in a box of Ws in Table 14) is a ratio of the luminance when the white sub-pixel W exhibits the maximum transmittance and the other sub-pixels exhibit the minimum transmittance to the luminance when white (W) is displayed by the entire of the pixel P (i.e., the luminance when all of the sub-pixels exhibit the maximum transmittance).

TABLE 14

|    | Luminance ratio |
|----|-----------------|
| R  | 11.8%           |
| G  | 29.6%           |
| B  | 9.6%            |
| Ws | 49.0%           |
| W  | 100%            |

In the liquid crystal display device 200 in this embodiment, each pixel P in the liquid crystal panel 10A includes four or more sub-pixels exhibiting colors which are different from each other, and each light source unit 22 includes light sources 22R, 22G, and 22B. Accordingly, display can be performed in wide color reproduction range. In accordance with the colors to be displayed, the transmittances of the liquid crystal layers $LC_R$, $LC_G$, $LC_B$, and $LC_W$ in the liquid crystal panel 10A are changed, and additionally the relative intensities of the light sources 22R, 22G, and 22B of each light source unit 22 in the backlight 20 can be changed. Accordingly, it is possible to increase the contrast ratio and to reduce the power consumption.

Specifically, in the case where the liquid crystal display device 200 displays red, the light source 22R is turned on, and the light sources 22G and 22B are turned off in the backlight 20, and the red sub-pixel R transmits light, and the other sub-pixels block out the light in the liquid crystal panel 10A. Similarly, in the case where the liquid crystal display device 200 displays green, the light source 22G is turned on, and the light sources 22R and 22B are turned off, and the green sub-pixel G transmits light and the other sub-pixels block out the light in the liquid crystal panel 10A. Similarly, in the case where the liquid crystal display device 200 displays blue, the light source 22B is turned on, and the light sources 22R and 22G are turned off, and the blue sub-pixel B transmits light and the other sub-pixels block out the light in the liquid crystal panel 10A. Thus, by controlling the turning on and off of the light sources 22R, 22G, and 22B in accordance with the colors to be displayed on the liquid crystal display device 200, the power consumption can be reduced. In addition, in accordance with the colors to be displayed on the liquid crystal display device 200, the transmittances of the red, green, blue, and white sub-pixels R, G, B, and W are changed and additionally the intensities of light emitted from the light sources 22R, 22G, and 22B are controlled, thereby realizing high contrast ratio.

For example, in the case where the liquid crystal display device 200 displays green, light of the light source 22G is emitted from the backlight 20, and the green sub-pixel G of the liquid crystal panel 10A transmits the light. Herein the grayscale levels (r, g, b) of the input video signal are (0, 255, 0) in the 255 grayscale notation.

FIG. 30(a) shows an emission spectrum of the backlight 20. Herein the relative intensities (sr, sg, sb) of the light sources 22R, 22G, and 22B are (0, 1, 0), the light source 22G is turned on, and the emission spectrum has the peak wavelength of about 520 nm.

FIG. 30(b) shows a transmission spectrum of the liquid crystal panel 10A. Herein the grayscale levels ($p_R$, $p_G$, $p_B$, $p_W$) of the liquid crystal panel 10A are (0, 255, 0, 0), and light having the wavelengths of 480 nm to 580 nm are mainly transmitted through the green sub-pixel G.

FIG. 30(c) shows an emission spectrum of the liquid crystal display device 200 in the case where the light of the spectrum shown in FIG. 30(a) is emitted from the backlight 20 and the light of the spectrum shown in FIG. 30(b) is transmitted in the liquid crystal panel 10A. As described above, the intensity of light emitted from the green sub-pixel G is mainly expressed by the product of the intensity of light of the light source 22G in the backlight 20 and the transmittance of the green sub-pixel G. The emission spectrum also has the peak wavelength of about 520 nm.

As described above, in the case where the grayscale levels (r, g, b) of the input video signal are (0, 255, 0), the light sources 22R and 22B of the backlight 20 are turned off, and the light source 22G is turned on. The relative intensities (br, bg, bb) of the backlight 20 are (0, 1, 0). Table 15 shows the relative intensities (br, bg, bb) of the backlight 20.

TABLE 15

| Embodiment 3 | br | bg | bb |
|---|---|---|---|
| Relative intensity of Backlight | 0 | 1 | 0 |

The grayscale levels ($p_R$, $p_G$, $p_B$, $p_W$) of the liquid crystal panel 10A are (0, 255, 0, 0) in the 255 grayscale notation. Table 16 shows the grayscale levels of the liquid crystal panel 10A.

TABLE 16

| Embodiment 3 | Red sub-pixel | Green sub-pixel | Blue sub-pixel | White sub-pixel |
|---|---|---|---|---|
| Grayscale level of Liquid crystal panel | 0 | 255 | 0 | 0 |

Thus, in the liquid crystal display device 200, the grayscale levels ($p_R$, $p_G$, $p_B$, $p_W$) of the red, green, blue, and white sub-pixels R, G, B, and W in the liquid crystal panel 10A are (0, 255, 0, 0), the relative intensities (br, bg, bb) of the backlight 20 are (0, 1, 0), and the normalized luminance of the liquid crystal display device 200 is 0.293. The luminance ratio of the green sub-pixel shown in Table 14 is 29.6% (0.296), and the luminance ratio is higher than the normalized luminance when green is displayed on the liquid crystal display device 200. The luminance ratio of the green sub-pixel G is a value obtained by turning on not only the light source 22G but also the light sources 22R and 22B. On the other hand, the normalized luminance is a value obtained by turning on the light source 22G only and turning off the light sources 22R and 22B.

Figure 31:
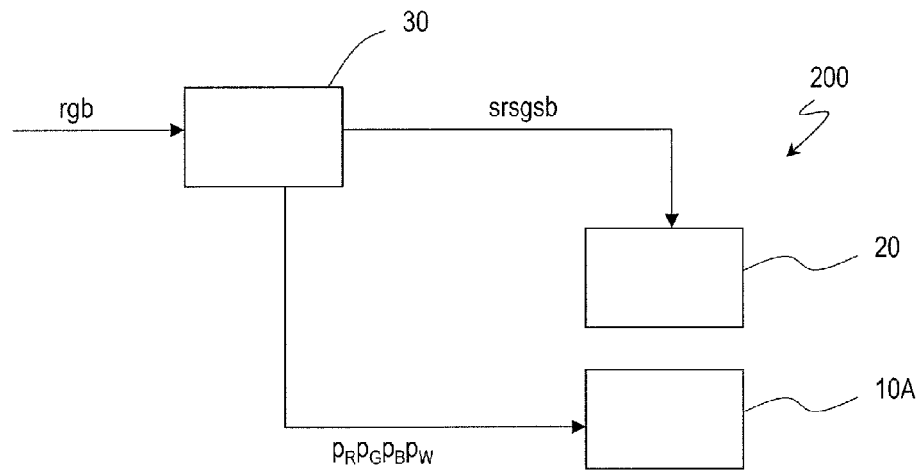
FIG. 31 is a schematic diagram showing an example of the liquid crystal display device shown in FIG. 29.

The control of the liquid crystal panel 10A and the backlight 20 is performed in the following way, for example. Hereinafter, with reference to FIG. 31, the liquid crystal display device 200 will be described. The liquid crystal display device 200 is provided with a control circuit 30 that controls the liquid crystal panel 10A and the backlight 20. The control circuit 30 generates a light source driving signal and a panel driving signal based on the input video signal.

The backlight 20 is driven based on the light source driving signal generated in the control circuit 30. The light source driving signal indicates the relative intensities sr, sg, and sb of the light sources 22R, 22G, and 22B in the backlight 20. By the light source driving signal, the light sources 22R, 22G, and 22B emit light with the relative intensities sr, sg, and sb. In this case, light of the relative intensities br, bg, and bb is emitted from the backlight 20.

The liquid crystal panel 10A is driven based on the panel driving signal generated in the control circuit 30. The panel driving signal indicates the grayscale levels $p_R$, $p_G$, $p_B$, and $p_W$ of the liquid crystal panel 10A. The grayscale levels $p_R$, $p_G$, $p_B$, and $p_W$ correspond to the applied voltages of the liquid crystal layers $LC_R$, $LC_G$, $LC_B$, and $LC_W$ of the red, green, blue, and white sub-pixels R, G, B, and W in the liquid crystal panel 10A. Specifically, based on the panel driving signal, voltages corresponding to the grayscale levels $p_R$, $p_G$, $p_B$, and $p_W$ are applied across the liquid crystal layers $LC_R$, $LC_G$, $LC_B$, and $LC_W$, thereby changing the transmittances of the liquid crystal layers $LC_R$, $LC_G$, $LC_B$, and $LC_W$. In this way in the liquid crystal display device 200, the relative intensities br, bg, and bb of the backlight 20 are changed, and additionally, the transmittances of the liquid crystal layers $LC_R$, $LC_G$, $LC_B$, and $LC_W$ of the red, green, blue, and white sub-pixels R, G, B, and W are changed. Accordingly, the color display pixel P can display various colors.

Figure 32:
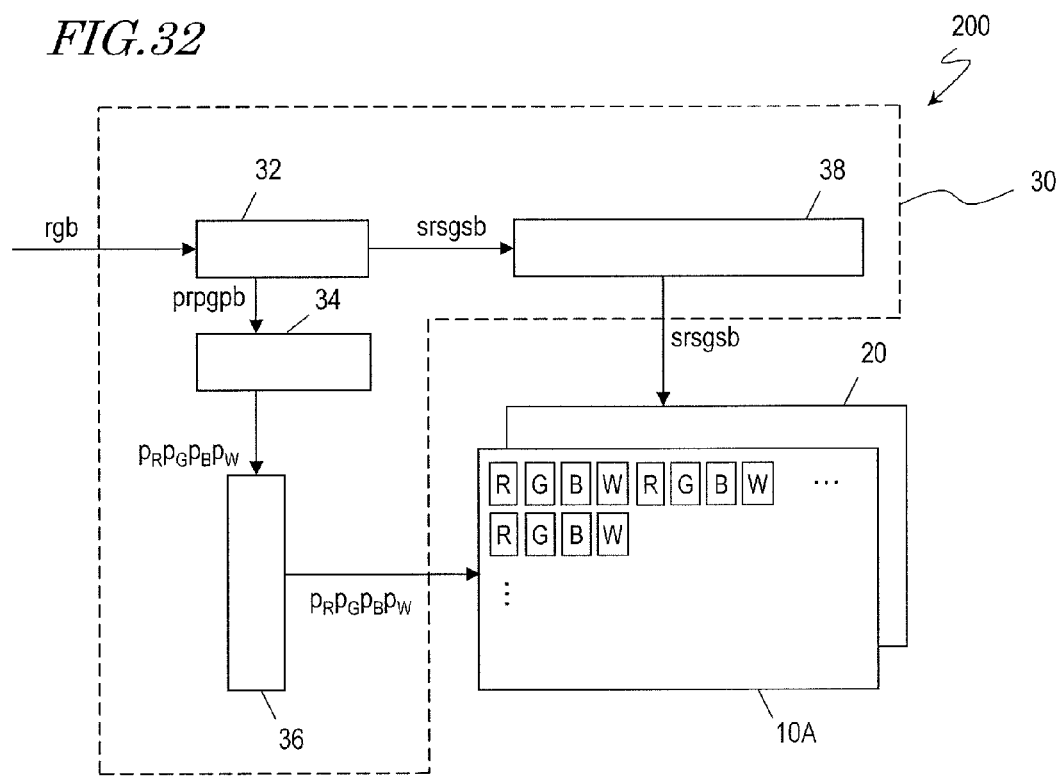
FIG. 32 is a schematic diagram of the liquid crystal display device shown in FIG. 31.

FIG. 32 shows a specific configuration of the control circuit 30. The control circuit 30 includes an active drive processing portion 32, a multi-primary color converting portion 34, a panel driving circuit 36, and a backlight driving circuit 38.

The active drive processing portion 32 generates a light source signal indicating the relative intensities sr, sg, and sb, and a liquid crystal data signal indicating the grayscale levels pr, pg, and pb based on the input video signal indicating the grayscale levels r, g, and b.

The multi-primary color converting portion 34 generates a panel signal from the liquid crystal data signal. The above-described liquid crystal panel 10A performs display by using four primary colors, so that a panel signal indicating grayscale levels of four primary colors is generated. Specifically, the multi-primary color converting portion 34 converts the grayscale levels pr, pg, and pb of the liquid crystal data signal into red, green, blue, and white grayscale levels $p_1$, $p_2$, $p_3$, and $p_4$ of the panel signal. Herein the color phase of color represented by the grayscale levels pr, pg, and pb before the conversion is substantially the same as the color phase of color represented by the grayscale levels $p_1$, $p_2$, $p_3$, and $p_4$ after the conversion. Thereafter the multi-primary color converting portion 34 generates a panel signal indicating the grayscale levels $p_1$, $p_1$, $p_3$, and $p_4$ as the grayscale levels $p_R$, $p_G$, $p_B$, and $p_W$.

The panel driving circuit 36 generates a panel driving signal based on the panel signal, thereby driving the liquid crystal panel 10A. Across the liquid crystal layers $LC_R$, $LC_G$, $LC_B$, and $LC_W$ of the liquid crystal panel 10A, voltages corresponding to the grayscale levels $p_R$, $p_G$, $p_B$, and $p_W$ are applied, and the red, green, blue, and white sub-pixels R, G, B, and W of the liquid crystal panel 10A exhibit transmittances corresponding to the grayscale levels $p_R$, $p_G$, $p_B$, and $p_W$. The backlight driving circuit 38 generates a PB, light source driving signal based on the light source signal. The light sources 22R, 22G, and 22B of the backlight 20 are driven by the light source driving signal.

The luminance level r of the input video signal is expressed by the product of the relative intensity br of the backlight 20 and the transmittance level pr of the liquid crystal data signal. In the case where the luminance level r of the input video signal is a median value, a plurality of combinations of the relative intensity br and the transmittance level br are considered. If the transmittance level pr of the liquid crystal data signal has the maximum value, the relative intensity br can be lowered. As a result, the power consumption of the light source 22R can be reduced. Similarly, in the case where the luminance levels g and b of the input video signal are median values, if the transmittance levels pg and pb in the liquid crystal data signal have the maximum value, the relative intensities bg and bb can be lowered. As a result, the power consumption of the light sources 22G and 22B can be reduced.

In the liquid crystal display device 200, it is preferred that the grayscale levels $p_R$, $p_G$, $p_B$, $p_W$ of the liquid crystal panel 10A and the relative intensities br, bg, and bb of the backlight 20 may be set in the following way based on the grayscale levels r, g, and b of the input video signal.

For example, in the case where the grayscale level r of the input video signal is higher than the minimum value, the relative intensity br of the backlight 20 is made to be higher than the minimum value, and the grayscale level $p_R$ of the liquid crystal panel 10A is made to have the maximum value. Accordingly, the power consumption can be reduced. In the case where the grayscale level r is the minimum value, the relative intensity br of the backlight 20 is made to have the minimum value, and the grayscale level $p_R$ of the liquid crystal panel 10A is made to have the minimum value. Accordingly, the power consumption can be reduced, and the contrast ratio can be improved.

In addition, in the case where the grayscale level g of the input video signal is higher than the minimum value, the relative intensity bg of the backlight 20 is made to be higher than the minimum value, and the grayscale level $p_G$ of the liquid crystal panel 10A is made to have the maximum value. In the case where the grayscale level g is the minimum value, the relative intensity bg of the backlight 20 is made to have the minimum value, and the grayscale level $p_G$ of the liquid crystal panel 10A is made to have the minimum value. Similarly, in the case where the grayscale level b of the input video signal is higher than the minimum value, the relative intensity bb of the backlight 20 is made to be higher than the minimum value, and the grayscale level $p_B$ of the liquid crystal panel 10A is made to have the maximum value. In the case where the grayscale level b is the minimum value, the relative intensity bb of the backlight 20 is made to have the minimum value, and the grayscale level $p_B$ of the liquid crystal panel 10A is made to have the minimum value.

In the case where all of the grayscale levels r, g, and b of the input video signal are higher than the minimum value, as is understood from the above description, all of the relative intensities br, bg, and bb of the backlight 20 are higher than the minimum value, and the grayscale level $p_W$ of the liquid crystal panel 10A is made to have the maximum value. Accordingly, the power consumption can be reduced. In the case where at least one of the grayscale levels r, g, and b of the input video signal has the minimum value, as is understood from the above description, at least one of the relative intensities br, bg, and bg of the backlight 20 is made to have the minimum value, and the grayscale level $p_W$ of the liquid crystal panel 10A is made to have the minimum value. Accordingly, the power consumption can be reduced, and the contrast ratio can be improved.

Thus, in the case where any of the grayscale levels r, g, and b of the input video signal has the minimum value, the corresponding one of the relative intensities br, bg, and bb of the backlight 20 also has the minimum value, and the corresponding one of the light sources 22R, 22G, and 22B is turned off. In addition, in the case where the grayscale levels r, g, and b of the input video signal are higher than the minimum value, the relative intensities br, bg, and bb of the backlight 20 are also higher than the minimum value, so that the light sources 22R, 22G, and 22B are turned on. In the case where any of the grayscale levels r, g, and b of the input video signal has the minimum value, the corresponding one of the grayscale levels $p_R$, $p_G$, $p_B$, and $p_W$ of the liquid crystal panel 10A is made to have the minimum value. In the case where the grayscale levels r, g, and b of the input video signal are higher than the minimum value, the grayscale levels $p_R$, $p_G$, $p_B$, and $p_W$ of the liquid crystal panel 10A have the maximum value.

In the liquid crystal display device 200, the magnitude correlation among the relative intensities br, bg, and bb of the backlight 20 is set to be the same as the magnitude correlation among the luminance levels r, g, and b of the input video signal. For example, the relative intensities br, bg, and bb of the backlight 20 are substantially equal to the luminance levels r, g, and b of the input video signal, respectively. The grayscale levels $p_R$, $p_G$, $p_B$, and $p_W$ of the liquid crystal panel 10 are set depending on the condition whether the grayscale levels r, g, and b of the input video signal are the minimum value, or not. In the case where the grayscale levels r, g, and b are the minimum value, the grayscale levels $p_R$, $p_G$, and $p_B$ exhibit the minimum value. In the case where the grayscale levels r, g, and b are higher than the minimum value, the grayscale levels $p_R$, $p_G$, and $p_B$ exhibit the maximum value. In another case where at least one of the grayscale levels r, g, and b is the minimum value, the grayscale level $p_W$ exhibits the minimum value. In the case where all of the grayscale levels r, g, and b are higher than the minimum value, the grayscale level $p_W$ exhibits the maximum value. For example, in the case where the grayscale levels (r, g, b) of the input video signal are (128, 128, 128), i.e. in the case where the normalized luminance is 0.216 in the input video signal, the grayscale levels ($p_R$, $p_G$, $p_B$, $p_W$) are (255, 255, 255, 255), and the relative intensities (br, bg, bb) of the backlight 20 are (0.216, 0.216, 0.216).

Herein FIG. 32 is referred to again. As described above, the active drive processing portion 32 generates a light source signal based on the input video signal. The light source signal indicates the relative intensities sr, sg, and sb of the light sources 22R, 22G, and 22B. The backlight driving circuit 38 generates a light source driving signal based on the light source signal. The light sources 22R, 22G, and 22B of the backlight 20 are driven by the light source driving signal. At this time, the light sources 22R, 22G, and 22B emit light with the relative intensities sr, sg, and sb, and the relative intensities of the backlight 20 are br, bg, and bb. In the case where any of the grayscale levels r, g, and b of the input video signal is the minimum value, the corresponding light sources 22R, 22G, and 22B are turned off, and the corresponding relative intensities br, bg, and bb of the backlight 20 have the minimum value. In the case where the grayscale levels r, g, and b of the input video signal are higher than the minimum value, the light sources 22R, 22G, and 22B are turned on, and the relative intensities br, bg, and bb of the backlight 20 exhibit values higher than the minimum value, respectively.

For example, the magnitude correlation among the relative intensities br, bg, and bb of the backlight 20 is equal to the magnitude correlation among the luminance levels r, g, and b of the input video signal. Specifically, in the case where the luminance levels r, g, and b of the input video signal satisfy the relationship of r>g>b, the relative intensities br, bg, and bb of the backlight 20 satisfy the relationship of br>bg>bb. In the case where the luminance levels r, g, and b of the input video signal satisfy the relationship of r<g<b, the relative intensities br, bg, and bb satisfy the relationship of br<bg<bb.

The liquid crystal data signal indicates red, green, and blue grayscale levels pr, pg, and pb. The grayscale levels pr, pg, and pb of the liquid crystal data signal are set, for example, based on the grayscale levels r, g, and b and the relative intensities br, bg, and bb. The grayscale levels r, g, and b of the input video signal are higher then the minimum value, respectively, the grayscale levels pr, pg, and pb of the liquid crystal data signal exhibit the maximum value. Alternatively, in the case where any of the grayscale levels r, g, and b of the input video signal is the minimum value, the corresponding grayscale levels pr, pg, and pb exhibit the minimum value.

The multi-primary color converting portion 34 generates a panel signal from the liquid crystal data signal. The multi-primary color converting portion 34 converts the grayscale levels pr, pg, and pb of the liquid crystal data signal to red, green, blue, and white grayscale levels $p_1$, $p_2$, $p_3$, and $p_4$, and generates a panel signal indicating the grayscale levels $p_1$, $p_2$, $p_3$, and $p_4$ as the grayscale levels $p_R$, $p_G$, $p_B$, and $p_W$.

The panel driving circuit 36 generates a panel driving signal based on the panel signal, thereby driving the liquid crystal panel 10A. Across the liquid crystal layers $LC_R$, $LC_G$, $LC_B$, and $LC_W$ in the liquid crystal panel 10, voltages corresponding to the grayscale levels $p_R$, $p_G$, $p_B$, and $p_W$ are applied.

In the above description, the grayscale levels $p_R$, $p_G$, $p_B$, and $p_W$ of the liquid crystal panel 10A are set in accordance with the grayscale levels r, g, and b of the input video signal. However, the present invention is not limited to this. The relative intensities br, bg, and bb of the backlight 20 are set in accordance with the grayscale levels r, g, and b of the input video signal, so that the grayscale levels $p_R$, $p_G$, $p_B$, and $p_W$ of the liquid crystal panel 10A may be set to have the maximum value irrespective of the grayscale levels r, g, and b of the input video signal. It is understood that the grayscale levels $p_R$, $p_G$, $p_B$, and $p_W$ of the liquid crystal panel 10A are set in accordance with the grayscale levels r, g, and b of the input video signal, so that high contrast can easily be realized.

Figure 33:
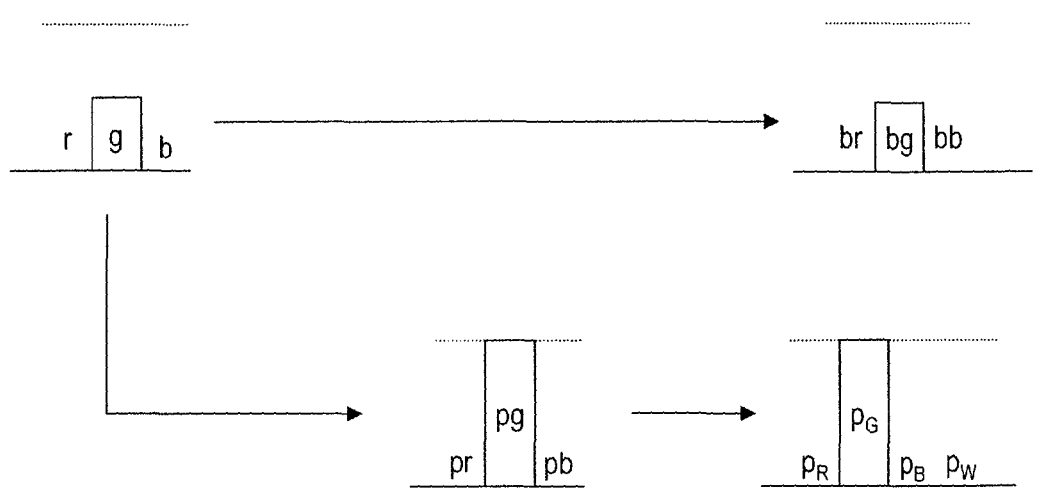
FIG. 33 is a schematic diagram showing luminance levels of an input video signal, relative intensities of the backlight, transmittance levels of a liquid crystal data signal, and relative transmittances of the liquid crystal panel in the liquid crystal display device shown in FIG. 32.

Next, with reference to FIG. 33, the relative transmittance of the liquid crystal panel 10A and relative intensity of the backlight 20 in the liquid crystal display device 200 will be described. FIG. 33 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_W$ of the liquid crystal panel 10A in the liquid crystal display device 200.

Herein the input video signal indicates green. For example, the grayscale levels (the luminance levels) r, g, and b of the input video signal satisfy the relationship of g>r=b=0, the luminance levels (r, g, b) are (0, 0.216, 0), and the grayscale levels (r, g, b) are (0, 128, 0).

The relative intensities br, bg, and bb of the backlight 20 are set based on the luminance levels r, g, and b of the input video signal. As described above, the magnitude correlation among the relative intensities br, bg, and bb of the backlight 20 is equal to the magnitude correlation among the luminance levels r, g, and b of the input video signal, and the relative intensities br, bg, and bb satisfy the relationship of bg>br=bb=0. For example, the relative intensities (br, bg, bb) are (0, 0.216, 0).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 0.216, 0), the transmittance levels (pr, pg, pb) of the liquid crystal data signal are (0, 1, 0), and the grayscale levels (pr, pg, pb) are represented by (0, 255, 0) in the 255 grayscale notation. As described above, the luminance level r is expressed by the product of the relative intensity br and the transmittance level pr. Similarly, the luminance level g is expressed by the product of the relative intensity bg and the transmittance level pg. In addition, the luminance level b is expressed by the product of the relative intensity bb and the transmittance level pb.

The transmittance levels pr, pg, and pb are converted to relative transmittances $p_R$, $p_G$, $p_B$, and $p_W$ by the multi-primary color conversion. In this case, the relative transmittances ($p_R$, $p_G$, $p_B$, $p_W$) of the liquid crystal panel 10A are (0, 1, 0, 0), and the grayscale levels ($p_R$, $p_G$, $p_B$, $p_W$) are represented by (0, 255, 0, 0) in the 255 grayscale notation. Thus, the relative intensities br, bg, and bb of the backlight 20 are substantially equal to the luminance levels r, g, and b of the input video signal. A transmittance level of the transmittance levels pr, pg, and pb corresponding to a luminance level of the luminance levels r, g, and b of the input video signal which has the minimum value has the minimum value. A transmittance level of the transmittance levels pr, pg, and pb corresponding to a luminance level of the luminance levels r, g, and b which is higher than the minimum value has the maximum value. Accordingly, the power consumption of the backlight 20 can be reduced, and the contrast ratio can be increased.

Hereinafter the advantages of the liquid crystal display device 200 in this embodiment will be described as compared with the liquid crystal display device 700 in the comparative example 1 and a liquid crystal display device 900 in a comparative example 3.

Figure 34:
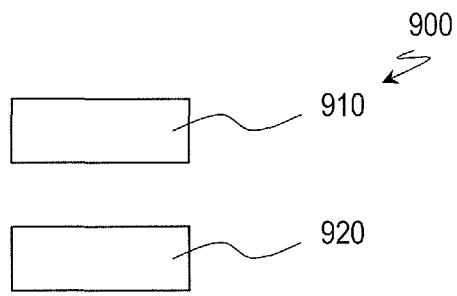
In FIG. 34, (a) is a schematic diagram of a liquid crystal display device in a comparative example 3, (b) is a schematic diagram of a liquid crystal panel in the liquid crystal display device shown in (a), and (c) is a schematic diagram of the liquid crystal display device shown in (a).
Figure 34:
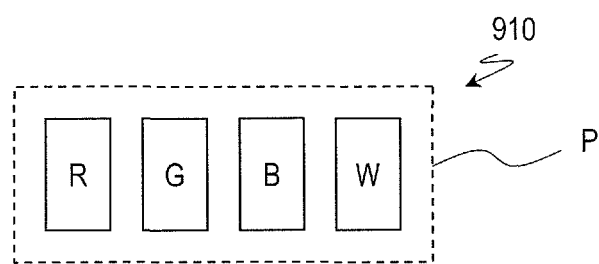
Figure 34:
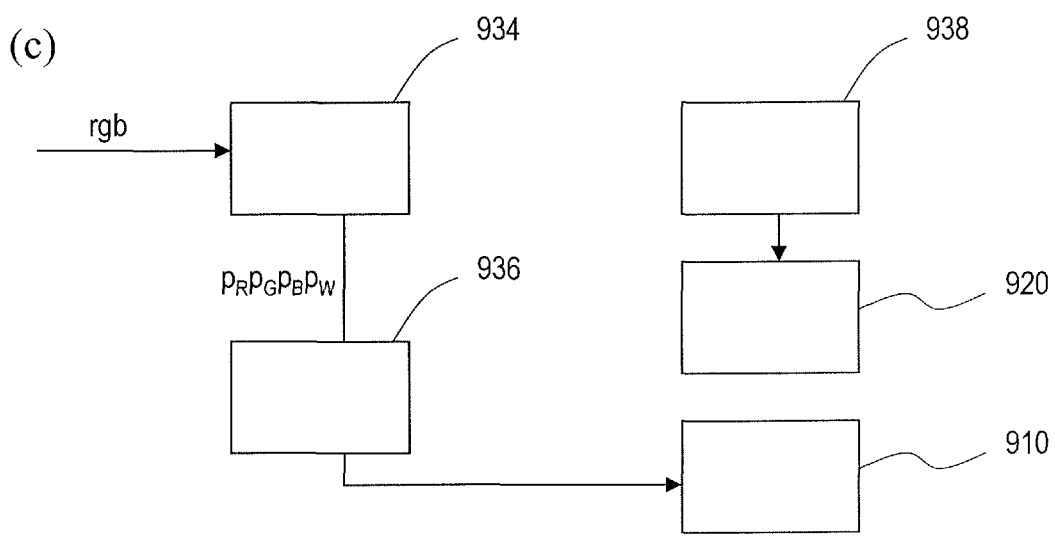

Herein with reference to FIG. 34, the liquid crystal display device 900 in the comparative example 3 will be described. FIG. 34(a) shows a schematic diagram of the liquid crystal display device 900 in the comparative example 3. The liquid crystal display device 900 includes a liquid crystal panel 910 and a backlight 920.

FIG. 34(b) shows a schematic diagram of the liquid crystal panel 910. Similarly to the liquid crystal panel 10A, in the liquid crystal panel 910, a pixel P has a red sub-pixel R, a green sub-pixel G, a blue sub-pixel B, and a white sub-pixel W. The liquid crystal panel 910 performs display with four primary colors. The size and the resolution of the liquid crystal panel 910 are substantially the same as those of the liquid crystal panel 710. The size of the pixel P of the liquid crystal display device 900 is the same as that of the pixel P of the liquid crystal display device 700.

The backlight 920 emits light of constant intensity in the driving of the liquid crystal display device 900. In the case where the liquid crystal display device 900 displays white, liquid crystal layers $LC_R$, $LC_G$, $LC_B$, and $LC_W$ exhibit the maximum transmittances, respectively. In the case where the liquid crystal display device 900 displays black, the liquid crystal layers $LC_R$, $LC_G$, $LC_B$, and $LC_W$ exhibit the minimum transmittances, respectively. Thus, in the liquid crystal display device 900, depending on the change of color indicated in the input video signal, the transmittances of the liquid crystal layers $LC_R$, $LC_G$, $LC_B$, and $LC_W$ of the liquid crystal panel 910 are changed, and the luminance of each sub-pixel is changed, thereby representing various colors.

The control of the liquid crystal panel 910 and the backlight 920 is performed in the following manner. FIG. 34(c) shows the liquid crystal display device 900 provided with a control circuit 930. The control circuit 930 includes a multi-primary color converting portion 934, a panel driving circuit 936, and a backlight driving circuit 938. The multi-primary color converting portion 934 converts the grayscale levels r, g, and b of the input video signal to grayscale levels $p_R$, $p_G$, $p_B$, and $p_W$ of a panel signal. In general, the color phase of color represented by the grayscale levels r, g, and b of the input video signal is substantially the same as the color phase of color represented by the grayscale levels $p_R$, $p_G$, $p_B$, and $p_W$ of the panel signal. In the driving of the liquid crystal display device 900, the backlight driving circuit 938 drives the backlight 920 so as to emit light of constant intensity from the backlight 920.

Table 17 shows the luminance ratios of the red sub-pixel R, the green sub-pixel G, the blue sub-pixel B, and the yellow sub-pixel W in the liquid crystal display device 900 in the comparative example 3.

TABLE 17

| | Luminance ratio |
|---|---|
| R | 11.8% |
| G | 29.6% |
| B | 9.6% |
| Ws | 49.0% |
| W | 100% |

Figure 35:
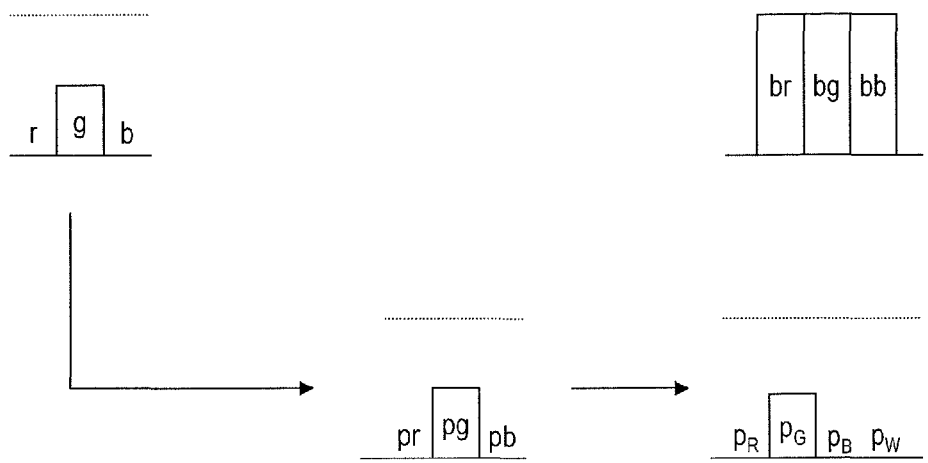
FIG. 35 is a schematic diagram showing luminance levels of an input video signal, relative intensities of a backlight, transmittance levels of a liquid crystal data signal, and relative transmittances of the liquid crystal panel in the liquid crystal display device in the comparative example 3.

FIG. 35 shows luminance levels r, g, and b of the input video signal, relative intensities br, bg, and bb of the backlight 920, transmittance levels pr, pg, and pb of the liquid crystal data signal, and relative transmittances $p_R$, $p_G$, $p_B$, and $p_W$ of the liquid crystal panel 910 in the liquid crystal display device 900.

Herein the input video signal also indicates green. For example, the luminance levels r, g, and b of the input video signal satisfy the relationship of g>r=b=0, the luminance levels (r, g, b) of the input video signal are (0, 0.216, 0), and the grayscale levels (r, g, b) are (0, 128, 0) in the 255 grayscale notation. In the liquid crystal display device 900, the backlight 920 emits light of constant intensity irrespective of the color indicated in the input video signal. Herein the relative intensities (br, bg, bb) are indicated as (1, 1, 1).

In the liquid crystal display device 900, the transmittance levels (the grayscale levels) pr, pg, and pb of the liquid crystal data signal are equal to the luminance levels (the grayscale levels) r, g, and b of the input video signal. Accordingly, as described above, in the case where the luminance levels r, g, and b of the input video signal satisfy the relationship of g>r=b=0, the transmittance levels pr, pg, and pb of the liquid crystal data signal also satisfy the relationship of pg>pr=pb=0. Specifically, in the case where the luminance levels (r, g, b) of the input video signal are (0, 0.216, 0), the transmittance levels (pr, pg, pb) of the liquid crystal data signal are (0, 0.216, 0), and the grayscale levels (pr, pg, pb) are (0, 128, 0) in the 255 grayscale notation.

In the liquid crystal display device 900, multi-primary color conversion is performed. The relative transmittances ($p_R$, $p_G$, $p_B$, $p_W$) of the liquid crystal panel 910 are (0, 0.216, 0, 0), and the grayscale levels ($p_R$, $p_G$, $p_B$, $p_W$) are represented by (0, 128, 0, 0) in the 255 grayscale notation.

As is understood from the comparison FIG. 33, and FIG. 10 and FIG. 35, in the liquid crystal display devices 700 and 900, the light of constant intensity emitted from the backlight 720 and 920 is modulated in the liquid crystal panels 710 and 910. On the contrary, in the liquid crystal display device 200, the light modulation is performed in the backlight 20, and the liquid crystal panel 10A makes the relative transmittance of the sub-pixel related to the light from the backlight 20 to be the maximum value, and makes the relative transmittance of the sub-pixel not related to the light from the backlight 20 to be the minimum value. Thus, in the liquid crystal display devices 700 and 900, light of constant intensity is emitted from the backlight 720 and 920. On the contrary, in the liquid crystal display device 200, the light sources 22R and 22B are turned off in accordance with the input video signal, and additionally the intensity of the light source 22G can be lowered. Accordingly, the power consumption of the backlight 20 can be reduced.

In the above description, the color indicated in the input video signal is green. Even if the color indicated in the input video signal is an arbitrary color, the power consumption can be reduced and the contrast ratio can be increased for the same reasons.

In some cases, in the liquid crystal display device 900 in the comparative example 3, a color of high brightness cannot be displayed. The case where the input video signal indicates orange, and more specifically, the case where the luminance levels (r, g, b) of the input video signal are (1, 0.216, 0), and the grayscale levels (r, g, b) are (255, 128, 0) will be described.

First, in the liquid crystal display device 700 in the comparative example 1, as is described with reference to FIG. 13, the grayscale levels (r, g, b) of the red, green, and blue sub-pixels are (255, 128, 0). In such a case, the normalized intensity is 0.368 (=0.246×(255/255)$^{2.2}$+0.566×(128/255)$^{2.2}$+0.188×(0/255)$^{2.2}$) (see Table 6).

Figure 36:
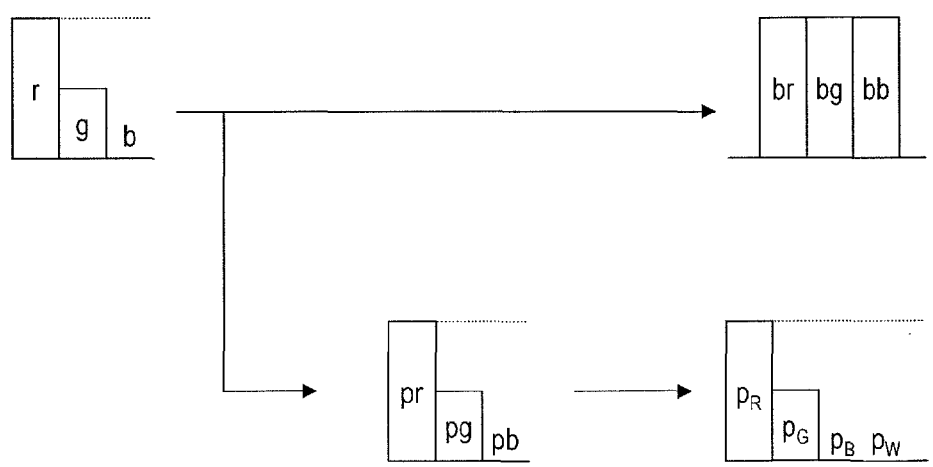
FIG. 36 is a schematic diagram showing luminance levels of the input video signal, relative intensities of the backlight, transmittance levels of the liquid crystal data signal, and relative transmittances of the liquid crystal panel in the liquid crystal display device in the comparative example 3.

Next, with reference to FIG. 36, the liquid crystal display device 900 in the comparative example 3 will be described. FIG. 36 shows luminance levels r, g, and b of the input video signal, relative intensities br, bg, and bb of the backlight 920, transmittance levels pr, pg, and pb of the liquid crystal data signal, and relative transmittances $p_R$, $p_G$, $p_B$, and $p_W$ of the liquid crystal panel 910 in the liquid crystal display device 900.

In the liquid crystal display device 900, the backlight 920 emits light of constant intensity irrespective of the color indicated in the input video signal. Herein the relative intensities (br, bg, bb) of the backlight 920 are indicated as (1, 1, 1).

In the liquid crystal display device 900, the transmittance levels (the grayscale levels) pr, pg, and pb of the liquid crystal data signal are equal to the luminance levels (the grayscale levels) r, g, and b of the input video signal, and the transmittance levels pr, pg, and pb of the liquid crystal data signal also satisfy the relationship of pr>pg>pb=0. Specifically, in the case where the luminance levels (r, g, b) of the input video signal are (1, 0.216, 0), the transmittance levels (pr, pg, pb) of the liquid crystal data signal are (1, 0.216, 0).

In the liquid crystal display device 900, multi-primary color conversion is performed. The relative transmittances ($p_R$, $p_G$, $p_B$, $p_W$) of the liquid crystal panel 910 are (1, 0.216, 0, 0), and the grayscale levels ($p_R$, $p_G$, $p_B$, $p_W$) are represented by (255, 128, 0, 0) in the 255 grayscale notation. The normalized luminance in the liquid crystal display device 900 is 0.182 (=0.118×(255/255)$^{2.2}$+0.296×(128/255)$^{2.2}$+0.096×(0/255)$^{2.2}$+0.490×(0/255)$^{2.2}$). Table 18 shows the grayscale levels of respective sub-pixels and the normalized luminance in the liquid crystal panel 910 of the liquid crystal display device 900. Table 18 also shows the values of the liquid crystal display device 700 in the comparative example 1 for reference.

TABLE 18

| | R | G | B | W | Normalized luminance |
|---|---|---|---|---|---|
| Grayscale level in Comparative example 1 | 255 | 128 | 0 | — | 0.368 |
| Grayscale level in Comparative example 3 | 255 | 128 | 0 | 0 | 0.182 |

Thus, the normalized luminance of the liquid crystal display device 900 in the comparative example 3 is low, so that orange of high brightness cannot be displayed. It is considered that this is because in the case where the size of the pixel P of the liquid crystal display device 900 is the same as that of the pixel P of the liquid crystal display device 700, the area of the red sub-pixel R, the green sub-pixel G, and the blue sub-pixel B in the liquid crystal panel 910 is smaller than the area of the red sub-pixel R, the green sub-pixel G, and the blue sub-pixel B in the liquid crystal panel 710.

On the contrary, the liquid crystal display device 200 in this embodiment can display colors of high brightness as compared with the liquid crystal display device 900 in the comparative example 3.

Figure 37:
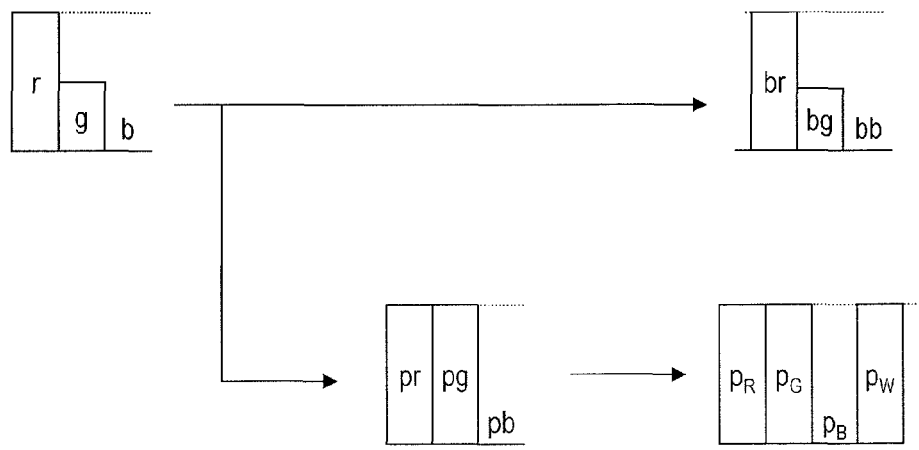
FIG. 37 is a schematic diagram showing luminance levels of the input video signal, relative intensities of the backlight, transmittance levels of a liquid crystal data signal, and relative transmittances of the liquid crystal panel in the liquid crystal display device shown in FIG. 29.

Hereinafter with reference to FIG. 37, the relative transmittance of the liquid crystal panel 10A and the relative intensity of the backlight 20 in the liquid crystal display device 200 will be described. FIG. 37 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_W$ of the liquid crystal panel 10A in the liquid crystal display device 200.

Herein the input video signal also indicates orange. Specifically, the luminance levels (r, g, b) of the input video signal are (1, 0.216, 0), and the grayscale levels (r, g, b) are (255, 128, 0) in the 255 grayscale notation.

The magnitude correlation among the relative intensities br, bg, and bb of the backlight 20 is the same as the magnitude correlation among the grayscale levels r, g, and b of the input video signal. Accordingly, in the case where the grayscale levels satisfy the relationship of r>g>b=0, the relative intensities br, bg, and bb of the backlight 20 satisfy the relationship of br>bg>bb=0. For example, the relative intensities br, bg, and bb of the backlight 20 are substantially equal to the luminance levels r, g, and b. Accordingly, in the case where the luminance levels (r, g, b) of the input video signal are (1, 0.216, 0), the relative intensities (br, bg, bb) are (1, 0.216, 0). Table 19 shows the relative intensities (br, bg, bb) of the backlight 20.

TABLE 19

| Embodiment 3 | br | bg | bb |
|---|---|---|---|
| Relative intensity of Backlight | 1 | 0.216 | 0 |

In the liquid crystal display device 200, the transmittance levels pr, pg, and pb of the liquid crystal data signal are set based on the luminance levels r, g, and b of the input video signal. In the case where the luminance levels r, g, and b of the input video signal satisfy the relationship of r>g>b=0, the grayscale levels pr and pg have the maximum value, and the grayscale level pb has the minimum value. For example, in the case where the luminance levels (r, g, b) of the input video signal are (1, 0.216, 0), the transmittance levels (pr, pg, pb) of the liquid crystal data signal are (1, 1, 0), and the grayscale levels (pr, pg, pb) are (255, 255, 0) in the 255 grayscale notation.

Thereafter, by the multi-primary color conversion, the relative transmittances ($p_R$, $p_G$, $p_B$, $p_W$) of the liquid crystal panel 10A are (1, 1, 0, 1), and the grayscale levels ($p_R$, $p_G$, $p_B$, $p_W$) are (255, 255, 0, 255) in the 255 grayscale notation. Table 20 shows the grayscale levels of the liquid crystal panel 10A. The grayscale level of 255 of the liquid crystal panel corresponds to the relative transmittance of 1, and the grayscale level of 0 of the liquid crystal panel corresponds to the relative transmittance of 0.

TABLE 20

| Embodiment 3 | Red sub-pixel | Green sub-pixel | Blue sub-pixel | White sub-pixel |
|---|---|---|---|---|
| Grayscale level of Liquid crystal panel | 255 | 255 | 0 | 255 |

In the case where the liquid crystal panel 10A and the backlight 20 are driven in the above-described way, the normalized luminance of the liquid crystal display device 200 is 0.371.

As is understood from the comparison between FIG. 36 and FIG. 37, in the liquid crystal display device 900, the light of constant intensity emitted from the backlight 920 is modulated in the liquid crystal panel 910. On the contrary, in the liquid crystal display device 200, the light sources 22R and 22G related to the color of orange to be displayed are turned on, and the light source 22B which is not related to the color of orange to be displayed is turned off. In addition, the intensity of the light source 22G is made lower than the maximum value. Since the backlight 20 performs such modulation, the power consumption of the backlight 20 can be reduced. In the liquid crystal display device 900, the light emitted from the backlight 920 with constant intensity is modulated in the liquid crystal panel 910. On the contrary, in the liquid crystal display device 200, the light modulation is performed in the backlight 20, and in addition, the liquid crystal panel 10A makes the relative transmittance of the sub-pixel related to the light from the backlight 20 to be the maximum value, and makes the relative transmittance of the sub-pixel not related to the light from the backlight 20 to be the minimum value. Accordingly, the contrast ratio can be increased.

As described above, the normalized luminance of the liquid crystal display device 900 in the comparative example 3 is 0.182, and the normalized luminance of the liquid crystal display device 200 in this embodiment is 0.371. This is because in the liquid crystal display device 200, the grayscale levels $p_R$, $p_G$, and $p_W$ of the liquid crystal panel 10A are the maximum value, and the light of the light sources 22R and 22G which are turned on is effectively transmitted through the liquid crystal panel 10A. Accordingly, the liquid crystal display device 200 can display orange of high brightness.

In the above description, the color indicated in the input video signal is orange. Alternatively, the color indicated in the input video signal may be any other color.

(Embodiment 4)

Figure 38:
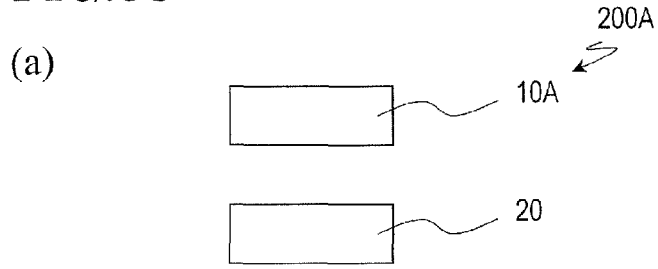
In FIG. 38, (a) is a schematic diagram of a liquid crystal display device in a fourth embodiment of the present invention, and (b) is a schematic diagram of a liquid crystal panel in the liquid crystal display device shown in (a).
Figure 38:
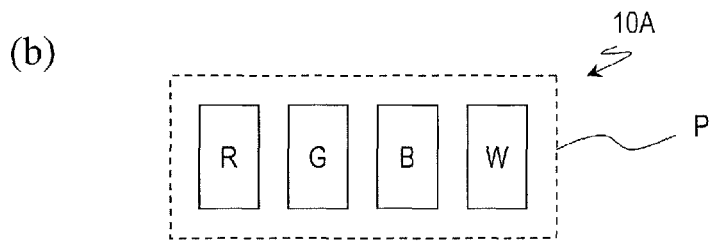

Hereinafter a fourth embodiment of the liquid crystal display device of the present invention will be described. FIG. 38(a) shows a schematic diagram of a liquid crystal display device 200A in this embodiment. The liquid crystal display device 200A includes a liquid crystal panel 10A and a backlight 20.

FIG. 38(b) shows a schematic diagram of a pixel P in the liquid crystal panel 10A. Herein a pixel P also includes a red sub-pixel R, a green sub-pixel G, a blue sub-pixel B, and a white sub-pixel W. As described above with reference to FIG. 1(d) and FIG. 1(e), the backlight 20 has a light source unit 22 including light sources 22R, 22G, and 22B.

Figure 39:
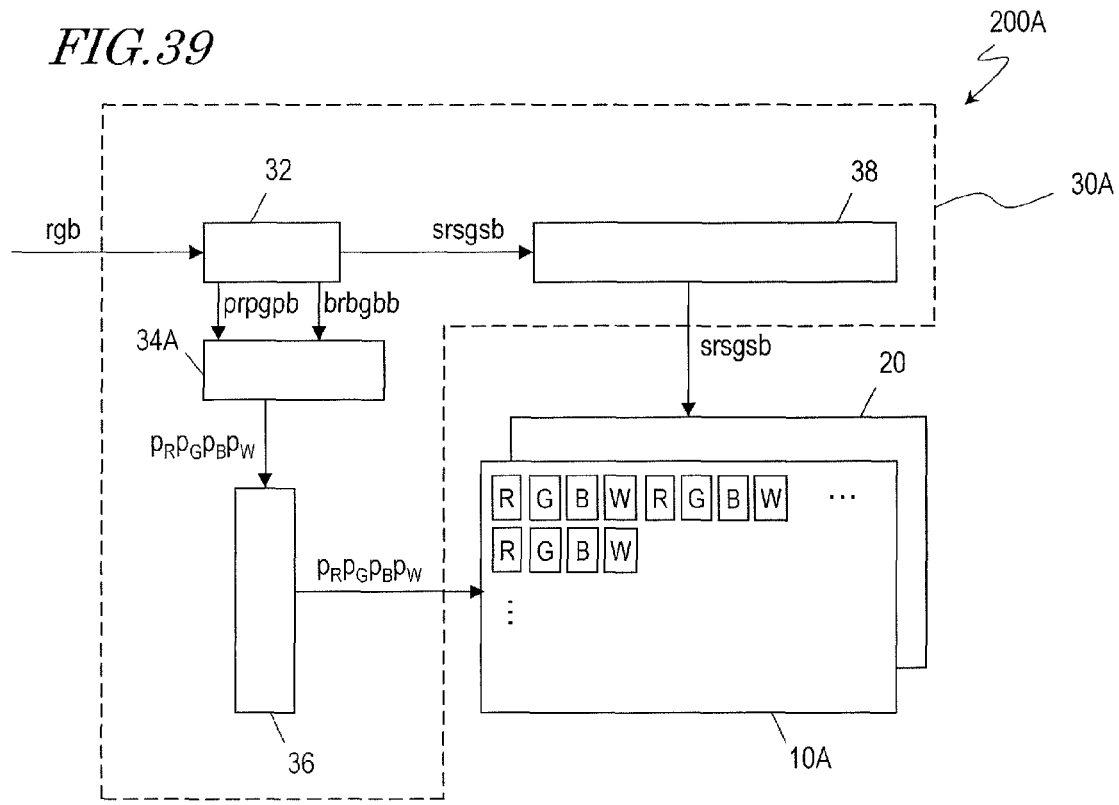
FIG. 39 is a schematic diagram showing an example of the liquid crystal display device shown in FIG. 38.

FIG. 39 shows a schematic diagram of the liquid crystal display device 200A provided with a control circuit 30A. The circuit control 30A controls the liquid crystal panel 10A and the backlight 20 based on an input video signal. The control circuit 30A includes an active drive processing portion 32, a multi-primary color converting portion 34A, a panel driving circuit 36, and a backlight driving circuit 38. The control circuit 30A has the same configuration as that of the control circuit 30 described above with reference to FIG. 32, so that overlapping descriptions are omitted for avoiding verbose descriptions.

The active drive processing portion 32 generates a light source signal and a liquid crystal data signal based on the input video signal. The light source signal indicates the relative intensities sr, sg, and sb of the light sources 22R, 22G, and 22B. The relative intensities sr, sg, and sb of the light sources 22R, 22G, and 22B are set based on the luminance levels r, g, and b of the input video signal. The backlight driving circuit 38 drives the light sources 22R, 22G, and 22B of the backlight 20 based on the light source signal. At this time, light of relative intensities br, bg, and bb is emitted from the backlight 20.

The active drive processing portion 32 generates a backlight signal from the light source signal. The backlight signal indicates the relative intensities br, bg, and bb of the backlight 20. In the active drive processing portion 32, the relative intensities br, bg, and bb of the backlight 20 are obtained from the relative intensities sr, sg, and sb. Thus, the relative intensities br, bg, and bb are set in accordance with the luminance levels r, g, and b of the input video signal. For example, the magnitude correlation among the relative intensities br, bg, and bb may be equal to the magnitude correlation among the luminance levels r, g, and b. Alternatively, the relative intensities br, bg, and bb may be substantially equal to the luminance levels r, g, and b.

Alternatively, the relative intensities br, bg, and bb may be determined in any other conditions based on the luminance levels r, g, and b. The relative intensities br, bg, and bb of the backlight 20 may be higher than the luminance levels r, g, and b in accordance with the input video signal. As described above, in the case where colors of all pixels are the same in the input video signal, the relative intensities br, bg, and bb of the backlight 20 may be equal to the luminance levels r, g, and b of the input video signal. On the other hand, in the case where pixels exhibit different colors in the input video signal, the relative intensities br, bg, and bb of the backlight 20 may sometimes be higher than the luminance levels r, g, and b of the input video signal. Specifically, in the input video signal, in the case where the red grayscale levels of a plurality of pixels corresponding to a certain light source unit 22 are different, the relative intensity br of the backlight 20 is set in accordance with the maximum value of the grayscale level r, and the relative intensity br is higher than the grayscale levels r of the other pixels. Similarly, in the input video signal, in the case where grayscale levels of green and blue of a plurality of pixels corresponding to the light source unit 22 are different, the relative intensities bg and bb of the backlight 20 are set in accordance with the maximum value of the grayscale levels g and b, and the relative intensities bg and bb are higher than the grayscale levels bg and bb of the other pixels.

Alternatively, even in the case where the colors of all pixels in the input video signal are the same, if the relative intensities br, bg, and bb of the backlight 20 are made to be equal to the luminance level r, g, and b of the input video signal, the display characteristics such as the color shift and viewing angle characteristics may sometimes be deteriorated. In such a case, even if the colors in all pixels are the same in the input video signal, the relative intensities br, bg, and bb of the backlight 20 may be set to be higher than the luminance level r, g, and b of the input video signal.

Thus, the relative intensities br, bg, and bb are determined based on the luminance levels r, b, and b.

The multi-primary color converting portion 34A converts the grayscale levels pr, pg, and pb of the liquid crystal data signal to grayscale levels $p_1$, $p_2$, $p_3$, and $p_4$ of red, green, blue, and white. As described above, the color phase (chromaticity) of color indicated by the grayscale levels pr, pg, and pb before the conversion is substantially the same as the color phase (chromaticity) of color indicated by the grayscale levels $p_1$, $p_2$, $p_3$, and $p_4$ after the conversion.

Thereafter the multi-primary color converting portion 34A generates a panel signal indicating the grayscale levels $p_1$, $p_2$, $p_3$, and $p_4$ as the grayscale levels $p_R$, $p_G$, $p_B$, and $p_W$. Alternatively, the multi-primary color converting portion 34A may set the grayscale levels $p_1$, $p_2$, and $p_3$, as the grayscale levels $p_R$, $p_G$, and $p_B$, respectively, and may set $p_4'$ which is higher than the grayscale level $p_4$ as the grayscale level $p_W$.

For example, the multi-primary color converting portion 34A may set the grayscale level $p_4'$ based on the backlight signal. As described later, as the grayscale level $p_4'$ is increased, the chromaticity is shifted in accordance with the increase of normalized luminance. For this reason, it is preferred that the grayscale level $p_4'$ may be set to such an extent that the shift of chromaticity is not too large.

For example, the multi-primary color converting portion 34A sets the grayscale level $p_4'$ based on the relative intensities br, bg, and bb of the backlight 20. The grayscale level $p_4'$ may be set to be a constant value based on the relative intensities br, bg, and bb of the backlight 20, or may be continuously varied in accordance with the relative intensities br, bg, and bb. Thus, the multi-primary color converting portion 34A may generate a panel signal based on not only the liquid crystal data signal but also the backlight signal. The panel driving circuit 36 drives the liquid crystal panel 10A based on the panel signal indicating the grayscale levels $p_R$, $p_G$, $p_B$, and $p_W$.

Hereinafter the liquid crystal display device 200A in the case where the input video signal indicates green will be described. For example, the grayscale levels (r, g, b) of the input video signal are (0, 255, 0) in the 255 grayscale notation. Herein the relative intensities br, bg, and bb are substantially the same as the luminance levels r, g, and b, and the multi-primary color converting portion 34A generates a panel signal based on not only the liquid crystal data signal but also the backlight signal. In this case, the relative intensities (br, bg, bb) of the backlight 20 are (0, 1, 0).

As the result of the conversion of the grayscale levels pr, pg, and pb by the multi-primary color converting portion 34A, the grayscale levels ($p_1$, $p_2$, $p_3$, $p_4$) of the red, green, blue, and white sub-pixels are (0, 255, 0, 0). The chromaticity of color indicated by the grayscale levels pr, pg, and pb is substantially the same as the chromaticity of color indicates by the grayscale levels $p_1$, $p_2$, $p_3$, and $p_4$.

Thereafter, the multi-primary color converting portion 34A sets the grayscale level $p_4'$ based on the relative intensities br, bg, and bb of the backlight 20. Herein since the difference between the relative intensities br and bg is large, the multi-primary color converting portion 34A sets the grayscale level $p_4'$ which is higher than the grayscale level $p_4$ as the grayscale level $p_W$. Accordingly, the grayscale levels ($p_R$, $p_G$, $p_B$, $p_W$) of the liquid crystal panel 10A are (0, 255, 0, $p_4'$) in the 255 grayscale notation. Herein the grayscale level $p_4'$ is $0 < p_4' \leq 255$, and the relative transmittance $p_4'$ is $0 < p_4' \leq 1$. Thus, in the case where the input video signal indicates green, in the liquid crystal display device 200A, the relative intensities (br, bg, bb) of the backlight 20 are (0, 1, 0), and the relative transmittances ($p_R$, $p_G$, $p_B$, $p_W$) of the liquid crystal panel 10 are (0, 1, 0, $p_4'$), and the grayscale levels ($p_R$, $p_G$, $p_B$, $p_W$) are represented as (0, 255, 0, $p_4'$) in the 255 grayscale notation.

In the liquid crystal display device 200A, in the case where the light source 22G of the backlight 20 is turned on, and the light sources 22R and 22B are turned off, the light from the backlight 20 is transmitted through not only the green sub pixel G but also the white sub-pixel W. Accordingly, the normalized luminance can be efficiently increased.

Figure 40:
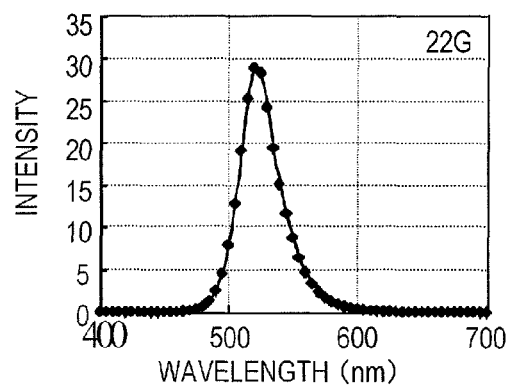
FIG. 40 shows graphs of the liquid crystal display device shown in FIG. 38 in the case where an input video signal indicates green, in which (a) is a graph showing an emission spectrum of backlight, (b) is a graph showing a transmission spectrum of a yellow sub-pixel in the liquid crystal panel, (c) is a graph showing an emitted light spectrum in the case of (a) and (b), and (d) is a graph showing an emitted light spectrum of the liquid crystal display device shown in FIG. 38.
Figure 40:
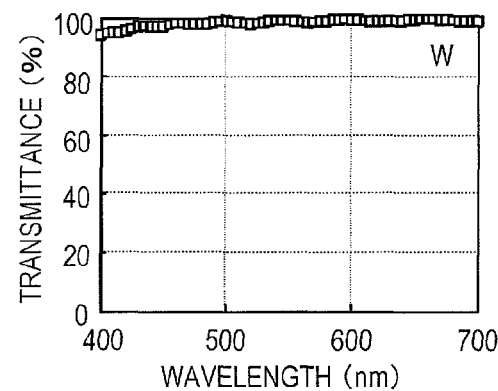
Figure 40:
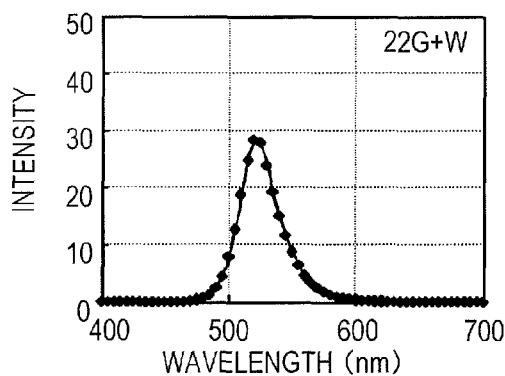
Figure 40:
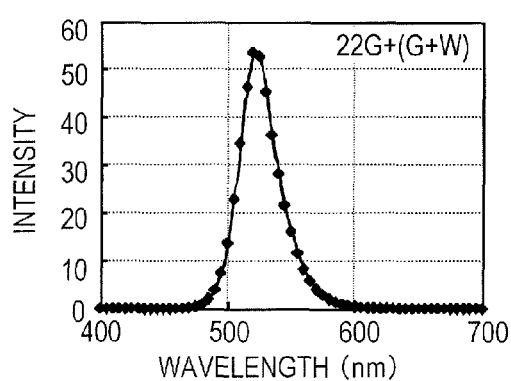

Hereinafter with reference to FIG. 40, the normalized luminance of the liquid crystal display device 200A will be described.

FIG. 40(a) shows an emission spectrum of the backlight 20. Herein the relative intensities (br, bg, bb) of the backlight 20 are (0, 1, 0), and the light source 22G is turned on. The emission spectrum has the peak wavelength of about 520 nm.

FIG. 40(b) shows a transmission spectrum of the liquid crystal panel 10A. Herein the grayscale levels ($p_R$, $p_G$, $p_B$, $p_W$) of the liquid crystal panel 10A are (0, 0, 0, 255), and the light is transmitted through the white sub-pixel W. Accordingly, the liquid crystal panel 10A transmits light of a full range of wavelengths.

FIG. 40(c) shows an emission spectrum of the liquid crystal display device 200A in the case where the light of the spectrum shown in FIG. 40(a) is emitted from the backlight 20 and the light is transmitted with the spectrum shown in FIG. 40(b) in the liquid crystal panel 10A. Herein the grayscale levels ($p_R$, $p_G$, $p_B$, $p_W$) of the liquid crystal panel 10A are (0, 0, 0, 255) and the relative intensities (br, bg, bb) of the backlight 20 are (0, 1, 0). In this case, the intensity of light emitted from the white sub-pixel W is mainly expressed by the product of the intensity of light from the light source 22G in the backlight 20 and the transmittance of the white sub-pixel W. The emission spectrum also has the peak wavelength of about 520 nm.

FIG. 40(d) shows an emission spectrum of the liquid crystal display device 200A in the case where the light of the spectrum shown in FIG. 40(a) is emitted from the backlight 20 and the light is transmitted with the spectra shown in both of FIG. 30(b) and FIG. 40(b) in the liquid crystal panel 10A. Herein the grayscale levels ($p_R$, $p_G$, $p_B$, $p_W$) of the liquid crystal panel 10A are (0, 255, 0, 255), and the relative intensities (br, bg, bb) of the backlight 20 are (0, 1, 0). In this case, the intensity of light emitted from the liquid crystal display device 200A is expressed by the sum of the intensity of light emitted from the light source 22G and transmitted through the green sub-pixel G and the intensity of light transmitted through the sub-pixel W. Thus, green of high brightness can be displayed.

Herein the advantages of the liquid crystal display device 200A in this embodiment will be described as compared with the liquid crystal display devices 700 and 900 in the comparative examples 1 and 3. First, the liquid crystal display device 700 in the first comparative example 1 will be described.

Herein the color indicated in the input video signal is green, and the grayscale levels (r, g, b) are (0, 255, 0) in the 255 grayscale notation. In the liquid crystal display device 700 in the comparative example 1, the light of constant intensity is emitted from the backlight 720. Herein the relative intensities (br, bg, bb) of the backlight 720 are indicated by (1, 1, 1).

The grayscale levels (pr, pg, pb) of the red, green, and blue sub-pixels in the liquid crystal panel 710 are equal to the grayscale levels (r, g, b) of the input video signal and (0, 255, 0). In this case, the normalized luminance in the liquid crystal display device 700 is 0.566 ($=0.246 \times (0/255)^{2.2} + 0.566 \times (255/255)^{2.2} + 0.188 \times (0/255)^{2.2}$).

Next, the liquid crystal display device 900 in the comparative example 3 will be described. Herein the color indicated in the input video signal is green, and the grayscale levels (r, g, b) are (0, 255, 0) in the 255 grayscale notation. In the liquid crystal display device 900 in the comparative example 3, the light of constant intensity is emitted from the backlight 920. Herein the relative intensities (br, bg, bb) of the backlight 920 are indicated by (1, 1, 1).

The grayscale levels (pr, pg, pb) of the liquid crystal data signal are equal to the grayscale levels (r, g, b) of the input video signal and (0, 255, 0). In the liquid crystal display device 900 in the comparative example 3, multi-primary color conversion is performed. The grayscale levels ($p_R$, $p_G$, $p_B$, $p_W$) are (0, 255, 0, 0) in the 255 grayscale notation. In this case, the normalized luminance in the liquid crystal display device 900 is 0.295 ($=0.118 \times (0/255)^{2.2} + 0.296 \times (255/255)^{2.2} + 0.096 \times (0/255)^{2.2} + 0.490 \times (0/255)^{2.2}$). Table 21 shows the grayscale levels of respective sub-pixels in the liquid crystal panel 910. Table 21 also shows the values of the liquid crystal display device 700 in the comparative example 1 for reference.

TABLE 21

|  | R | G | B | W | Normalized luminance |
|---|---|---|---|---|---|
| Grayscale level in Comparative example 1 | 0 | 255 | 0 | — | 0.566 |
| Grayscale level in Comparative example 3 | 0 | 255 | 0 | 0 | 0.295 |

Thus, the normalized luminance of the liquid crystal display device 900 in the comparative example 3 is low, so that the liquid crystal display device 900 cannot display green of high brightness.

Figure 30:
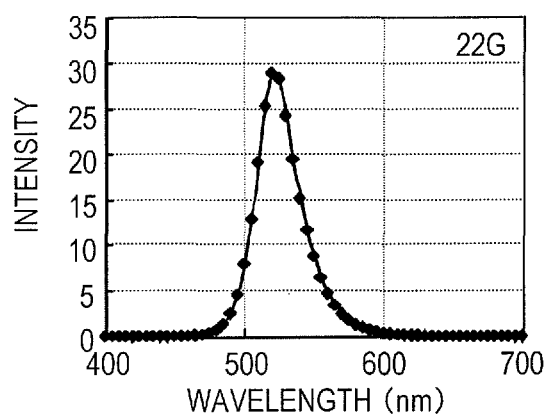
FIG. 30 shows graphs of the liquid crystal display device shown in FIG. 29 in the case where an input video signal indicates green, in which (a) is a graph showing an emission spectrum of a backlight, (b) is a graph showing a transmission spectrum of the liquid crystal panel, and (c) is a graph showing an emitted light spectrum in the case of (a) and (b).
Figure 30:
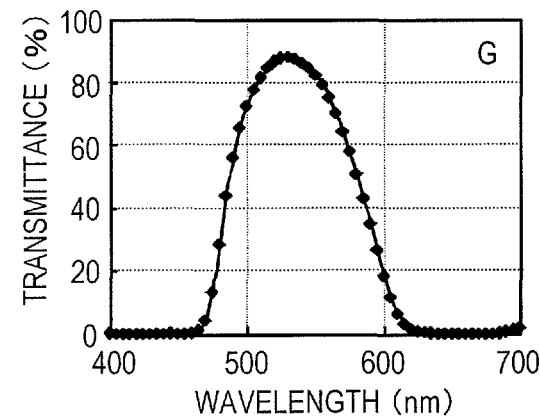
Figure 30:
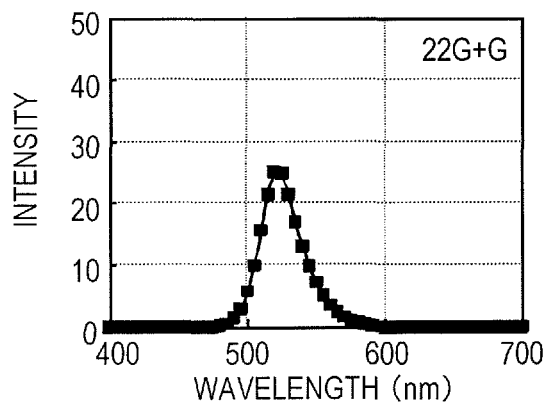

In the above-described liquid crystal display device 200, in the case where the input video signal indicates green, the light source 22G of the backlight 20 is turned on, and the green sub-pixel G transmits the light. For example, as described above with reference to FIG. 30, in the case where the grayscale levels (r, g, b) of the input video signal are (0, 255, 0, the relative intensities (br, bg, bb) of the backlight 20 are (0, 1, 0), the relative transmittances ($p_R$, $p_G$, $p_B$, $p_W$) of the liquid crystal panel 10A are (0, 1, 0, 0), and the grayscale levels ($p_R$, $p_G$, $p_B$, $p_W$) are represented as (0, 255, 0, 0) in the 255 grayscale notation. In this case, light of the spectrum shown in FIG. 30(c) is emitted. However, high brightness cannot be obtained only by the light in some cases.

On the contrary, the liquid crystal display device 200A in this embodiment can display green of high brightness. Hereinafter the normalized luminance of the liquid crystal display device 200A will be described. Herein the color indicated in the input video signal is green, and the luminance levels (r, g, b) are (0, 1, 0), and the grayscale levels (r, g, b) are (0, 255, 0).

Herein the relative intensities br, bg, and bb of the backlight 20 are set based on the luminance levels r, g, and b of the input video signal. Table 22 shows the relative intensities (br, bg, bb) of the backlight 20.

TABLE 22

| Embodiment 4 | br | bg | bb |
|---|---|---|---|
| Relative intensity of Backlight | 0 | 1 | 0 |

Herein, as described above, the relative transmittances ($p_R$, $p_G$, $p_B$, $p_W$) of the liquid crystal panel 10A are (0, 1, 0, $p_4'$), and the grayscale levels ($p_R$, $p_G$, $p_B$, $p_W$) are (0, 255, 0, $p_4'$) in the 255 grayscale notation. Table 23 shows the transmittances of the red sub-pixel R, the green sub-pixel G, the blue sub-pixel B, and the white sub-pixel W in the liquid crystal panel 10A.

TABLE 23

| Embodiment 4 | R | G | B | W |
|---|---|---|---|---|
| Grayscale level of Liquid crystal panel | 0 | 255 | 0 | $p_4'$ |

As described above, the relative transmittance $p_4'$ is $0 < p_4' \leq 1$, and the grayscale level $p_4'$ is $0 < p_4' \leq 255$. As the grayscale level $p_4'$ is increased, the improvement effect of the normalized luminance is large. However, if the grayscale level $p_4'$ is too high, the chromaticity of color displayed by the liquid crystal display device 200A may sometimes be largely shifted. In addition, if the grayscale level $p_4'$ is low, the shift of chromaticity is suppressed, but the improvement effect of the normalized luminance is also reduced. For example, in the case where the grayscale level $p_4'$ is 234, the normalized luminance of the liquid crystal display device 200A is 0.566 which is equal to that in the liquid crystal display device 700 in the comparative example 1. The grayscale level of 234 corresponds to the relative transmittance 0.828.

Figure 41:
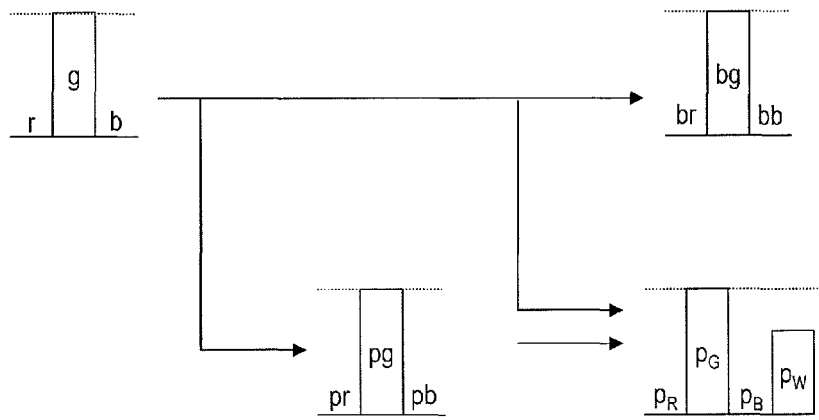
FIG. 41 is a schematic diagram showing luminance levels of an input video signal, relative intensities of the backlight, transmittance levels of a liquid crystal data signal, and relative transmittances of the liquid crystal panel in the liquid crystal display device shown in FIG. 38.

FIG. 41 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_Y$ of the liquid crystal panel 10A in the liquid crystal display device 200A. Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

The relative intensities br, bg, and bb of the backlight 20 are set based on the luminance levels r, g, and b of the input video signal. In the case where the luminance levels r, g, and b satisfy the relationship of g>r=b=0, the relative intensities br, bg, and bb of the backlight 20 satisfy the relationship of bg>br=bb=0. Specifically, the luminance levels (r, g, b) of the input video signal are (0, 1, 0), the relative intensities (br, bg, bb) are (0, 1, 0).

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 1, 0), the transmittance levels (pr, pg, pb) of the liquid crystal data signal are (0, 1, 0), and the grayscale levels (pr, pg, pb) are represented as (0, 255, 0) in the 255 grayscale notation. In this case, by the multi-primary color conversion, the relative transmittances ($p_R$, $p_G$, $p_B$, $p_W$) of the liquid crystal panel 10A are (0, 1, 0, 0.828), and the grayscale levels ($p_R$, $p_G$, $p_B$, $p_W$) are represented as (0, 255, 0, 234) in the 255 grayscale notation.

In the above description, the color indicated in the input video signal is green. However, the present invention is not limited to this. The color indicated in the input video signal may be red. For example, also in the case where the grayscale levels of the input video signal satisfy the relationship of r>g=b=0, the relative intensity br of the backlight 20 is made to be higher than the minimum value and not only the grayscale level $p_R$ but also the grayscale level $p_W$ in the liquid crystal panel 10A are made to be higher than the minimum value. Accordingly, red of high brightness can be displayed. Alternatively, the color indicated in the input video signal may be blue. For example, also in the case where the grayscale levels of the input video signal satisfy the relationship of b>r=g=0, the relative intensity bb of the backlight 20 is made to be higher than the minimum value, and not only the grayscale level $p_R$ but also the grayscale level $p_W$ in the liquid crystal panel 10A are made to be higher than the minimum value. Accordingly, blue of high brightness can be displayed.

In the above description, the setting of the grayscale level $p_4'$ is performed in the case where two of the relative intensities br, bg, and bb are the minimum value and the remaining one is higher than the minimum value. However, the present invention is not limited to this. Alternatively, in the case where at least two of the relative intensities br, bg, and bb are higher than the minimum value, the setting of the grayscale level $p_4'$ may be performed.

In the above description, the relative intensities br, bg, and bb of the backlight 20 are substantially equal to the luminance levels r, g, and b of the input video signal. However, the present invention is not limited to this.

Figure 42:
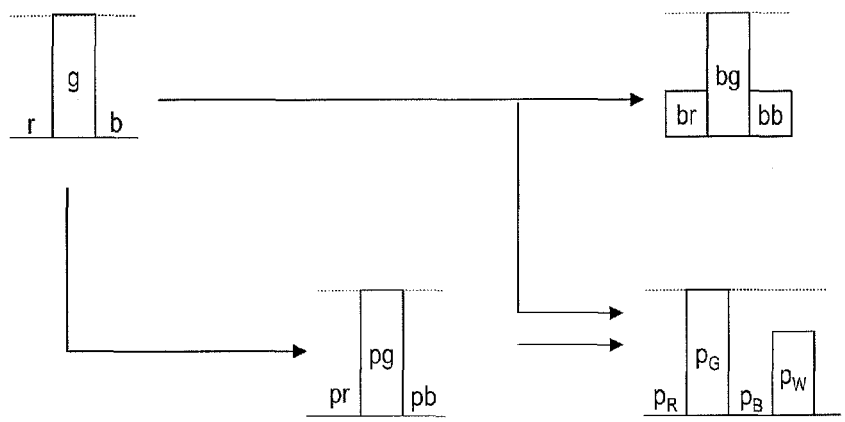
FIG. 42 is a schematic diagram showing luminance levels of the input video signal, relative intensities of the backlight, transmittance levels of the liquid crystal data signal, and relative transmittances of the a liquid crystal panel in the liquid crystal display device shown in FIG. 38.

Hereinafter the liquid crystal display device 200A will be described with reference to FIG. 42. FIG. 42 shows luminance levels r, g, and b of the input video signal, relative intensities br, bg, and bb of the backlight 20, transmittance levels pr, pg, and pb of the liquid crystal data signal, and relative transmittances $p_R$, $p_G$, $p_B$, and $p_W$ of the liquid crystal panel 10A in the liquid crystal display device 200A.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

The relative intensities br, bg, and bb of the backlight 20 are set based on the luminance levels r, g, and b. In the case where the luminance levels r, g, and b satisfy the relationship of g>r=b=0, the relative intensities br, bg, and bb of the backlight 20 satisfy the relationships of bg≥br≥0 and bg≥bb≥0. For example, in the case where the luminance levels (r, g, b) of the input video signal are (0, 1, 0), the relative intensity bg, is 1, the relative intensity br is 0≤br≤1, and the relative intensity bb is 0≤bb≤1.

The transmittance levels pr, pg, and pb of the liquid crystal data signal are set based on the luminance levels r, g, and b of the input video signal. As described above, in the case where the luminance levels r, g, and b of the input video signal satisfy the relationship of g>r=b=0, the grayscale level pg corresponding to the luminance level g has the maximum value, and the grayscale levels pr and pb corresponding to the luminance levels r and b have the minimum value. For example, in the case where the luminance levels (r, g, b) of the input video signal are (0, 1, 0), the transmittance levels (pr, pg, pb) of the liquid crystal data signal are (0, 1, 0), and the grayscale levels (pr, pg, pb) are represented by (0, 255, 0) in the 255 grayscale notation.

Next, multi-primary color conversion is performed. Herein the relative transmittances ($p_R$, $p_G$, $p_B$, $p_W$) of the liquid crystal panel 10A are 0, 1, 0, 0.828), and the grayscale levels ($p_R$, $p_G$, $p_B$, $p_W$) are represented as (0, 255, 0, 234) in the 255 grayscale notation. Herein similarly to the description with reference to FIG. 42, the relative transmittances ($p_R$, $p_G$, $p_B$, $p_Y$) are (0, 1, 0, 0.828). However since the relative intensities br and bb of the backlight 20 are higher than the minimum value, the relative transmittance $p_W$ may be lower than 0.828. As described above, in the case where the input video signal indicates green, not only the relative intensity bg but also the relative intensities br and/or bb of the backlight 20 may be higher than the minimum value.

In the above description, the color indicated in the input video signal is green. However, the present invention is not limited to this. The color indicated in the input video signal may be red. In this case, even when the grayscale levels of the input video signal satisfy the relationship of r>g=b=0, not only the relative intensity br but also the relative intensities bg and/or bb of the backlight 20 may be higher than the minimum value, and the grayscale levels $p_R$ and $p_W$ of the liquid crystal panel 10A may be higher than the minimum value. Alternatively, the color indicated in the input video signal may be blue. In this case, the grayscale levels of the input video signal satisfy the relationship of b>r=g=0, not only the relative intensity bb but also the relative intensities br and/or bg of the backlight 20 may be higher than the minimum value, and the grayscale levels $p_B$ and $p_W$ of the liquid crystal panel 10A may be higher than the minimum value.

Thus, in the case where the color indicated in the input video signal is green, not only the relative intensity bg but also the relative intensities br and/or bb of the backlight 20 may be higher than the minimum value.

Hereinafter with reference to FIG. 43, the variations of chromaticity and normalized luminance in accordance with the change of the relative intensities br and bb of the backlight 20 in the liquid crystal display device 200A will be described. Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0).

Figure 43:
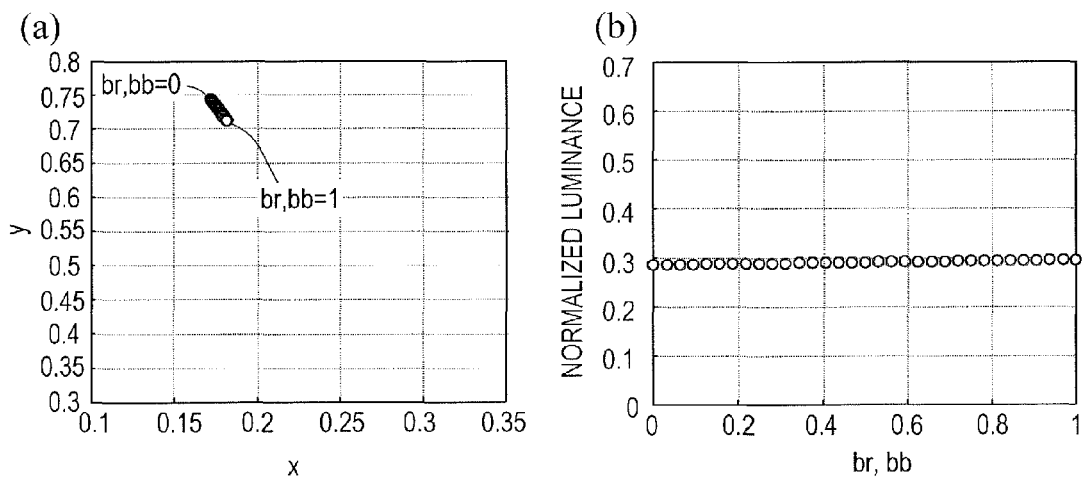
FIG. 43 shows graphs showing the variations of chromaticity and normalized luminance in accordance with the change of the relative intensity of the red light source in the backlight in the case where the input video signal indicates green in the liquid crystal display device shown in FIG. 38, in which (a) is a graph showing the variation of chromaticity, and (b) is a graph showing the variation of normalized luminance.

FIG. 43(*a*) shows the variation of chromaticity. In FIG. 43(*a*), the axis of abscissa indicates chromaticity x and the axis of ordinate indicates chromaticity y. FIG. 43(*b*) shows the variation of normalized luminance. In FIG. 43(*b*), the axis of abscissa indicates the relative intensities br and bb of the backlight 20 (br=bb), and the axis of ordinate indicates the normalized luminance. Herein the grayscale levels ($p_R$, $p_G$, $p_B$, $p_W$) of the liquid crystal panel 10A are (0, 255, 0, 0), and the relative intensity bg of the backlight 20 is 1.

As shown in FIG. 43(*a*), when the relative intensities br and bb are 1, the chromaticity x and the chromaticity y are substantially the same as those when the relative intensities br and bb are 0. In the liquid crystal panel 10A, the green sub-pixel G transmits light, and the other sub-pixels block out light, so that even if the relative intensities br and bb of the backlight 20 are increased, the light emitted from the liquid crystal panel 10A is hardly affected. The emission spectra of the light sources 22R and 22B slightly overlap the transmission spectrum of the green sub-pixel G, and the intensity of light on the longer wavelength side and the shorter wavelength side of the light emitted from the liquid crystal panel 10A is slightly increased due to the increase of the relative intensities br and bb of the backlight 20. Thus, strictly speaking, as the relative intensities br and bb are increased, the chromaticity x and the chromaticity y are both slightly shifted.

As shown in FIG. 43(*b*), the normalized luminance when the relative intensities br and bb are 1 is substantially the same as that when the relative intensities br and bb are 0. As described above, in the liquid crystal panel 10A, the green sub-pixel G transmits light, and the other sub-pixels block out light, so that even if the relative intensities br and bb of the backlight 20 are increased, the light emitted from the liquid crystal panel 10A is hardly affected.

As described above, in the case where not only the green sub-pixel G but also the white sub-pixel W transmit light in the liquid crystal panel 10A, the chromaticity x, the chromaticity y, and the normalized luminance are varied respectively in accordance with the increase of the relative intensities br and bb.

Figure 44:
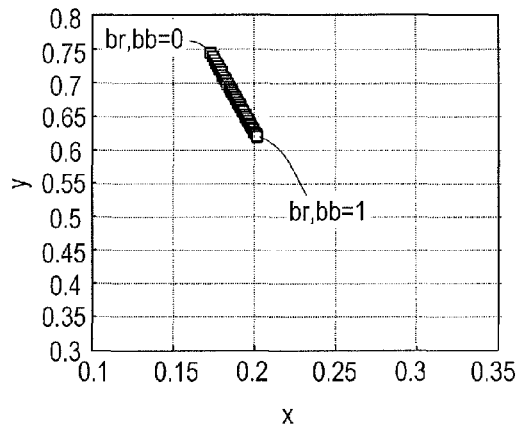
FIG. 44 shows graphs showing the variations of chromaticity and normalized luminance in accordance with the change of the relative intensity of the red light source in the backlight in the case where the input video signal indicates green in the liquid crystal display device shown in FIG. 38, in which (a) is a graph showing the variation of chromaticity, and (b) is a graph showing the variation of normalized luminance.
Figure 44:
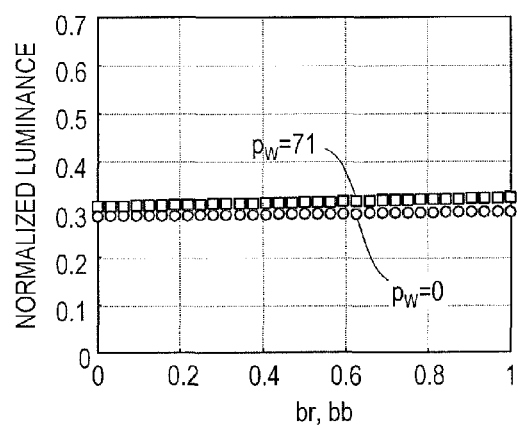

With reference to FIG. 44, the variations of chromaticity and normalized luminance in accordance with the change of the relative intensity br of the backlight 20 in the liquid crystal display device 100A will be described. FIG. 44(*a*) shows the variation of chromaticity, and FIG. 44(*b*) shows the variation of normalized luminance. For reference, FIG. 44(*b*) also shows the normalized luminance when the grayscale level $p_W$ is zero.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0). Herein the grayscale levels ($p_R$, $p_G$, $p_B$, $p_W$) of the liquid crystal panel 10A are (0, 255, 0, 71), and the relative intensity bg of the backlight 20 is 1.

As shown in FIG. 44(*a*), by increasing the relative intensities br and bb of the backlight 20, the chromaticity x and the chromaticity y are relatively largely shifted. This is because not only the green sub-pixel G transmits light in the liquid crystal panel 10A but also the white sub-pixel W transmits light to some extent, so that the intensity of light on the longer wavelength side and the shorter wavelength side of the light emitted from the liquid crystal panel 10A is increased due to the increase of the relative intensities br and bb.

As shown in FIG. 44(b), the normalized luminance when the grayscale level $p_W$ is 71 is slightly larger than the normalized luminance when the grayscale level $p_W$ is 0. This is because not only the green sub-pixel G but also the white sub-pixel W transmit light in the liquid crystal panel 10A, as described above. The grayscale level $p_W$ in the liquid crystal panel 10A is relatively low, so that the influence on the normalized luminance is relatively small.

Next, with reference to FIG. 45, the variations of chromaticity and normalized luminance in accordance with the change of the relative intensities br and bb of the backlight in the liquid crystal display device 200A will be described. FIG. 45(a) shows the variation of chromaticity, and FIG. 45(b) shows the variation of normalized luminance. For reference, FIG. 45(b) also shows the normalized luminance when the grayscale level $p_W$ is zero.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0). Herein the grayscale levels ($p_R$, $p_G$, $p_B$, $p_W$) of the liquid crystal panel 10A are (0, 255, 0, 234), and the relative intensity bg of the backlight 20 is 1.

As shown in FIG. 45(a), due to the increase of the relative intensities br and bb of the backlight 20, the chromaticity x and the chromaticity y are further largely shifted. This is because not only the green sub-pixel G but also the white sub-pixel W transmit light in the liquid crystal panel 10A, so that the intensity of light on the longer wavelength side and the shorter wavelength side of the light emitted from the liquid crystal panel 10A is largely increased due to the increase of the relative intensities br and bb.

As shown in FIG. 45(b), the normalized luminance when the relative intensities br and bb are 1 is larger than the normalized luminance when the relative intensities br and bb are 0. This is because the grayscale level $p_W$ in the liquid crystal panel 10A is relatively high, so that the influence on the normalized luminance is large in accordance with the increase of the relative intensities br and bb. In addition, the normalized luminance when the grayscale level $p_W$ is 234 is larger than the normalized luminance when the grayscale level $p_W$ is 71.

Figure 45:
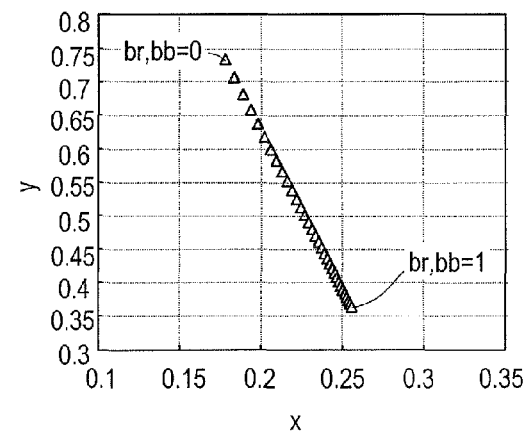
FIG. 45 shows graphs showing the variations of chromaticity and normalized luminance in accordance with the change of the relative intensity of the red light source in the backlight in the case where the input video signal indicates green in the liquid crystal display device shown in FIG. 38, in which (a) is a graph showing the variation of chromaticity, and (b) is a graph showing the variation of normalized luminance.
Figure 45:
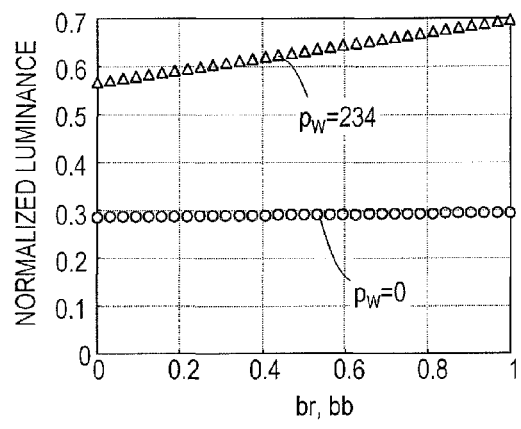

As is understood from the comparison between FIG. 44 and FIG. 45, in the case where the grayscale level $p_W$ is small, the variation of chromaticity is relatively small, but the improvement effect of the normalized luminance is relatively small. On the contrary, in the case where the grayscale level $p_W$ is large, the improvement effect of the normalized luminance is relatively large, and the variation of chromaticity is also relatively large.

In the above description, irrespective of the variation of the relative intensities br and bb of the backlight 20, the grayscale level $p_W$ in the liquid crystal panel 10A is constant. However the present invention is not limited to this. The grayscale level $p_W$ in the liquid crystal panel 10A (in addition, the grayscale levels $p_R$ and $p_G$, as necessary) may be varied in accordance with the change of the relative intensities br and bb of the backlight 20.

Figure 46:
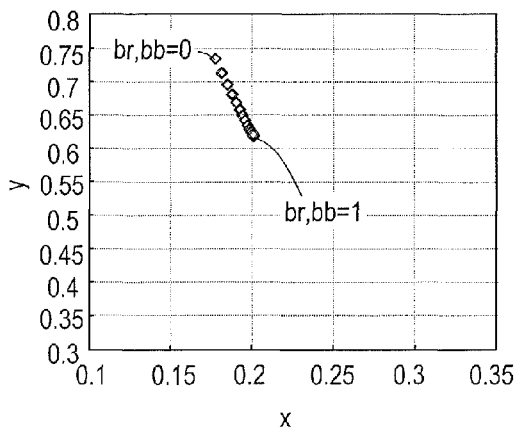
FIG. 46 shows graphs showing the variations of chromaticity and normalized luminance in accordance with the change of the relative intensity of the red light source in the backlight in the case where the input video signal indicates green in the liquid crystal display device shown in FIG. 38, in which (a) is a graph showing the variation of chromaticity, and (b) is a graph showing the variation of normalized luminance.
Figure 46:
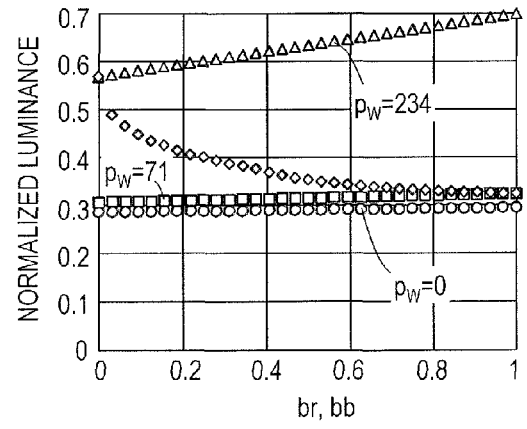

With reference to FIG. 46, the variations of chromaticity and normalized luminance in accordance with the change of the relative intensities br and bb of the backlight in the liquid crystal display device 200A will be described. FIG. 46(a) shows the variation of chromaticity, and FIG. 46(b) shows the variation of normalized luminance. For reference, FIG. 45(b) also shows the normalized luminance when the grayscale level $p_W$ is 0, 71, and 234.

Herein the input video signal also indicates green. For example, the luminance levels r, g, and b of the input video signal satisfy the relationship of g>r=b=0, the luminance levels (r, g, b) of the input video signal are (0, 1, 0), and the grayscale levels (r, g, b) are (0, 255, 0). Herein the grayscale levels $p_R$, $p_G$, and $p_B$, of the liquid crystal panel 10A are 0, 255, 0, respectively, and the grayscale level $p_W$ is not less than 71 and not more than 234. The relative intensity bg of the backlight 20 is 1.

Herein in the case where the relative intensities br and bb are 0, the grayscale level $p_W$ of the liquid crystal panel 10A is 234, and the grayscale level $p_W$ is reduced in accordance with the increase of the relative intensities br and bb. In the case where the relative intensities br and bb are 1, the grayscale level $p_W$ of the liquid crystal panel 10A is 71.

As shown in FIG. 46(a), the chromaticity is slightly shifted due to the increase of the relative intensities br and bb of the backlight 20, but the shift amount is relatively small. Herein the grayscale level $p_W$ is decreased in accordance with the increase of the relative intensities br and bb, so that the shift of chromaticity can be reduced.

As shown in FIG. 46(b), in the case where the relative intensities br and bb are 0, the improvement effect of the normalized luminance is large. On the contrary, as the relative intensities br and bb are increased, the improvement effect of the normalized luminance is reduced. Thus, in accordance with the increase of the relative intensities br and bb, the grayscale level $p_W$ is reduced, thereby realizing the improvement of normalized luminance and the suppression of chromaticity shift.

In the above description, in the case where the intensities of light emitted from the light sources 22R, 22G, and 22B of each light source unit 22 are equal to each other, light of constant intensity is emitted from the backlight 20 to respective pixels P of the liquid crystal panels 10 and 10A. However, the present invention is not limited to this. Even in the case where the intensities of light emitted from the light sources 22R, 22G, and 22B of each light source unit 22 are equal to each other, the intensity of light emitted from the backlight 20 may be different depending on the pixels P of the liquid crystal panels 10 and 10A. For example, even if the intensities of light emitted from the light sources 22R, 22G, and 22B of each light source unit 22 are constant, in the case where the intensity of light in the center of the light irradiation area of the light source unit 22 is different from the intensity of light in an outer circumferential portion of the light irradiation area of the light source unit 22 in the backlight 20, the voltages applied across the liquid crystal layers $LC_R$, $LC_G$, $LC_B$, $LC_Y$ and $LC_W$ of the pixel P corresponding to the center of the light irradiation area may be different from the voltages applied across the liquid crystal layers $LC_R$, $LC_G$, $LC_B$, $LC_Y$ and $LC_W$ of the pixel P corresponding to the outer circumferential portion of the light irradiation area in the liquid crystal panel 10.

In the above description, the light source units 22 are provided in a matrix having a plurality of rows and a plurality of columns in the backlight 20. However the present invention is not limited to this. Alternatively, two light source units 22 may be arranged in the horizontal direction, or in the vertical direction. Alternatively, a single light source unit 22 may be provided in the backlight 20.

In the above description, the liquid crystal panel is of a normally black type. However the present invention is not limited to this. The liquid crystal panel may be of a normally white type. In such a case, if the applied voltage is low, the transmittances of the red sub-pixel R, the green sub-pixel G, the blue sub-pixel B, the yellow sub-pixel Ye, and the white sub-pixel W are increased. If the applied voltage is high, the transmittances of the red sub-pixel R, the green sub-pixel G, the blue sub-pixel B, the yellow sub-pixel Ye, and the white sub-pixel W are lowered.

In the above description, a pixel P in the liquid crystal panel 10 includes a red sub-pixel R, a green sub-pixel G, a blue sub-pixel B, and a yellow sub-pixel Ye, and a pixel P in the liquid crystal panel 10A includes a red sub-pixel R, a green sub-pixel G, a blue sub-pixel B, and a white sub-pixel W. However the present invention is not limited to this. Instead of the yellow sub-pixel Ye or the white sub-pixel W, the pixel P may include a cyan sub-pixel C or a magenta sub-pixel M.

In the above description, in the liquid crystal panels 10 and 10A, a pixel P includes four sub-pixels. However the present invention is not limited to this. The pixel P may include five or more sub-pixels. For example, a pixel P may include a red sub-pixel R, a green sub-pixel G, a blue sub-pixel B, a yellow sub-pixel Ye, and a cyan sub-pixel C.

In the liquid crystal panels 10 and 10A, at least one of the back substrate 16a and the front substrate 16b may include an alignment film. Herein the alignment film is a vertical alignment film, and liquid crystal molecules are processed so as to have a pre-tilt angle less than 90 degrees (typically about 85 degrees or more). The pre-tilt angle is an angle formed by a main surface of the alignment film and a long axis of the liquid crystal molecule. By the alignment film, the pre-tilt direction of liquid crystal molecules is defined.

As a method for forming such an alignment film, a method for performing a rubbing process, a method for performing a photo-alignment process, a method in which a minute structure is previously formed as undercoating of the alignment film, and the minute structure is reflected on the surface of the alignment film, a method in which an inorganic substance such as SiO is obliquely deposited, so as to form an alignment film having a minute structure on its surface are known. From the point of view of the mass productivity, the rubbing process or the photo-alignment process may be preferable. Especially in the photo-alignment process, the alignment process is performed in a noncontact manner, so that static electricity due to friction is not generated unlike the rubbing process, thereby improving the yield. In addition, as disclosed in International Publication No. WO 2006/121220, by using a photo-alignment film including a photosensitive radical, the variation of pre-tilt angles can be controlled to be 1 degree or less. As the photosensitive radical, it is preferred to include at least one of photosensitive radicals selected from a group of the 4-chalcone radical, the 4'-chalcone radical, the coumarin radical, and the cinnamoyl radical.

The liquid crystal panels 10 and 10A may be a panel of so-called MVA (Multi-domain Vertical Alignment) mode. In the liquid crystal panels 10 and 10A of MVA mode, linear slits formed on the electrode or linear dielectric projections (ribs) formed on the electrode on the side of the liquid crystal layer are arranged, on a pair of substrates which are opposed with the liquid crystal layer interposed therebetween, in parallel and alternately when viewed from the normal direction of the substrate, thereby regulating the orientation of directors of liquid crystal domains formed when a voltage is applied. The orientation of liquid crystal domains is a direction orthogonal to the direction in which the linear slits or dielectric projections (hereinafter they are collective referred to as "linear structures") extend. In the MVA mode, scanning lines may be disposed so as to overlap the boundary of different liquid crystal domains.

The liquid crystal panels 10 and 10A may be a panel of PSA mode. The Polymer Sustained, Alignment Technology (hereinafter referred to as "PSA technology") is disclosed, for example, in Japanese Laid-open Patent publication No. 2002-357830, Japanese Laid-open Patent Publication No. 2003-177418, Japanese Laid-open Patent Publication No. 2006-78968, and K. Hanaoka et al. "A New MVA-LCD by Polymer Sustained Alignment Technology", SID 04 DIGEST 1200-1203 (2004). The entire contents of these four documents are incorporated by reference in this specification.

The PSA technology is a technology in which a small amount of polymerizable compound (e.g. photopolymerizable monomer or oligomer) is mixed into a liquid crystal material, and then after a liquid crystal panel is assembled, the polymerizable compound is irradiated with activation energy rays (e.g. ultraviolet rays) in the condition where a predetermined voltage is applied across the liquid crystal layer, so that the polymer is generated, thereby controlling the pre-tilt angle of liquid crystal molecules. The alignment condition of liquid crystal molecules when the polymer is generated is maintained (memorized) after the voltage is removed (in a condition where any voltage is not applied). Herein the layer formed by the polymer is referred to as an alignment maintaining layer. The alignment maintaining layer is formed on the surface of the alignment film (on the side of the liquid crystal layer). However, the alignment maintaining layer does not necessarily have the shape for covering the surface of the alignment film, or the alignment maintaining layer may be polymer particles which discretely exist.

The liquid crystal panels 10 and 10A in the PSA mode can be obtained by applying the above-described PSA technology, for example. Although not shown in the figure, in the case where the PSA technology is applied, each electrode (the pixel electrode) 12a may include a cross-shaped stem portion disposed so as to overlap a polarizing axis of a pair of polarizing plates and a plurality of branch portions extending in the substantially 45-degree direction from the cross-shaped stem portion. Specifically, the branch portions extend in the directions of 45 degrees, 135 degrees, 225 degrees, and 315 degrees from the stem portion. Liquid crystal molecules in the liquid crystal layer of the vertical alignment type (the dielectric anisotropy is negative) are tilted in directions in which the respective branch portions extend by means of the oblique electric fields from the stem portion and the branch portions. This is because the oblique electric field from the branch portions extending in parallel to each other acts on the liquid crystal molecules so as to be tilted in the direction perpendicular to the direction in which the branch portions extend, and the oblique electric field from the stem portion acts on the liquid crystal molecules so as to be tilted in the directions in which the respective branch portions extend. If the PSA technology is utilized, the orientation of the liquid crystal molecules formed when a voltage is applied across the liquid crystal layer can be stabilized. Even in the PSA mode, the scanning line may be disposed so as to overlap the boundary between different liquid crystal domains.

Alternatively, the liquid crystal panels 10 and 10A may be a panel of CPA mode. For example, the pixel electrode 12a has a shape with high symmetry, and liquid crystal molecules in each liquid crystal domain may be oriented in an axis symmetric manner (in a radially tilted manner) by the voltage application across the liquid crystal layer LC.

The liquid crystal panels 10 and 10A may have a plurality of regions which can exhibit different luminance. Especially in the case where each sub-pixel performs display of intermediate grayscales, different regions in each sub-pixel exhibit different luminance, so that the viewing angle dependency of the gamma characteristics can be improved.

In the above-described liquid crystal panels 10 and 10A, the voltage is applied across the liquid crystal layer LC by means of the electrodes 12a and 12b provided in the back substrate 16a and the front substrate 16b, respectively. However, the present invention is not limited to this. Alternatively, in the liquid crystal panels 10 and 10A, the voltage may be applied in a horizontal direction parallel to the in-plane of the liquid crystal layer. For example, the liquid crystal panels 10 and 10A may be a panel of IPS (In Plane Switching) mode.

INDUSTRIAL APPLICABILITY

The liquid crystal display device of the present invention can perform display of wide color reproduction range with low power consumption.

REFERENCE SIGNS LIST 10, 10A Liquid crystal panel
20 Backlight
22 Light source unit
22R Red light source
22G Green light source
22B Blue light source
30, 30A Control circuit
100, 100A, 200, 200A Liquid crystal display device

The invention claimed is:

1. A liquid crystal display device comprising:
a liquid crystal panel having a plurality of pixels;
a backlight having at least one light source unit that emits light to the liquid crystal panel; and
a control circuit that controls the liquid crystal panel and the backlight based on an input video signal; wherein
each of the plurality of pixels has four or more sub-pixels;
the four or more sub-pixels include a red sub-pixel, a green sub-pixel, a blue sub-pixel, and a yellow sub-pixel;
the light source unit includes a red light source, a green light source, and a blue light source; and
a magnitude correlation between relative intensities of the red light source, the green light source, and the blue light source has a same magnitude correlation between respective relative intensities of red, green, and blue grayscale levels indicated in the input video signal.

2. The liquid crystal display device of claim 1, wherein the red light source, the green light source, and the blue light source are a red light emitting diode, a green light emitting diode, and a blue light emitting diode, respectively.

3. The liquid crystal display device of claim 1, wherein the control circuit includes:
an active drive processing portion that generates a light source signal and a liquid crystal data signal based on the input video signal;
a multi primary color converting portion that generates a panel signal from the liquid crystal data signal;
a panel driving circuit that drives the liquid crystal panel based on the panel signal; and
a backlight driving circuit that drives the backlight based on the light source signal.

4. The liquid crystal display device of claim 3, wherein the active drive processing portion generates a backlight signal from the light source signal, and the multi primary color converting portion generates the panel signal based on the backlight signal and the liquid crystal data signal.

5. The liquid crystal display device of claim 1, wherein relative intensities of the red light source, the green light source, and the blue light source of the light source unit are varied depending on a color of a pixel indicated in the input video signal.

6. The liquid crystal display device of claim 1, wherein among the red light source, the green light source, and the blue light source of the light source unit, a light source corresponding to grayscale levels of red, green, and blue having the minimum value of the input video signal is turned off, and a light source corresponding to grayscale levels of red, green, and blue having a value higher than the minimum value of the input video signal is turned on.

7. The liquid crystal display device of claim 1, wherein in a case where the input video signal indicates yellow, the red light source and the green light source are turned on, and the blue light source is turned off.

8. The liquid crystal display device of claim 1, wherein in the case where the red, green, and blue grayscale levels indicated in the input video signal are higher than the minimum value, respectively, respective relative transmittances of the four or more sub-pixels in the liquid crystal panel exhibit a maximum value.

9. The liquid crystal display device of claim 1, wherein in a case where the input video signal indicates orange or yellowish green, the blue light source is turned off.

10. The liquid crystal display device of claim 1, wherein in a case where the input video signal indicates orange or yellowish green, respective relative intensities of the red light source and the green light source are higher than a relative intensity of the blue light source.

11. The liquid crystal display device of claim 1, wherein in a case where the input video signal indicates green, a relative intensity of the green light source is higher than a relative intensity of the red light source and a relative intensity of the blue light source.

12. The liquid crystal display device of claim 11, wherein in a case where the input video signal indicates yellow, relative transmittances of the red sub-pixel, the green sub-pixel, and the yellow sub-pixel in the liquid crystal panel exhibit a maximum value.

13. The liquid crystal display device of claim 1, wherein in a case where the input video signal indicates green, the green light source is turned on, and relative transmittances of the green sub-pixel and the yellow sub-pixel are higher than relative transmittances of the red sub-pixel and the blue sub-pixel in the liquid crystal panel.

14. The liquid crystal display device of claim 1, wherein in a case where the input video signal indicates green, the red light source and the green light source are turned on, and relative transmittances of the green sub-pixel and the yellow sub-pixel are higher than relative transmittances of the red sub-pixel and the blue sub-pixel in the liquid crystal panel.

15. The liquid crystal display device of claim 1, wherein
in a case where the red light source is turned on, a relative transmittance of the red sub-pixel in the liquid crystal panel exhibits a maximum value,
in a case where the green light source is turned on, a relative transmittance of the green sub-pixel in the liquid crystal panel exhibits a maximum value, and
in a case where the blue light source is turned on, a relative transmittance of the blue sub-pixel in the liquid crystal panel exhibits a maximum value.

16. The liquid crystal display device of claim 1, wherein
in a case where the red light source is turned on and the green light source is turned off, relative transmittances of the red sub-pixel and the yellow sub-pixel are higher than a minimum value, and
in a case where the green light source is turned on and the red light source is turned off, relative transmittances of the green sub-pixel and the yellow sub-pixel are higher than a minimum value.

17. The liquid crystal display device of claim 1, wherein the four or more sub-pixels further include a cyan sub-pixel.

* * * * *